(12) United States Patent
Anderson et al.

(10) Patent No.: US 7,349,956 B2
(45) Date of Patent: Mar. 25, 2008

(54) SYSTEM AND METHOD FOR ACCESSING AND OPERATING PERSONAL COMPUTERS REMOTELY

(75) Inventors: Robin L. Anderson, Winchester, TN (US); Ronald J. Perholtz, Jupiter, FL (US); Dennis Hawkins, Loxahatchee, FL (US)

(73) Assignee: Avocent Huntsville Corporation, Huntsville, AL (US)

( * ) Notice: Subject to any disclaimer, the term of this patent is extended or adjusted under 35 U.S.C. 154(b) by 820 days.

(21) Appl. No.: 10/425,717

(22) Filed: Apr. 30, 2003

(65) Prior Publication Data

US 2003/0217123 A1 Nov. 20, 2003

Related U.S. Application Data

(63) Continuation of application No. 09/401,501, filed on Sep. 22, 1999, now Pat. No. 6,633,905.

(60) Provisional application No. 60/101,430, filed on Sep. 22, 1998.

(51) Int. Cl.
*G06F 15/16* (2006.01)

(52) U.S. Cl. ..................... 709/219; 348/701

(58) Field of Classification Search ............... 345/213, 345/510, 536, 556, 629, 698, 27; 709/219; 348/463, 701; 712/16, 18; 714/2, 27, 31; 386/4
See application file for complete search history.

(56) References Cited

U.S. PATENT DOCUMENTS 4,054,911 A * 10/1977 Fletcher et al. ............. 348/463
4,101,959 A * 7/1978 Domike et al. ............. 345/418
4,177,514 A * 12/1979 Rupp ............................ 712/18
4,800,423 A * 1/1989 Appiano et al. ............. 348/589
4,862,268 A * 8/1989 Campbell et al. ............ 348/463
5,566,339 A  10/1996 Perholtz et al.
5,608,426 A  3/1997 Hester
5,732,212 A  3/1998 Perholtz et al.
5,875,293 A * 2/1999 Bell et al. ........................ 714/27
5,877,819 A * 3/1999 Branson ....................... 348/701

(Continued)

FOREIGN PATENT DOCUMENTS

FR 2 672 707 2/1991

(Continued)

OTHER PUBLICATIONS

Energy Consumption of Apple Macintosh Computers—Jacob Lorch (1998) golem.cs.berkeley.edu/~lorch/papers/breakdown.ps.*
Timestamping Schemes for MPEG-2 Systems Layer and Their . . . —Tryfonas, Varma (1998) ftp.cse.ucsc.edu/pub/hsnlab/ucsc-cri-98-2.ps.Z.*

(Continued)

*Primary Examiner*—Thong Vu
(74) *Attorney, Agent, or Firm*—Davidson Berquist Jackson & Gowdey LLP

(57) ABSTRACT

A remote access device is disclosed for capturing, digitizing and communicating video signals from a host computer to a remote computer. The remote computer returns keyboard and mouse signals through the remote access device to the host computer to control the host computer as though the remote keyboard and mouse were directly connected to the host computer. The remote access device includes a circuit module interface for the host computer that allows the remote access device to operate independently of any operating system characteristics associated with the host computer.

13 Claims, 26 Drawing Sheets

U.S. PATENT DOCUMENTS

| | | | | |
|---|---|---|---|---|
| 5,926,174 | A * | 7/1999 | Shibamiya et al. | 345/213 |
| 6,070,253 | A * | 5/2000 | Tavallaei et al. | 714/31 |
| 6,104,414 | A * | 8/2000 | Odryna et al. | 345/536 |
| 6,154,600 | A * | 11/2000 | Newman et al. | 386/4 |
| 6,243,738 | B1 | 6/2001 | Hayles et al. | |
| 6,263,373 | B1 | 7/2001 | Cromer et al. | |
| 6,313,822 | B1 * | 11/2001 | McKay et al. | 345/693 |
| 6,330,594 | B1 | 12/2001 | Swart | |
| 6,333,750 | B1 * | 12/2001 | Odryna et al. | 345/629 |
| 6,349,330 | B1 | 2/2002 | Bernadett et al. | |
| 6,356,313 | B1 * | 3/2002 | Champion et al. | 348/558 |
| 6,366,951 | B1 | 4/2002 | Schmidt | |
| 2001/0017604 | A1 * | 8/2001 | Jacobsen et al. | 345/27 |
| 2004/0189870 | A1 * | 9/2004 | Champion et al. | 348/510 |

FOREIGN PATENT DOCUMENTS

| | | |
|---|---|---|
| WO | 95/22137 | 8/1995 |
| WO | 99/10801 | 3/1999 |

OTHER PUBLICATIONS

Adaptive Cancellation of Narrowband Signals in Overlaid CDMA . . . —Rasmussen (1996) www.cwc.nus.edu.sg/cwcdocs/zfiles/cdma11.ps.gz.*

Schramm et al., Application Oriented Network Modeling with Mobile Agents, IEEE 1998.

"pcAnywhere32 User's Guide," Symantec Corporation, 1993-1997, Peter Norton Product Group.

The file history of U.S. Appl. No. 10/032,325.

* cited by examiner

KEY-VIEW Remote Control System – Main Menu

Switch   Security   Mouse   Video   Keyboard   Other   Help

Settings for Active KEY-VIEW Host PC:

PCI Card:   <Active Card/PC Desc.> – <Card ID>   Mouse Type: Serial   Video Drv:   640: VA000003.VGA
                                                                                                                                800: VC000003.VGB
SB Hot Key:  <switch box command sequence>   SB Channel: B                              1024:
                                                                                                                                 1280:
Active PC:   <Active PC Desc> – <PC ID>              Mouse Drv: MA000003.MSE   Color Palette   : 256 colors

FIG. 13

| KEY-VIEW PCI: CARD NUMBER 0 SETTINGS | ? X |

Card Description: Netware 3.12 file server

Card Connected To: PC    Switch Box

Switch Box Hot Keys: <Num Lock> <-> <Num Lock> ▽

Mouse Interface: Serial    PS/2

Video Drivers:
640x480 Mode    VA000003.VGA
800x600 Mode    VB000003.VGB
1024x768 Mode
1280x1024 Mode Mouse Driver:    Not Applicable
                 Installed on Host PC
                 Driver Name: VB000003.MSE

KEY-VIEW PC ID#    3

Ok    Apply    Cancel    Help

Switch Box PC's: Card 1 – Switch Box – NT Servers

| PC id | PC Description |
|---|---|
| 00001 | Corporate NT 3.51 Server 3rd Floor |
| 00004 | Sales Department Novell 3.12 |
| 00005 | Apollo Communications Server |
| 00007 | Novell Print Server 3rd Floor |
| 00008 | PBX Server 3rd Floor |

Select
Add
Delete
Cancel
Settings
Help

| PC Settings for: Card 1 – Switch Box – NT Servers | ? | X |

PC Description: Sales Department Novell 3.12

Switch Box Channel ID: A

Video Drivers:
- 640x480 Mode: VC000004.VGA
- 800x600 Mode:
- 1024x768 Mode:
- 1280x1024 Mode:

Mouse Driver: Not Applicable / Installed on Host PC / Driver Name:

KEY-VIEW PC ID#: 4

[Ok] [Apply] [Exit] [Help]

Listing of Host PC Mouse Drivers

| File name | Date | Time | Host PC Description |
|---|---|---|---|
| MA000001.MSE | 01/05/97 | 10:02 | Corp NT Serv-Normal |
| MB000001.MSE | 01/07/97 | 15:02 | Corp NT Serv-Sales APP |
| MC000001.MSE | 01/07/97 | 15:20 | Corp NT Serv-Acct APP |
| MA000003.MSE | 01/07/97 | 17:02 | 3rd Floor Com Server |
| MA000005.MSE | 01/10/97 | 18:04 | 2nd FLR Marketing Server |

Select
Cancel
Delete
Update

FIG. 23

Listing of Host PC Video Drivers

| File name | Date | Time | Host PC Description |
|---|---|---|---|
| VA000001.VGA | 01/05/97 | 10:02 | Corporate NT Server |
| VB000001.VGA | 01/07/97 | 15:02 | Corporate NT Server |
| VA000001.VGA | 01/07/97 | 15:20 | Corporate NT Server |
| VA000003.VGA | 01/07/97 | 17:02 | 3rd Floor Com Server |
| VA000004.VGA | 01/10/97 | 18:04 | 2nd FLR Marketing Server |

Select
Cancel
Delete
Update

Module System Configuration

Require Reasons For Power Off Actions  ☑
Require Reasons For Power On Actions  ☑
Reboot Delay in Seconds  20 ▽
Module Daisy Chain COM port  COM1 ▽

OK    Cancel

FIG. 27

SYSTEM AND METHOD FOR ACCESSING AND OPERATING PERSONAL COMPUTERS REMOTELY

This is a Continuation of: National Appln. No. 09/401,501 filed Sep. 22, 1999, now U.S. Pat. No. 6,633,905 issued Oct. 14, 2003, which claims the benefit of U.S. application Ser. No. 60/101,430 filed Sep. 22, 1998.

FIELD OF THE INVENTION

This invention relates to remote computer access, and more particularly to hardware and software for coordinating video, keyboard and mouse information transfers and control to/from a remote PC and one or more host PCs.

BACKGROUND AND SUMMARY OF THE INVENTION

Since the introduction of the PC there has been a need to access PCs from remote locations. Initial remote access approaches software based systems, such as pcAnywhere, Reach Out, etc., Such remote access systems are operating system dependent, meaning that the software would only function in association with a particular operating system (i.e. DOS, Windows, Unix, etc) and software upgrades were normally required each time that operating system was enhanced.

Software-only based systems were also intrusive (i.e. the software had to be installed on the Host PC). As a result, the software took resources away from the Host PC and often caused the Host PC to lock up due to incompatibilities between the remote access software and application software running on the Host PC. Moreover, many critical PC applications, such as network file servers, where simply incompatible with all remote access software products. Finally, remote access software failed when the Host PC failed, meaning that maintenance personnel could not remotely access a PC that had failed or locked up to determine why the failure occurred and to take corrective action.

U.S. Pat. No. 5,732,212, which is incorporated herein by reference, disclosed a prior art remote access product that was marketed as so-called KEY-VIEW. Keyview was a custom designed hardware unit externally connected to a Host PC that had a proprietary internal software operating system which serviced a remote user. Proprietary software operating on a Remote User's PC was used to remotely access the KEY-VIEW unit at the Host site. A Remote user running this proprietary software required only a standard modem and PC to access any Host site.

Using the present invention (sometimes referred to herein by an example embodiment called "KEY-VIEW II"), a single KEY-VIEW PC permits remote control of a plurality of Host PCs alone or in combination with third party switch boxes and allows help desk and maintenance personnel to be highly centralized. but still respond to support calls, as if they were on-site. This means KEY-VIEW dramatically cuts down-time as well as costs for maintenance and technical support.

Under KEY-VIEW II, a standard remote access engine such as pcAnywhere is used to remotely access a KEY-VIEW PC. pcAnywhere in combination with the KEY-VIEW PC permit access via a LAN, modem, the Internet and/or direct serial or parallel port access. pcAnywhere supports TCIP access, so customers may access the KEY-VIEW II PC over the Internet and launch, monitor and control applications running any Host computer connected to the Host PC even in distant international locations, as if they were actually on site.

The example embodiment described herein uses the remote access package, pcAnywhere, using the latest 32 bit technology. But, other remote access engines can be substituted.

KEY-VIEW II improves control of "Host" PCs from a remote location on virtually a real time basis without any remote access hardware or software running on the Host PC. Any PC running any operating system may be accessed remotely, as long as the Host PC has a standard video card and compatible keyboard. The present invention eliminates operating system dependent, software only based remote access solutions that involve costly software upgrades and complexities each time the Host or Remote PCs operating system changes.

KEY-VIEW II is a independent hardware unit that is installed between the Host PC and it's video monitor, keyboard, mouse and power source. In other words, the Host PC's video monitor output signal passes through KEY-VIEW II before reaching the VGA monitor, the keyboard and mouse input signal passes through KEY-VIEW II before reaching the PC. Accordingly, KEY-VIEW II intercepts all of the critical input and output functions of a PC necessary to totally remotely control any PC running any operating system or application.

The KEY-VIEW II thus provides platform-independent remote access. KEY-VIEW II permits remote access to any version of any operating system, even versions that have not yet been released. Moreover, since KEY-VIEW II converts the analog video (VGA or SVGA) output signal of a Host PC to digital form, KEY-VIEW II permits a remote user to view on virtually a real-time basis whatever is on the video output display, even in those cases where the Host PC is totally locked up.

Using KEY-VIEW II, remote support technicians can be instantly transported to a site that has failed as if they were on-site. KEY-VIEW II eliminates resulting downtime, technician travel time and permits scarce technical experts to be centralized and utilized efficiently.

Under the KEY-VIEW II remote control concept, a remote user simply calls the KEY-VIEW PC, using pcAnywhere, to take control of one or more Host PCs as if they are on site, non-intrusively, without any software or hardware installed in the Host PC(s). No special hardware other than a PC or laptop with a standard modem or LAN interface card is required by a remote user to access KEY-VIEW PC.

KEY-VIEW II has the necessary tools to remotely; restore normal Host PC processing in most cases. For example, KEY-VIEW II could be used to remotely view or change the CMOS setting on a Host PC. In cases where remote repair may not be possible (e.g. a hard drive is defective), KEY-VIEW II provides the necessary unrestricted access required to remotely determine what repairs (e.g. replace hard drive) will be necessary to restore normal Host PC operations.

Many network operating systems do not permit remote access software applications to co-exist with the network server's operating system. Even in cases where a server operating system may support remote access, many administrators don't permit remote access simply because the remote access software application degrades server performance. Moreover, because such application are always running in the background constantly testing for incoming calls, such applications increase the probability of causing server failures. If the server's operating system fails, the server's processor locks up for any reason, or the network cabling systems fail, the network administrator will not be able to determine the reason for the failure and effect repairs without having direct, on-site access to the server. However, if a KEY-VIEW II system had been installed, the network administrator would have been able to remotely access the Host unit, view what appears on the server's screen, physically take over the server's keyboard, control operations and/or cold boot the server, as required. KEY-VIEW II thus provides network administrators with unconditional access to any network server (Host PC) without requiring either CPU or Local Area Network (LAN) communications support from the Host PC or the network.

As an example of other uses for KEY-VIEW II, consider a company where each employee depends on a multi-port network communications server for remote access to their reference files. If one or more ports on the communications server should fail, remote access to the company's files and network would not be possible or would be haphazard. In such cases, simply rebooting the communications server remotely is not desirable because there may be other remote users on ports that are still operating properly, so "blindly" rebooting the communications server would immediately cut off their connection(s). Obviously, a network administrator must be in a position to take immediate corrective action, but may not be on-site. KEY-VIEW II permits administrators to remotely access and control the communications server immediately, as if they are physically sitting in front of the server.

KEY-VIEW II may also be used for more efficient remote maintenance of PCs. When a failure occurs, a remote maintenance center can take over the failed PC for purposes of running diagnostic procedures. In many cases the problem may be correctable remotely by the maintenance center, thus avoiding wasted technician travel time. At a minimum, KEY-VIEW II provides management personnel with the information necessary to know what parts and technician skill levels are required to make the on-site repairs before anyone is dispatched to the site.

As a final example, KEY-VIEW II may be used to remotely monitor user activities to significantly enhance corporate security. For example, a bank could connect a KEY-VIEW PC to each PC in a remote branch. Branch staff would have no way of knowing whether or not their PC and their activities were being monitored remotely. More importantly, the monitoring process would have no effect on the staff's normal PC operations.

Using the KEY-VIEW PC multiple PCs may be controlled remotely using a single phone line, LAN node connection or Internet Address. By adding supported third party switch boxes, the number of remotely accessible PCs can be increased further. Incredibly, with KEY-VIEW II full remote access is possible to remotely reboot a Host PC and watch it reboot while remaining connected to the Host PC.

KEY-VIEW II supports up to 256 colors and graphics resolutions up to 1024×768 and provides remote keyboard and mouse.

Within a KEY-VIEW PC a customer installs interface cards, each having the ability to capture the VGA/SVGA video output signal of a Host PC or supported third party switch box and display the Host PC's screen on the KEY-VIEW PC's screen on virtually a real-time basis. The KEY-VIEW PC also has the ability to redirect it's keyboard and mouse to control the Host PC, as if the KEY-VIEW PC's keyboard and mouse were directly connected to the Host PC. On this basis, when a remote user links to the KEY-VIEW PC via a single copy of pcAnywhere, it serves as a gateway to totally control any "Host" PC connected to it either directly or through an optional third-party switch box. On this basis a user may remotely control and switch between up to 48 Host PCs running any operating system or application without any special hardware or remote access software installed on any of the Host PCs.

KEY-VIEW II also integrates the functions of the so-called NET-911 Control Modules and KEY-VIEW PC Access Control Card into the KEY-VIEW custom hardware unit. That is, the KEY-VIEW II can be part of a unique family of NET-911 products. Each product in the family is designed to perform specific functions that further enhance the usefulness of the entire family, particularly for remote PC network administration purposes. The other products in the family, which are described and claimed in greater detail to follow:

1. Network Trouble Alert System.

That is the most comprehensive, versatile and failsafe method for detecting network failures and issuing alerts trouble alerts to network administrators.

Properly administering any network site requires a totally reliable means for monitoring servers and the environment 24 hours a day, 7 days a week. If a problem occurs, a fail-safe alert delivery system would also be essential.

Software based network monitoring systems currently exist in marketplace. One example is described in U.S. Pat. No. 5,566,339, which is incorporated herein by reference.

But, software based systems are not fail-safe. For example, monitoring stops without notification if the PC they are running-on fails or simply locks up. No known system has voice alert delivery capabilities. Moreover, these systems have no environmental monitoring capabilities. In this regard, most server failures are a direct result of either power failures or excessive heat buildup due to malfunctioning cooling systems.

The NET-911 Trouble Alert System is a total solution solving the short-comings of existing network monitoring products. The NET-911 system consists of software installed on a network workstation as well as a hardware unit connected to the workstation via a serial cable provided. NET-911 monitors the environment as well as an unlimited number of file servers (for example, Novell Netware or Windows NT servers) visible to the workstation over the LAN. In addition, when a particular server (that is serviced by the Trouble Alert System) is used as a gateway to another server operating system which is not serviced per se by the alert system, the non-serviced servers may also be monitored from the single Trouble Alert System.

The NET-911 System can issue pager and/or custom user recorded voice alerts over the telephone should (1) a network server fail; (2) power fail or be restored, (3) the temperature becomes too Hot or too cold; or (4) another monitored process fail (e.g. tape backup unit). To insure fail-safe processing, the hardware unit has its own redundant internal battery, microprocessor, and modem. This makes it possible to deliver alerts even when the workstation connected to the unit fails or loses AC power. Conversely, using software provided with the System, the workstation can be used to deliver failure alerts should the hardware unit fails. These safeguards make the Trouble Alert System excellent for reliable, long term, unattended, monitoring of Network sites.

Numerous other innovative features are also integrated into the NET-911 system. For example, should a server failure be detected, NET-911 automatically cold-boots the work station to which it is connected to confirm the failure. This extra step prevents false failure alerts from being issued. As a second example, NET-911 records what is said when a person alerted answers an alert call and stores this recording on the workstation's disk drive. This recording serves as a perfect audit trail to prove the alert was delivered. The NET-911 hardware unit also has two adapter ports that be used to optionally detect water, smoke and intruders.

The NET-911 system compliments the capabilities of the KEY-VIEW II system by automatically alerting designated person(s) that a problem has been detected on a network. Then, the KEY-VIEW II system could be used to immediately deal with the problem at hand.

2. Control Modules.

These are unique devices permitting remote power control and serial access to an unlimited number of PCs or other devices, such as routers, printers, copy machines, etc. Unlike other remote power control products that require their own phone line, NET-911 modules can be chained together and connected to the serial port of any PC previously set up for remote access NET-911 Control Modules permit remote power control and serial access to an unlimited number of PCs or other devices, such as routers, printers, copy machines, etc. Unlike other remote power control products that require their own phone line, NET-911 modules can be chained together and connected to the serial port of any PC previously set up for remote access. "Module Management Software" supplied with NET-911 modules may then be installed on this "Management PC" and remotely activated whenever necessary to control power and serial access to up to 250 devices connected to the PC's serial port. For sites using KEY-VIEW II, the modules would be connected to the serial port of the KEY-VIEW PC to provide serial access and power control to all Host PCs connected to the KEY-VIEW PC.

Low cost NET-911 modules may be used for numerous practical purposes. For sites with KEY-VIEW units connected to third party supplied switch boxes, NET-911 modules may now be used to transfer files and reboot PC's connected to the switch box. For other sites, NET-911 modules may be used to serially manage and control power to other PC's or routers.

The Management PC may be accessed remotely using any commercially available software package, such as pcAnywhere, Remotely Possible, Carbon Copy, etc. The Management PC simply serves as the gateway to individually serially access other devices, such as routers or PCs, for management, file transfer or AC power control purposes. Most third-party, remote control, software packages will support remote access to a Management PC via the phone line, LAN and/or Internet.

Each NET-911 module has one "DATA IN" and one "DATA OUT" port permitting up to 250 modules to be daisy-chained together using inexpensive standard, 8 wire, straight-through, flat cable. The first module on the daisy-chain connects directly from the DATA IN port to any standard serial port on a Management PC, using a special serial port interface connector (RJ-45 to DB-9) supplied. Other modules may be added to the chain by connecting the DATA IN port of the module added to the DATA OUT port of the last module on the chain. Modules are addressed by the NET-911 Module Management Software (running on the Management PC) based on the order (i.e. physical sequence) that each module is installed on the daisy-chain. For example, the module directly connected to the Management PC's serial port would be Module ID 1, the module connected to module ID 1's DATA OUT port would be addressed as module ID 2, and so forth.

Using the Module Management Software provided, each module on the daisy-chain may be individually selected (i.e. designated as the Active module). When a module is active, any device connected to that module's SERIAL port may be serially accessed, as if that device were the only serial device connected directly to the Management PC. To avoid serial conflicts between devices and modules only one module on the daisy-chain may be active at any point in time. The active module may be changed at any time from a remote location using the Module Management Software.

A NET-911 module has one power input cord and one power output receptacle. AC power input is obtained from any AC power source, such as a wall outlet or UPS. AC power passes through the module to the device connected to the module's three prong power output receptacle. Power to more than one device may be controlled by connecting any commercially available power strip having multiple receptacles to the power output receptacle on the module. When a module is accessed from the Management PC (using the Module Management Software provided), power may be turned ON or OFF to those device(s) obtaining AC power from the module's power output receptacle.

Each NET-911 Control Module also has a single "SERIAL interface port". This port permits a device (such as a PC, router, printer, etc. that can be controlled or managed serially) to be connected to the module using one of the RJ-45 to DB-9 serial interface adapters provided. On this basis, when the module on the daisy-chain is addressed by the Management PC (using the Module Management Software provided), it appears as if that device is the only device serially connected to the Management PC.

Even though there may be hundreds of modules daisy-chained together, only one module may be addressed (i.e. active) at a time by the Module Management Software provided. This approach permits unrestricted serial communications between the Management PC and whatever PC (or other device) is connected to the selected module's SERIAL port. Moreover, NET-911 modules have been designed so that there is no interference or creation of any special data packets that would in any way degrade serial performance when communicating with a device connected to a module's serial interface.

Using the Module Management Software provided, each module on the daisy-chain may be individually selected (i.e. designated as the Active module). When a module is active, any device connected to that module's SERIAL port may be serially accessed, as if that device were the only serial device connected directly to the Management PC. To avoid serial conflicts between devices and modules only one module on the daisy-chain may be active at any point in time. The active module may be changed at any time from a remote location using the Module Management Software.

There is also a supported mode where none of the modules on a daisy-chain are addressed. In this mode the serial signal just passes through to whatever is connected to the end of daisy-chain. This mode is referred to as the "Serial pass-through" mode. For example, in this mode a Management PC could communicate with a serial printer or modem connected directly to the DATA OUT port of last module on the daisy-chain, as if no modules existed. To make this direct connection to the device connected to the last module on the chain, either (1) a special optional RJ-45 to DB-9 connector is required or (2) a null modem connector MUST be placed between a standard NET-911 RJ-45 to DB-9 module connector and the device's serial port.

Unlike many power control products on the market, NET-911 modules remember the current status of output power even in cases where power fails to the module itself. This is important in an emergency situation. For example, this feature allows a user to turn OFF power permanently to devices at a remote site to prevent resulting temporary power outages from damaging the hardware at the site. In this case many devices on the market improperly reset and turn power back ON to devices at the site if power fails to their module. In contrast, NET-911 will insure power remains OFF in this example until power is turned back ON by a remote user.

3. KEY-VIEW PC Access Control Card.

These cards log caller ID and restrict access to a KEY-VIEW PC based on the caller's ID. Also, they permit rebooting of the KEY-VIEW PC remotely.

Each KEY-VIEW PC can include a unique ISA "Access Control Card" designed to permit the KEY-VIEW PC to be remotely reset, to capture the caller's ID, issue pager alerts when intruders are detected and to control the KEY-VIEW PC's turbo light.

When the Reboot card is installed, a phone line is connected into a "PHONE IN" jack on the back plate of the card. A "PHONE OUT" jack permits the pass through of the phone signal to either a telephone or a modem, as necessary.

When a call is received, the card captures the caller's ID and passes any ID received to the KEY-VIEW II application running on the KEY-VIEW PC. Using the Caller ID menu option, the KEY-VIEW PC could then be optionally configured to only accept calls from a pre-specified list of phone numbers to improve security. In addition, capturing the caller's ID permits logging the phone number of anyone attempting to remotely access the KEY-VIEW PC.

Each access control card is connected either to the PC's internal reset switch or to an optional external NET-911 Control Module to permit the reset card to reboot the KEY-VIEW PC when instructed by a remote user.

The Access Control Card has the capability to count incoming rings and thereby permit actions based on the number of rings detected. If less and/or more than a user specified number of rings are received, the card may be configured to reboot the KEY-VIEW PC.

Rebooting the KEY-VIEW PC remotely is necessary in the event the KEY-VIEW PC should ever lockup (i.e. not respond when a user attempts to access the KEY-VIEW PC remotely). The reset card monitors all incoming phone calls and can be configured to reboot the KEY-VIEW PC in the event less a user defined number of rings are detected or more than a user defined number of rings are detected.

When a modem is installed in the KEY-VIEW PC, it is possible that the modem answers a call but either the KEY-VIEW II and/or the remote access engine is locked up. In this case it will be necessary to remotely reboot the KEY-VIEW PC. In order to do this the remote access engine can be configured to instruct the modem to answer a call only after four rings. Then, the KEY-VIEW II "Enable Reboot when less than "n" rings" is set to, for example, 2 rings. Using these settings, a remote user simply calls the KEY-VIEW PC and hangs up after one ring, thereby causing the KEY-VIEW PC to reboot.

The Access Control Card also supports a variation of the "reboot on less rings" option where a touch tone code (up to eight digits) may be entered by a remote caller after the modem answers a call to cause the KEY-VIEW PC to reboot.

It is also possible that when the KEY-VIEW PC locks up the modem locks up too and does not answer a call at all. Also, in cases where no modem is installed in the KEY-VIEW PC but the KEY-VIEW PC is accessed remotely either via a LAN or the Internet, it may still be necessary to use a phone line to remotely reboot the KEY-VIEW PC should it lockup. Both of these problems can be solved by setting the Enable Reboot when more than rings option to 10 rings. In this situation, a remote user would simply call the KEY-VIEW PC and wait for more than 10 rings before hanging up thereby causing the KEY-VIEW PC to reboot.

In rare cases, it is possible that a modem installed in the KEY-VIEW PC could lockup and hang onto a phone line, so that the line was always busy when a remote user attempts to access the KEY-VIEW PC. In addition, one remote user may wish to terminate another remote user's access during an emergency situation. Both of these situations can be resolved by connecting an external modem to the RJ-45 serial port of the Access Control card (using an optional connector and RJ-45 cable) and connecting a second (different) phone line to this modem. Any surplus external modem may be used for this purpose, since this modem will never operate above 2400 baud. In cases where a NET-911 Control module is already connected to the Access Control Card's serial port, the modem should be connected to the "Data Out" port of the module. This modem would then be configured to be in an auto-answer mode. Then, the option to use an external modem must be enabled and a password defined, as discussed under the Enable Modem Reboot topic. In this situation, a remote user would simply use a terminal emulation program such as Hyperterminal (supplied with Windows) to call the external modem and enter the correct password when prompted by the access control card thereby causing the KEY-VIEW PC to reboot.

An Access Control Card also has the capability to issue pager alerts in the event a potential intruder is detected. Such pager alerts would be appropriate if a user fails to enter a correct password within a pre-specified number of guesses or a caller ID is detected from an unauthorized phone number. The person to be alerted via their pager and the related pager codes can be defined using the Pager Alert menu option. In order to issue a pager alert an optional external modem must be connected to the Access Control Card.

The Access Control Card is also used to control the turbo light on the KEY-VIEW PC's front panel via a cable connected from the card to the KEY-VIEW PC's mother board's turbo light control pins. The turbo light is then used to visually indicate when a remote user was accessing the KEY-VIEW PC and to indicate whether the KEY-VIEW PC was in Host mode or a Menu mode.

The KEY-VIEW PC's turbo light is OFF when the KEY-VIEW PC is in a Menu mode and is not being remotely accessed. The KEY-VIEW PC's turbo light will be ON when the KEY-VIEW PC is in a Host mode and is not being remotely accessed. This light will flash ON briefly whenever the KEY-VIEW PC is in a Menu mode and is being remotely accessed. If the KEY-VIEW PC is in a mode where both pcAnywhere is "In Session" and the KEY-VIEW PC is in a Host mode, the turbo light remains ON but then flashes OFF for 0.5 seconds every 5 seconds.

Setting the turbo light in this manner coupled with the user beep option, which is handled by the KEY-VIEW application running on the KEY-VIEW PC, will improve security by giving anyone working at the Host site a visible and audible indication whenever the KEY-VIEW PC is being remotely accessed.

In summary, the preferred embodiment of the present invention provides:

Support for 2, 4, 16, 256 or other numbers of colors in 640×480, 800×600, 1024×768 or other graphics modes;

Remote access support for modem access, LAN Access, direct serial/parallel cable access and/or TCP IP Internet access (i.e. up to 2 paths may be activated for remote access to the Host site;

Full integration of a remote access engine at Host and Remote sites;

Standard operating system installation on the KEY-VIEW PC which insures plug and play modem capability and LAN interface between Host and Remote sites;

Capability to control multiple Host PCs from a single KEY-VIEW PC using multiple KEY-VIEW PCI cards in the KEY-VIEW PC;

Support for third party switch boxes permitting a single KEY-VIEW PCI card to access multiple Host PCs;

Mouse support for controlling Host PCs from a Remote PC,

Integration of KEY-VIEW II compatible NET-911 Control Modules permitting remote AC power control and direct serial access to an unlimited number of devices at a Host site that can be managed serially (such as routers or network hubs) using the KEY-VIEW PC as the gateway; and Use of a single KEY-VIEW PC to control any combination of up to 4 Host PCs or switch boxes.

Glossary of Terms

The following terms have the following meanings, as used in the description and claims:

| | |
|---|---|
| Remote PC | Refers to the PC used to call a KEY-VIEW PC to initiate a remote access session. |
| Local PC | Same as Remote PC. Used in cases where narrative relates to a Remote user who would naturally view a Host PC technically as the "remote PC." |
| KEY-VIEW PC | Refers to the PC that accepts the call from the Remote PC and acts as a gateway to a desired Host PC or to NET-911 Control Modules that control power and serial access to any device including PC's, Router's, etc. |
| Active Host PC | Refers to the Host PC that the KEY-VIEW PC is currently controlling. Even though a KEY-VIEW PC can control multiple Host PCs either via (1) an external PC switch box connected to a KEY-VIEW PCI card or (2) multiple PCI cards, only one of these PC's can be controlled at any point in time. That PC which is currently being controlled is referred to as the "active PC." |
| Active PCI Card | Since multiple PCI cards can be installed in a KEY-VIEW PC, the active PCI card refers to the PCI card that is currently selected for access by the KEY-VIEW APP. |
| KEY-VIEW Unit | The first generation custom designed KEY-VIEW hardware device (i.e., black box) that permitted remote access to a Host site. This KEY-VIEW unit is now being replaced with the KEY-VIEW PC. |
| Host PC | Refers to any PC that can be controlled by the KEY-VIEW PC. |
| Host Site | The location of a KEY-VIEW PC including all Host PC's connected to that KEY-VIEW PC. |
| KEY-VIEW APP | The software running under the KEY-VIEW PC's Windows 95 operating system necessary to interface with the PCI APP and BOOT APP software to satisfy the KEY-VIEW PC's operational requirements. No custom software exists on the Remote PC because all remote access requirements will be satisfied by the pcAnywhere Remote application software. |
| BOOT APP | Each KEY-VIEW PC will have one power control ISA card. The BOOT APP will be the software operating system on this card that communicates with the KEY-VIEW APP and any optional power control module on the daisy chain connected to the card. An unlimited number of power modules may be daisy-chained together via standard 9-pin serial cable and connected to a standard serial port on the KEY-VIEW PC. The BOOT APP will further permit serial pass-through access by the KEY-VIEW PC to each boot module. Finally, this APP permits resetting the KEY-VIEW PC via an interface from the "PHONE" RJ-11 connector to a phone line based on either the number of rings or based on touch tone pressed after the KEY-VIEW modem answers a call. |
| KB/MOUSE APP | The KEY-VIEW PCI Card will have a separate keyboard/mouse microprocessor (APP) that will accept input from the PCI APP representing user key presses, mouse pointer X/Y position on the screen and mouse button press/releases received from the KEY-VIEW APP. The KB/MOUSE APP will process this information and provide the necessary keyboard mouse interface to the active Host PC. In certain cases this KB/MOUSE APP will communicate information back to the KEY-VIEW APP (via the PCI APP). For example if the active KEY-VIEW PCI card is connected to a switch box, the switch box will normally return status information to the KB/MOUSE APP whenever a switch occurs to a new PC connected to the switch box. This information would then be passed from the KB/MOUSE APP back to the KEY-VIEW APP so user switching between Host PCs can be confirmed. |

Variations of the above terms may be used, such as 'Remote Mouse' to refer to the mouse connected to the Remote PC, 'Remote User' to refer to the person operating the Remote PC, "Remote site" to refer to the site where the Remote PC is located, etc.

BRIEF DESCRIPTION OF THE DRAWINGS

FIGS. 13 through 27 are example graphical user interfaces in accordance with example embodiments of the present invention;

DETAILED DESCRIPTION OF THE PRESENTLY PREFERRED EMBODIMENT

Figure 28:
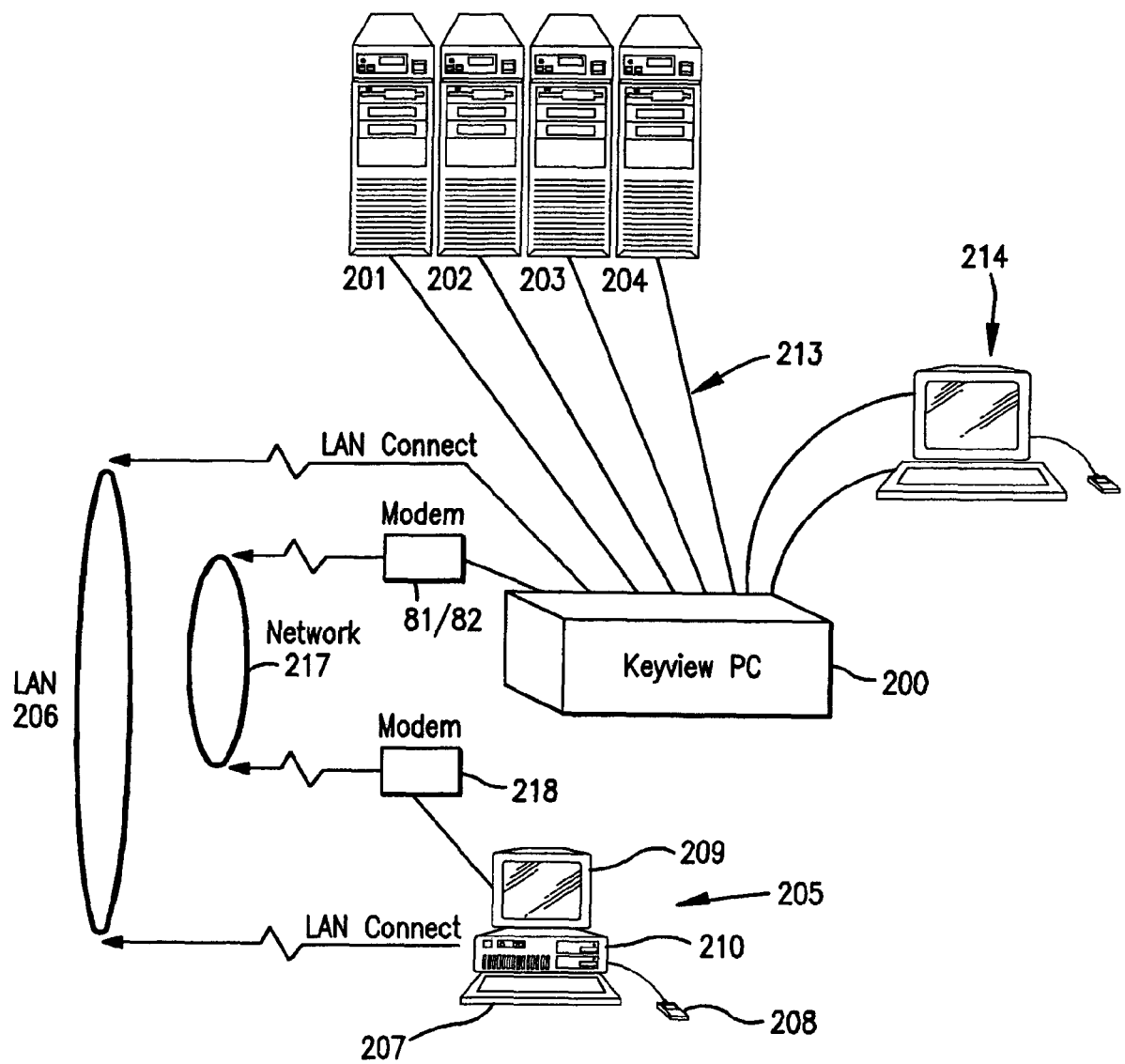
FIG. 28 is a schematic diagram of an example embodiment of the present system configuration.

The preferred embodiment of the present invention is described with respect to a host site and a remote site, an example of which is shown in FIG. 28.

The KEY-VIEW II Host Site consists of a KEY-VIEW PC connected to one or more Host PCs. A remote user can access an unlimited number of KEY-VIEW II Host sites using the remote access engine (preferably pcAnywhere).

Using KEY-VIEW II customers completely avoid the upgrade costs typically associated with software based solution as the Host PC's operating system changes. KEY-VIEW II is independent of the type of operating system running on the Host PC, since there is no KEY-VIEW II software running on the Host PC A typical preferred KEY-VIEW II PC has 4 PCI and 4 ISA slots and includes the following hardware components:

IBM Compatible keyboard
Microsoft Compatible serial mouse
SVGA Monitor
1 to 8 KEY-VIEW PCI Host PC interface cards (All cards share an IRQ)
1 ISA Access Control card
1 SVGA ISA graphics card (capable of switching graphics modes via Windows without rebooting)
1 ISA modem card
1 LAN Interface Card
1 serial port for use by the mouse
11 serial port for use by NET-911 Control Modules
1 parallel port for use for file transfers between the KEY-VIEW PC and Host PCs Using a LAN approach to remotely access the KEY-VIEW PC results in the fastest screen refresh rates and is the preferred remote access approach. In cases where the LAN link has failed, a modem is typically used as a backup means to assure failsafe access to a KEY-VIEW II Host site in an emergency situation.

Each KEY-VIEW II PCI card may be connected to either a Host PC directly or to multiple Host PC through a supported third party switch box. If a switch box is connected to the PCI card, the switch box must permit keyboard controlled switching between PCs connected to the switch box and deliver a consistent, high quality video signal to the PCI cards video input port. Most high end commercially available KVM switch boxes supplied by companies such as Cybex meet this criteria. In other embodiments, switch boxes are cascaded to one KEY-VIEW II.

Ideally, the video switch box used with the KEY-VIEW II employs switching between PCs accomplished using a standard IBM compatible keyboard connected to the switch box. The quality and stability of the switch box video output signal should be sufficient for KEY-VIEW PCI card to capture a clear, consistent video signal from the active Host PC.

The KEY-VIEW PC includes three application software packages, namely pcAnywhere, NET-911 Control Module system and the KEY-VIEW II system. Preferably, no other software applications are installed or operated from the KEY-VIEW PC.

A KEY-VIEW PC must be equipped with at least one means for remote access. It is recommended that two access modes be installed in case one of the means for remote access has failed.

Typically, users install a LAN card and a modem or Internet TCP/IP server interface in the KEY-VIEW PC. LAN access is then normally used as the preferred means for remote access because of the significantly faster response times. In the event the LAN fails then the remote access could occur via a modem or Internet connection. The Possible means for remote access to the KEY-VIEW II PC are as follows:

Internal or external Modem (57.6 baud rate Suggested)
TCP/IP Internet Server
Local Area Network Interface Card (NetBios, SPX or Banyan Vines) uDirect Connection to KEY-VIEW PC's Parallel Port—Using SPECIAL pcAnywhere cable Interface
Direct Connection to KEY-VIEW PC's Serial Port—Using a Null Modem Cable
IDSN via CAPI 2.0

A total of eight feature cards slots (4 ISA and 4 PCI) are typically available in the KEY-VIEW PC. The suggested use of these slots is an follows:

ISA Slots:
1—SVGA card
1—LAN Interface Card
1—Modem Card
1—KEY-VIEW Access Control Card PCI Slots:
Up to 4 KEY-VIEW II Host PC Interface Cards
Preferably, the PCI slots are reserved for the KEY-VIEW II cards even if 4 cards are not initially installed in the system. Often users find they want to install additional KEY-VIEW PCI cards. Reserving the PCI slots for this purpose avoids the need to reconfigure the operating system if other PCI feature cards need to be changed to ISA cards.

Each KEY-VIEW PCI card has the necessary Host PC VGA/SVGA analog to digital conversion hardware, Host PC keyboard interface, and Host PC mouse interface. One or more of these PCI cards (up to a total of eight cards) may be inserted into the KEY-VIEW PC so that a single KEY-VIEW PC could control one or more Host PC's or PC switch boxes. To avoid using up available interrupts, PCI cards share the same addresses and IRQs. Each PCI card contains a 3 position DIP switch necessary to set the card ID from 0-7.

As mentioned, each PCI card could optionally be connected to a supported switch box, which in turn may be connected to multiple PCs. Based on special keyboard sequences entered, a supported switch box can be remotely instructed to switch between Host PC's and pass the selected Host PC's keyboard, mouse, serial and video interfaces to the KEY-VIEW PC's PCI card. For example, a switch box could be connected to 3 PC's where PC (1) is running a DOS text mode, PC (2) is running a 640×480 graphics mode and PC (3) is running a 1024×768 graphics mode. In this example, a remote user could click a menu option on the KEY-VIEW PC's screen to tell the switch box (via special keyboard key sequences) to switch from PC (2) to PC (3). Special unique KEY-VIEW II software interfaces to the operating system insures the KEY-VIEW PC automatically adjusts to different graphics modes on the fly, so that the KEY-VIEW PC's screen always mirrors the contents of a Host PC's screen on a full-screen basis.

Each KEY-VIEW PC also requires one ISA KEY-VIEW Access Control Card. This card permits a remote user to reboot (via the Reset button's circuit) the KEY-VIEW PC in event the KEY-VIEW PC should ever lock up. An RJ-45 interface port is on this card that could be connected to an optional NET-911 Control Module to further permit cold booting (i.e. cutting AC power) to the KEY-VIEW PC from a remote location. Furthermore, this card may be used to control one of the status lights (normally the turbo light) on the front of the KEY-VIEW PC so that personnel at a Host site have a visible indication whenever someone is remotely accessing the KEY-VIEW PC (i.e. the light would be lit). Finally, any calls to a modem in the KEY-VIEW PC must first pass through the phone line interface IN/OUT ports on this card. This approach permits the card to capture the caller's ID (i.e. telephone number) from the phone line. Using this caller ID, the card could limit any remote user's modem access to the KEY-VIEW PC's as well as a remote user's KEY-VIEW PC reboot options based on the caller's ID. Accordingly, this call ID information can serve to increase the level of security and remote access to the KEY-VIEW PC.

One of the standard serial ports of the KEY-VIEW PC is normally used to provide a serial interface to up to 250 NET-911 Control Modules. These modules may be daisy-chained together to permit a remote user to cold boot Host PCs or any other devices at a Host site. In addition, the modules also permit a remote user to serially access the device connected to the module, as if that that device were the only device directly connected to the Host PC's serial port.

This feature is extremely useful by allowing the KEY-VIEW PC access to devices that can be remotely managed serially, such as routers, or as another avenue to permit file transfer to a Host PC.

Next, a KEY-VIEW II PCI hardware card and its internal circuit interactions are described. The chief parts of the Key View II card are the FPGAs (Field Programmable Gate Arrays) and the on-board CPUs. The card has three main functions: the video capture circuit, the keyboard/mouse circuit, and the serial port circuit. The card is designed to interface with a PCI bus architecture.

Figure 1:
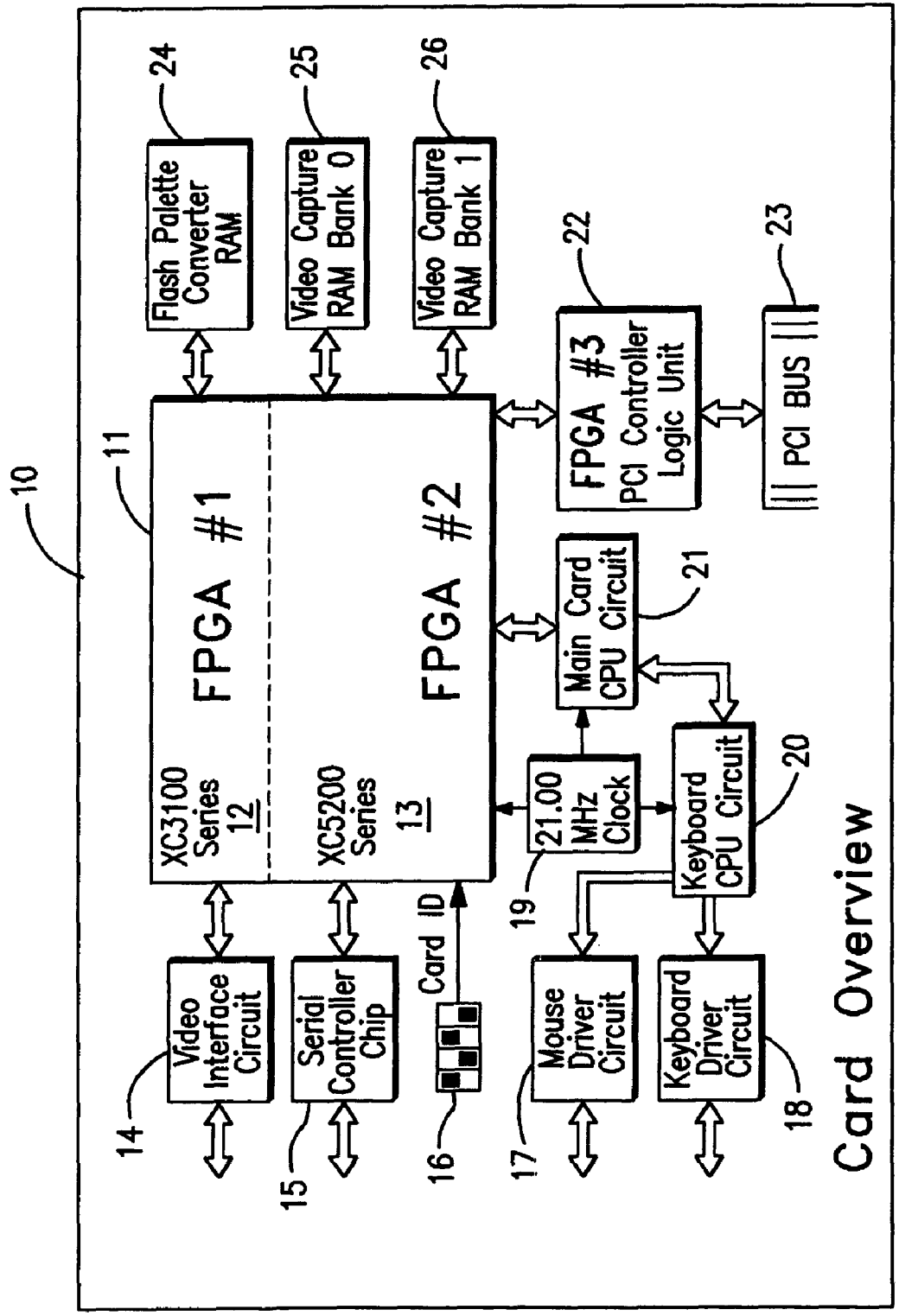
FIG. 1 is a schematic block diagram of an example PCI card in accordance with the present invention.

As shown in FIG. 1, the card is primarily designed around two FPGAs, preferably, of the Xilinx XC3100A family, which operate over 80 MHz. The other is the main FPGA and is a standard Xilinix part.

On the KeyView PCI card 10, the FPGA 11 is surrounded by several different circuits. These include the video interface circuitry 14, the serial controller chip circuitry 15, mouse and keyboard driver circuits 17 and 18, the keyboard and main card CPU circuits 20 and 21, the dock 19, the flash palette converter RAM 24, the video capture RAM 25 and 26, and the PCI bus controller chip 22 communicating with PCI Bus 23. Card ID switch 16 is also included.

Figure 2:
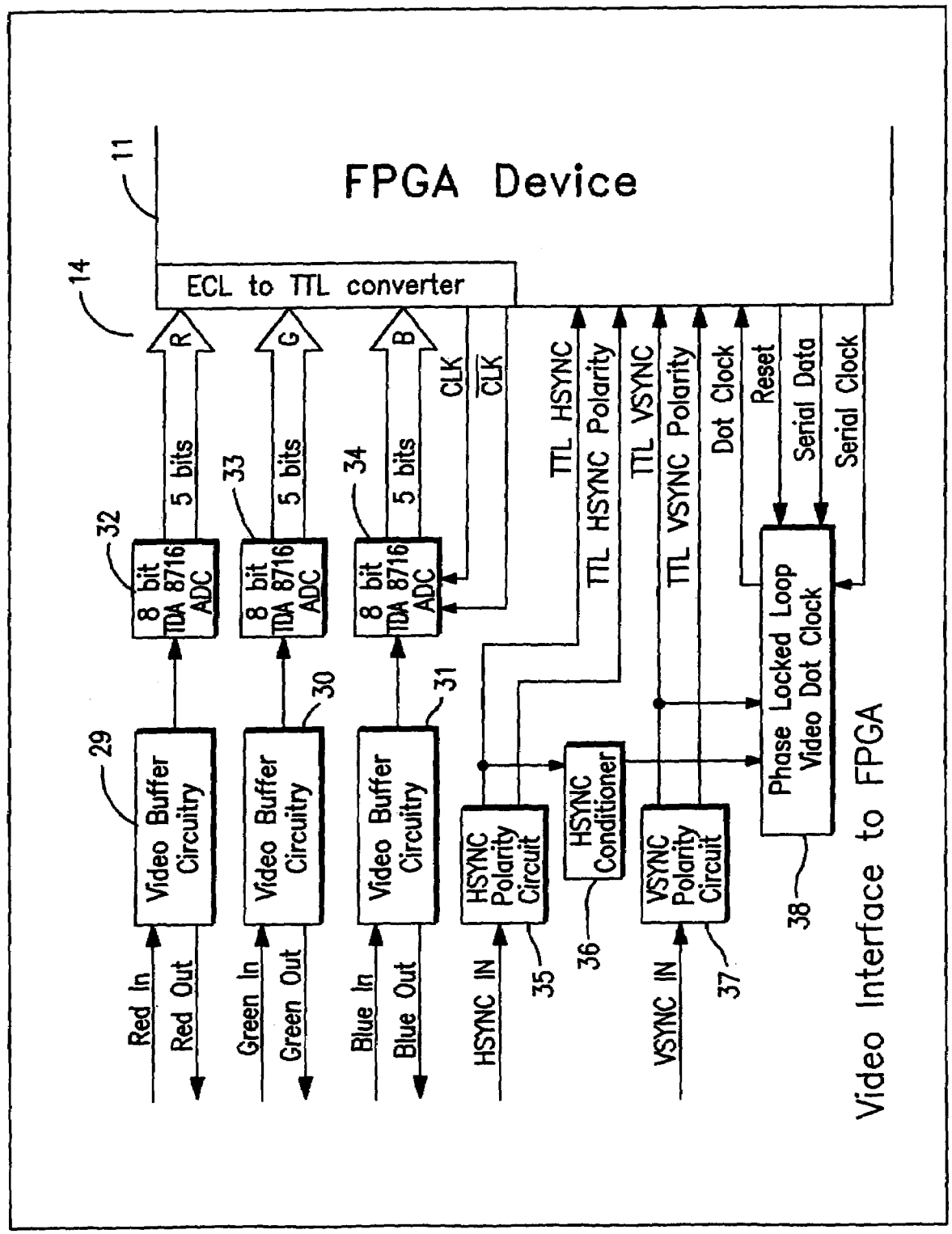
FIG. 2 is a schematic block diagram of the video interface example embodiment of the present invention.

FIG. 2 illustrates the video interface circuitry 14 to the FPGA 11. Three sets of video buffer circuits 29-31 contain video amplifiers that boost the video and send it back out to the VGA display. These circuits 29-31 also provide noise and level conditioning to accommodate the ADCs 32-34, which expect the analog signals to be within the bounds of known voltages.

After the raw video has been properly conditioned, the analog color signals drive three Analog Devices AD9012 flash analog to digital converters 32-34. These circuits convert the input voltage to an output 8 bit digital value using flash conversion technology whereby the reference signal is divided by an internal resistor voltage ladder into 256 individual steps. These voltage steps are simultaneously compared to the input signal by 256 separate analog comparators. By comparing all possible values at once, the chip can operate at up to 100 MHz.

Although the ADC chips output 8 bits the PCI card requires only 5 bits for each color. Thus, the 3 least significant bits are discarded yielding 15 address bits. The combination of the Flash Palette Converter RAM discussed below and the process of discarding the three least significant bits of the video signal make the captured video extremely stable.

The sync pulses, Hsync and Vsync, from the video signal are conditioned and fed into the main FPGA 11. Both of these signals are polarity coded so that older monitors (non-multisync) will know what mode the VGA card was sending. This means that the signals might either be negative or positive pulses. Since TTL level signals are needed for the FPGA, these random polarity signals must be converted to positive TTL level signals. But before that is done, the polarity itself needs to be converted to a TTL level signal and also fed into the FPGA. Therefore, the sync conditioning circuits 35 and 37 will output four TTL lines—two sync pulses and two polarity pulses. The FPGA will latch the polarity pulses internally to form two stable polarity bits (see FPGA registers).

The FPGA also does some additional processing of the video sync pulses. Because the software needs to know the exact video frame rate, the FPGA has a small frequency counter that counts the number of Vsync pulses in a second and stores that value in an FPGA register. Another FPGA counter counts the number of Hsync pulses in between Vsync pulses. This value is also stored in another FPGA register.

The Hsync pulse is fed to conditioner 36 and PLL 38. Some video cards will blank this signal after the end of active video. For physical monitors, this is not a problem; however, for PLL circuits, it can cause the output frequency to drift. Most PLL circuits require a stable reference frequency or else they will become unstable. Some PLL chips, such as 1C51522 PLL chip, have the necessary circuitry to ignore the missing Hsync pulses. The output of the PLL becomes the dot clock for the video. Each pulse from this dot clock should line up exactly with the center of each dot on the video signal. Therefore, the PLL includes a method for adjusting the phase of the output dot clock and for supporting the various number of video line lengths, i.e. 640, 800, 1024, etc.

Figure 3:
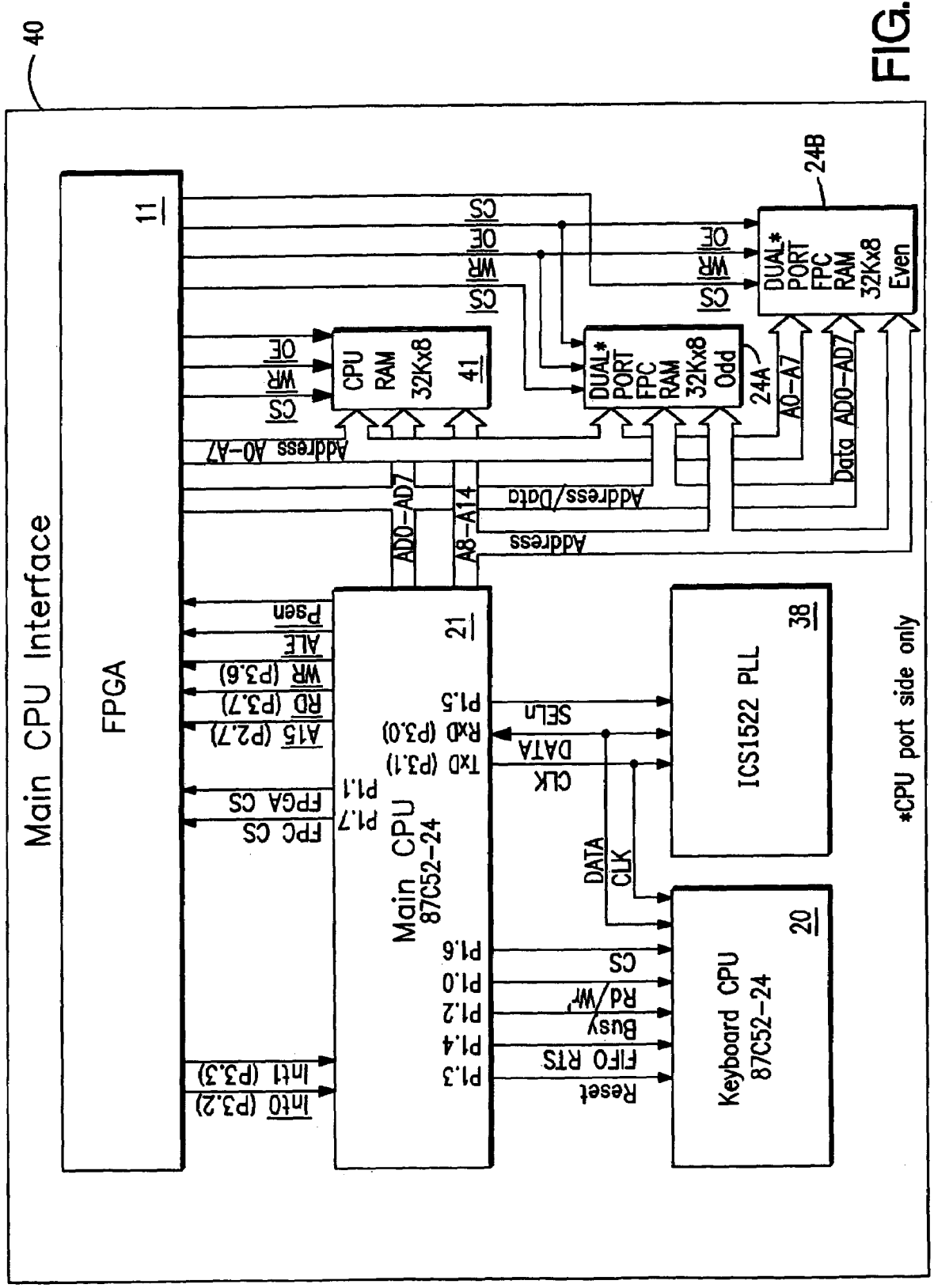
FIG. 3 is schematic block diagram of the main CPU interface in accordance with an example embodiment of the present invention.

As shown in FIG. 3, the Keyview PCI card uses two separate CPUs for embedded processing, the main CPU 21 and keyboard CPU 20. The keyboard CPU interface has no external memory so most of its I/O pins are free to do other things. Two ports of the keyboard CPU are used to control the two mice and the keyboard and the other ports 0 and 2 are used to communicate with the main CPU and serial EEPROM.

The interface of the main CPU 21 to the card includes external program RAM memory 41 holding some program code for the microprocessors. The instruction fetch and data read/write signals from the CPU are merged by logic in the FPGA to allow the CPU to execute code from the RAM.

The RAM is mapped to the last 32K of the CPU's address space. This guarantees that the bootstrap program that is in the EPROM inside the CPU will receive control on reset before the RAM does. Using software techniques, the actual program is loaded into the RAM by the bootstrap program. With this done, control is transferred to the program in the RAM after IPL.

The main CPU 21 is also capable of addressing the FPGA registers 11 and both of the Dual Port Flash Palette Converter RAMs 24A and 24B. These are all mapped into the first 32K of the data storage space of the main CPU. This is possible since the CPU treats data memory differently than program memory. To prevent conflicts between the FPGA registers and the Flash Palette Converter RAMs (which are all mapped to the same location and bank), two special device select bits are output directly from the main CPU. These I/O lines select the device that will be addressed when the CPU accesses the lower 32K of its data memory address space.

The main card CPU 21 has a watchdog feature that will reset the CPU if it does not respond to it within a certain amount of time. The keyboard CPU 20 does not have any such automatic circuitry. Instead, the reset line to the keyboard circuit is controlled by the main card CPU directly. This keeps the main CPU from locking up indefinitely.

The address latch is, in practice, usually an external 74L5373 or equivalent. Because the inputs to this chip are needed by the FPGA 11 to access the FPGA registers, this latch function is implemented in the FPGA. The ALE is input to the FPGA latch strobe and, in response, the Q outputs of the latch are output. Using this configuration, up to 256 individual registers may be addressed inside the FPGA.

CPU Considerations

The CPUs are two 87C52-24 microprocessors running parallel in a master/slave arrangement from the main and keyboard CPUs 20 and 21. They will both run from the same 22.1184 Mhz clock supplied by the keyboard circuit. The main card CPU 21 sends commands and data to the keyboard CPU in a serial fashion. The keyboard CPU 20 will have a program that simply sends codes to the keyboard and mouse as it is told to do so by the main CPU 21. The main card CPU 21 has bootstrap code which controls its IPL. The main program is housed in RAM and has a jump table at a fixed address so that whatever program is running will know how to call the library functions. This way, many of the library functions can be incorporated into the extra space of the EPROM and then overwritten if they become obsolete. Likewise, the inter-CPU communication routines can be shared between the keyboard CPU program segment and the main card CPU program segment.

Figure 4:
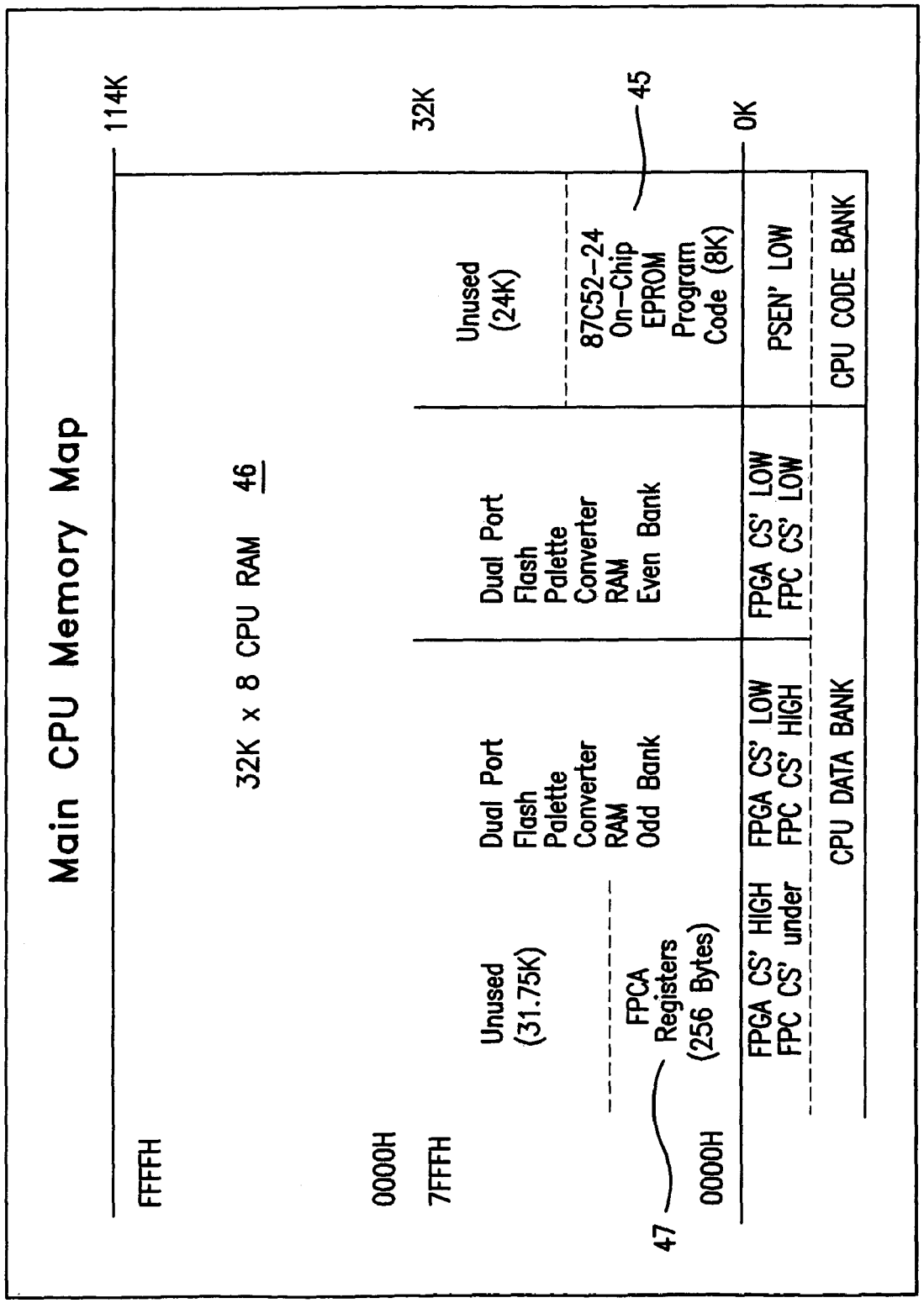
FIG. 4 is a main CPU memory map in accordance with an example embodiment of the present invention.

The main memory map is shown in FIG. 4. Rather than keeping the RAM (data) and ROM (code) address spaces separate, in this design, a RAM program storage area is needed to facilitate program uploading, meaning that the RAM chip is mapped to both the RAM and the ROM areas of the upper 32K of each address space. In this design, a bootstrap program is burned into the internal EPROM 45. It is 8K in length and is mapped starting at ROM address OQOQH and cannot be accessed using RAM reads. On power up, the bootstrap code will have control.

Shortly after power up, the KV-APP will load the main card CPU's RAM with it's program, called an IPL (Initial Program Load). The RAM is mapped to 000H-FFFFH in both RAM and ROM address spaces 46 of the main card CPU. The RAM is a 32K ×815 ns chip or better. The program in the keyboard CPU is fixed and cannot be overwritten by the KV-APP.

The CPU's can be mask programmed, OTP programmed, or EPROM programmed. It is important that the security bits on the CPU not be set in a way that would prevent external code from executing. To maintain maximum usability and high security, an Intel 87C52BH series microprocessor may be used. It is highly likely that both the keyboard and the main card IPL code will be combined into the same EPROM program space. On power up, the CPU would determine if there is any external RAM attached to it. If so, the device will run the main card CPU code. If not, the device will assume the personality of the keyboard CPU. Currently, the keyboard process is allocated 25% of the total EPROM space and the main process is allocated 75%. In the currently selected 87C52-24 chip there is 8K of EPROM which translates to 2K for the keyboard process and 6K for the main process.

After the IPL of the main CPU RAM, the KV-APP will instruct the main card CPU to begin executing the RAM program. The RAM program contains extra code and functionality that the bootstrap program does not.

Serial Bus

The serial I/O pins, RxD (data) and TxD (clock) of the main card CPU 21 communicate serially with its peripheral devices. The serial lines (Clock, Data, and RD/WR [P1.0]) are bussed to all the serial devices. The CPU 21 also Outputs individual device select lines for each device. The serial devices ignore their inputs (clock, data, and RD/WR) until they receive a high level on their device select (CS) input. No device is allowed to output any signal until it is selected and must change all of it's outputs to a high impedance state when it is not selected. The PLL 38 is a special case. With it, the RD/WR pin is not used, and the Read/Write function is incorporated into the data stream.

No serial device will ever initiate any communication with the main card CPU, not even if it is selected by the device select lines.

The keyboard CPU has a private EEPROM chip attached to it so the keyboard circuit can access the EEPROM data while the remainder of the circuit is powered down.

Keyboard CPU Serial Access

The keyboard CPU must be accessed serially. It does not have any registers that are directly accessible, but uses a command approach instead. With this approach, the number of bytes to and from the device are variable depending on which command is executed. The first byte that is written to the keyboard CPU is the COMMAND byte. Some example commands include:

| CODE | COMMAND | Action |
|---|---|---|
| 00000000 | NOP | No Operation |
| 01000000 | RESET | Reset the keyboard CPU error flag |
| 00000100 | QUERY STATUS | Copy the status register to the output register |
| 01000100 | READ FIFO | Copy the top FIFO byte to the output register |
| 00000001 | MOUSE TYPE | Change the mouse hardware type (next byte) |
| 01000001 | SEND KEY | Send a byte to the keyboard (next byte) |
| 10000001 | SEND MOUSE | Send a byte to the mouse (next byte) |
| 11111101 | READ PROM | Move an EEPROM byte to the output register |
| 11111000 | ENABLE WRITE | Enable a WRITE PROM as next command |
| 11111010 | WRITE PROM | Writes a byte to the EEPROM |

All read operations on the keyboard CPU 20 will read the contents of the CPU 20 output register. This register is set by certain commands and may be read multiple times without affecting its contents. The lower three bits of the keyboard command codes have a special meaning. The two LSBs (bits 1 and 0) always indicate the number of bytes that will follow the command byte. This configuration allows for up to three bytes to follow the command byte. If bit 2 is set, then the command will alter the contents of the keyboard CPU's output register. The remaining bits are arbitrary and serve only to make each command unique.

In the case of serial EEPROM access, special conditions apply. After the command is sent, the keyboard CPU 20 will expect an 8 bit address to be sent immediately following the command byte. The address byte is the address in the EEPROM of the byte to store or retrieve. In the case of a READ PROM command, the value in the EEPROM location addressed by the address byte is copied to the keyboard's output register. For the WRITE PROM command, the next byte received by the keyboard CPU after the address byte is stored in the EEPROM at the addressed location. However, before the EEPROM can be written to, the keyboard CPU must receive an ENABLE WRITE command from the main CPU. This command enables a write operation only if it is the very next command. After the write command, or any other command, the WRITE ENABLE condition is voided. Any attempt to send a WRITE PROM command without first sending a WRITE ENABLE command will cause the keyboard CPU to ignore the WRITE PROM command and set the appropriate error flag in the keyboard status register. The requirement of a preceding WRITE ENABLE command before a WRITE PROM command will help prevent inadvertent EEPROM writes by confused microprocessors.

Any time that the keyboard CPU 20 is selected by the device select signal for serial I/O, the keyboard CPU software resets the serial interface so that if the last byte was sent in error, it will be cleared. The keyboard CPU is written to when the RD/WR' pin is low and read when the RD/WR' pin is high.

The status register that is returned for a QUERY STATUS command has the following definitions:

| | |
|---|---|
| Bit 0 = | Num-Lock light status - - - Light status from host. |
| Bit 1 = | Scroll-Lock Light status - - - Light status from host. |
| Bit 2 = | Caps-lock light status - - - Light status from host. |
| Bit 3 = | Host Power On |
| Bit 4 = | EEPROM is busy. |
| Bit 5 = | Error - Attempt to write to protected memory. |
| Bit 6 = | Error - An error was detected in communication. |
| Bit 7 = | FIFO overrun - FIFO has lost bytes because it has not been read. |

Keyboard Serial Algorithm

The main CPU 21 has several I/O pins that are dedicated to communication with the keyboard CPU 20. One I/O pin is a special BUSY input pin that is fed directly by the keyboard CPU. This indicates to the main card CPU that the keyboard CPU is busy with something and cannot respond to serial input. When the keyboard CPU is idle, it will clear the BUSY output. Another I/O pin of the main CPU is connected to the RST (Reset) input of the keyboard CPU circuit. This allows the main CPU to reset the keyboard CPU when the keyboard CPU loses control. Special circuitry is also in place to allow the keyboard CPU to reset itself on power up and to prevent accidental resets when the main CPU is powered down. A third input I/O pin on the main CPU is fed by the keyboard's RTS (Ready To Send) output. This output tells the main CPU that the keyboard's internal FIFO has something in it and that it needs to be serviced.

In order to initiate a serial communication between the main CPU 21 and the keyboard CPU 20, a handshaking approach is used. When the main CPU wants to send a byte to the keyboard CPU, it first checks the BUSY input from the keyboard CPU to make sure that it is low. If it is high, the main CPU must wait for it to clear. If the main CPU has to wait longer than one second, it will assume that the keyboard CPU has crashed and will reset it by toggling the RST pin on the keyboard CPU. Otherwise, with the BUSY input low, the main CPU can begin transferring a serial byte.

The BUSY flag also indicates to the main CPU that the keyboard CPU has finished processing a serial input bit. This status is triggered by the device select input. Therefore it is important to read the BUSY pin before selecting the keyboard CPU.

Before the main CPU 21 sends the first bit, it first sets the serial clock and RD/WR' lines low and sets the keyboard device select line high. It then outputs the data bit on the serial data line. With this done, it changes the level of the clock output to high. When the keyboard CPU sees a low to high transition on the serial clock line, it reads the bit on the serial data line. Then, when the keyboard CPU 20 has finished processing the bit, it pulls its BUSY output high. This tells the main CPU that the bit was received and processed. The main CPU then pulls the serial clock back low which signals the keyboard CPU to do the same with it's BUSY output. This process continues until all eight bits of the byte are transferred from the main CPU to the keyboard CPU. When all of the command bytes have been transferred, the device select line is cleared and the keyboard BUSY output returns to normal use. This procedure enables the keyboard CPU to detect serial framing errors while maintaining a high data transfer rate.

A similar process takes place when the main CPU reads a serial byte from the keyboard CPU's output register. First, after verifying that the keyboard CPU is not busy or crashed, the main CPU sets the clock line low and the RD/WR' and device select lines high. This time, when the main CPU pulls the clock line high, the keyboard CPU will output a bit on the serial data line. With this done, the keyboard CPU then pulls it's BUSY output high. This tells the main CPU that the data is ready to be read., When the main CPU has read and finished processing the input bit, it pulls the serial clock line back low. The keyboard CPU sees this and does the same with its BUSY output. Again, the process continues until the entire byte is sent from the keyboard CPU to the main CPU. Since there is only one byte to read, the device select line is reset.

Keyboard Command Procedure

Typical keyboard operation for sending scan codes to the host is for the main card CPU to issue the following commands to the keyboard CPU:

{Check Busy} SEND KEY CODE <scan code>

Upon receiving the scan code byte, the keyboard CPU temporarily sets its BUSY pin and sends the byte verbatim to the host. The ERROR flag in the status register is set if the keyboard CPU is asked to process a command that is not valid. This error detection applies only to keyboard CPU commands and not to scan code data.

Sometimes the switch box will return invalid scan codes as a form of communication. These are added to a 16 byte software FIFO inside the keyboard CPU upon receipt. This FIFO is actually implemented as a circular queue. Since the switch boxes would normally never send more than 4 bytes in response to a key sequence, there is only a remote possibility that the 16 byte FIFO would be overrun before it could be serviced by the main card CPU. The sequence would be something like this (for a [NUMLOCK][MINUS][NUMLOCK] key sequence):

{Check Busy} SEND KEY CODE <Make Num-Lock>
    {Check Busy} SEND KEY CODE <Break Num-Lock
    {Check Busy} SEND KEY CODE <Make ->
    {Check Busy} SEND KEY CODE <Break->
    {Check Busy} SEND KEY CODE <Make Num-Lock>
    {Check Busy} SEND KEY CODE <Break Num-Lock
    if (RTS) then {Check Busy} READ FIFO There would also be a QUERY STATUS right before and after every SEND KEY CODE. Regardless of the last scan code that was sent, if the RTS output pin on the keyboard CPU is set indicating that the FIFO needs servicing, then the main CPU must read the FIFO and send the data back to the KV-APP. The keyboard CPU will not be at all concerned with the proper format of make-break-repeat codes or if they are valid codes or not. If asked to, it will send multiple break codes with no intervening makes and an unlimited number of invalid codes.

PLL Serial Access

As stated above, the PLL 38 video dot clock chip requires special serial access. One main difference is that the RD/WR' pin for all the other devices is not used. The PLL gets this bit via the data stream. The device select output from the main CPU is connected to the SELn input pin of the PLL chip. The PLL 38 uses a RD/WR bit, followed by a three bit address, followed by an eleven bit data byte.

Serial EEPROM Access

A 4-wire serial EEPROM is provided on the card for non-volatile data storage. An example design calls for a 2K serial EEPROM organized as 256×8 bytes. The EEPROM stores the External Serial Port IRQ and Base addresses when the KeyView computer is powered down. The EEPROM is local to the keyboard CPU 20 and be powered by the dual power supply of the keyboard circuit. The main card CPU 21 can access the information in the EEPROM by querying the keyboard CPU. The EEPROM is not on the serial bus and the main CPU cannot access it directly.

Watchdog Timer

The watchdog timer circuit for the main CPU 21 is incorporated into the main CPU IC. The keyboard CPU 20 has a software driven watchdog circuit built into the main CPU. If the keyboard does not respond to a command that the main CPU sends it within a finite amount of time, then the main CPU will toggle the keyboard CPU's RST line. This will cause the keyboard CPU to reset.

Both CPUs have special circuitry to enable power up reset and other circuitry to prevent inadvertent resets of the keyboard CPU when the main CPU is not powered up.

FPGA Register Access

The main FPGA, which is the only one that contains registers, is mapped into the main card CPU's RAM space (FIG. 4). The first 256 bytes of RAM space 47 (O0H to FFH) correspond exactly to the FPGA register space. It is important that the FPGA device select be set high for all FPGA register accesses. If not, CPU accesses to RAM locations in the O0OOH to 7FFFH region will be mapped to the Flash Palette Converter RAM. However, when the FPGA device select bit is set high, the contents of the FPGA registers can be read from and written to directly PORT 1 Definitions The main CPU 21 has eight identified Port 1 connections (P1.0-P1.7) shown in FIG. 3, and discussed as follows:

The P1.0—RD/WR' Serial Bus Read/Write Output port outputs to the keyboard CPU 20. This output pin acts as a RD/WR' signal during mode serial bus accesses. The pin is normally high (read) and will be set low when writing data to a serial device. For most devices, including the EEPROM and keyboard chips, the operation of this pin is as described. However, for the PLL 38, this pin is not connected.

The P1.1—FPGA Device Select Output connects to the FPGA 11 and serves as the chip select line for the lower 32K of the main CPU's RAM data address space. When this pin is high and the main CPU makes a data read or write to the O0H to FFH address space, it will actually be reading or writing FPGA registers directly. However, when this pin is low and the main CPU addresses data in the O0OOH to 7FFFH region, it will actually be addressing data in the Flash Palette Converter RAM.

The P1.2—Keyboard Busy Input outputs to the keyboard CPU 20 and is a special dedicated pin that indicates that the keyboard CPU is busy and cannot respond to serial commands. This input also has a dual purpose and is also used as a timing signal during serial transfers between the main CPU and the keyboard CPU.

The P1.3—Keyboard Reset Output pin is connected directly (almost) to the RST (reset) input of the keyboard CPU 20. It is used by the main CPU to reset the keyboard CPU when a crash is detected. The main CPU can also toggle this bit under command from the PCI APP. To help prevent to inadvertent resets of the keyboard CPU, FPGA logic will require that the keyboard CPU be selected by the FPGA chip select register before the reset signal will get through.

The P1.4—FIFO RTS Input connects to the keyboard CPU 20 and is the FIFO Ready to Send strobe. It's purpose is to indicate when the FIFO in the keyboard chip has at least one byte in it. It will clear when the last byte is read from the FIFO. This input will perform a soft interrupt of the main CPU so that the byte can be handled before a FIFO overrun occurs.

The P1.5—ICSI 522 Device Select is the I/O pin that controls the SELn pin on the PLL dot clock 38. The device is selected when this pin goes low. When the device is selected, it may write to the serial bus.

The P1.6—Keyboard Device Select is the U/O pin that controls the Device Select input to the keyboard CPU. The keyboard CPU is selected when this pin is high. When the keyboard is selected, it may read or write data on the serial bus.

The P1.7—Flash Palette Converter Chip Select connects to the FPGA 11 and controls which one of the dual port flash palette converter RAMs are accessed during CPU reads and writes. If this pin is high, then the odd bank is selected. Otherwise, the even bank is selected.

Main FPGA Register Index

The design may include several FPGAs 11 from a hardware standpoint, even though from the software standpoint, all of the registers are in a single FPGA. When a second FPGA needs register information it will be necessary for it to have a hardware connection to the first FPGA in order to gain access to the registers. As explained above, the registers are addressed directly by the main CPU 21 and there can be potentially up to 256 registers in each FPGA. Before the main CPU can address any of these registers it must first output a high level on the FPGA Device Select Output pin P1.1. This enables the FPGA registers and disables the Flash Palette Converter RAM.

In the preferred embodiment, some registers include:

00—This is a null register and returns random values when read or written.

01—FPGA Flags—This byte is read only and the contents of this register are set by the FPGA. Bit 1 is imported from the video FPGA. The flags in this register are:

0—Reserved
1*—Busy—Set when the FPGA is busy writing the selected video block.
2—Hsync polarity of last pulse –0=negative polarity, 1=positive polarity
3—Vsync polarity of last pulse –0=negative polarity, 1=positive polarity Note that the polarity flags are constant and do not pulse with the syncs.
4—Reserved
5—Reserved
6—Reserved
7—Reserved 02—DIP Switch Setting—This byte is a read only flag that contains the four bits selected by the dip switch. Bits 0 and 1 are used as a card address. Bits 2 and 3 are reserved. The flags in this register are:

| | |
|---|---|
| 0 | Bit 0 of the card address which is set by the DIP switch. |
| 1 | Bit 1 of the card address which is set by the DIP switch. |
| 2 | Switch 2 of the card address DIP switch that is reserved for future use. |
| 3 | Switch 3 of the card address DIP switch that is reserved for future use. |
| 4 | Reserved |
| 5 | Reserved |
| 6 | Reserved |
| 7 | Reserved |

03—CPU Flags—This byte can be read or written, but only the CPU can change the values. Bits 2 and 3 are exported to the video FPGA. The flags in this register are:

| | |
|---|---|
| 0 | Video Bank - This bit determines which video bank 25 and 26 is connected to which circuit. A high bit means that the FPGA 13 has bank 0 (25) and the bus 23 has bank 1 (26). When using a 16K × 32 bit dual port RAM configuration, this pin would be tied to address line A14 of the left (capture) port of the RAM. The same address line on the right (PCI bus) port is tied to the inverse of this bit. This way, while one circuit has total access to the 0-8K section of the RAM, the other has access to the 8-16K section of the RAM. |
| 1 | Reserved for Flash Palette Converter Multiplexer. |
| 2, 3 | This indicates the number of pixels per byte in the video format. The following table shows how this is decoded: |

| Bits 3, 2 colors | Bits per Pixel | Pixels per byte | Max |
|---|---|---|---|
| 0, 0 | 1 | 8 | 2 |
| 0, 1 | 2 | 4 | 4 |
| 1, 0 | 4 | 2 | 16 |
| 1, 1 | 8 | 1 | 256 |

| | |
|---|---|
| 4 | Reserved |
| 5 | Reserved |
| 6 | Reserved |
| 7 | Stealth Mode - With this bit set, the card will not respond to any read commands from the PCI bus. The card serial port and the video memory are off line and will not respond to any read/write attempts by the PCI bus. The card is otherwise fully operational but is invisible to the system. The main card CPU will accept writes from the PCI bus, but will not respond via the bus until this bit is reset. This allows the system to issue the command to the main card CPU to reset the stealth flag. Other commands can also be sent to the main card CPU, but none will allow a read of the FPGA until the stealth bit is reset. Some aspects of stealth mode are controlled directly by software, but this bit is provided so that the FPGA can handle the hardware end by shutting down the 8250 serial port controller device in Stealth Mode. |

04—Command Port—This register is a command register with the lower 5 bits being the instruction to execute. When this register is written to by the KV-APP, the FPGA generates an interrupt to the main card CPU by toggling its INT1 pin. The main card CPU can then begin processing this command. Upon receiving a command to this register from the PCI bus, all the bits in the status register of the FPGA are set to their appropriate values. This action is performed automatically by the FPGA itself and not by the main CPU for performance reasons. The command byte is organized as follows:

0-5—The 6 bit command to the main card CPU.
6-7—The card address that is to respond to the command This register can only be written to by the action of the KV-APP writing to the base I/O (Command) register. The Status Register (FPGA register 08) is returned when the KV-APP reads the same base I/O register. The main CPU cannot write to the command register. The opposite applies to the Status Register. It can be written by the main CPU and is read when the KV-APP reads the base I/O (Command) register.

05—Parameter Port 0—This FPGA register is a copy of the contents of the Base+1 I/O port. It may be read or written to by the main CPU and its contents are reflected by the I/O port. In effect, both the KV-APP and the main CPU have direct read/write access to this parameter register. The parameter port registers are generally parameters of commands that are sent to the Command Register.

06—Parameter Port 1—This FPGA register is a copy of the contents of the Base+2 I/O port. See Parameter Port 0 for details.

07—Parameter Port 2—This FPGA register is a copy of the contents of the Base+3 I/O port. See Parameter Port 0 for details.

08—Status register—This is the register that the KV-APP receives when it reads the base I/O register. It indicates various facets of the card's operation state. While the KV-APP can only read this register, the CPU has both read and write access. The bit organization is as follows:

0—Busy Command—The card is still processing the last command that it received from the KV-APP. This bit is automatically set by the FPGA when the KV-APP writes a command to the command register (base I/O register) in the FPGA. The main card CPU resets this bit and all the parameter port busy bits when it is finished processing. Unlike the parameter ports, reading the status register does not set the busy flag.

1—Busy Parameter Port 0—The card is busy transferring a byte from or to FPGA parameter port 0. This bit is automatically set by the FPGA when the KVAPP writes or reads a parameter to Parameter Port 0 (base+1 I/O register) in the FPGA. The main card CPU resets this bit when it is finished processing or is ready for the next byte to be transferred.

2—Busy Parameter Port 1—The card is busy transferring a byte from or to FPGA parameter port 1. This bit is automatically set by the FPGA when the KVAPP writes or reads a parameter to Parameter Port 1 (base+2 I/O register) in the FPGA. The main card CPU resets this bit when it is finished processing or is ready for the next byte to be transferred.

3—Busy Parameter Port 2—The card is busy transferring a byte from or to FPGA parameter port 2. This bit is automatically set by the FPGA when the KV-APP writes or reads a parameter to Parameter Port 2 (base+3 I/O register) in the FPGA. The main card CPU resets this bit when it is finished processing or is ready for the next byte to be transferred.

4—Mode Change—This flag is set when a video mode change is detected by the main card CPU. This flag is normally reset when the card receives a "Load Video Parameters" command.

5—Reserved

6—Reserved

7—Instruction Not Supported/Transfer Error—This bit is set upon detecting an error condition. Usually if a command is sent to the card that is badly formatted or invalid, this bit will get set. Also, if there is an error during a packet transfer, such as a mismatched checksum, this bit will get set. The bit is cleared when the next command is written.

09—Video page segment MSB—high byte of the video page segment address. This is the segment of the address that the KV-APP uses to address the KeyView II's video buffer. The PCI circuitry of the card will map the KeyView II's video RAM to the beginning of this segment in the KV-APP's memory.

10—Video page segment LSB—low byte of the video page segment address. This is the segment of the address that the KV-APP uses to address the KeyView II's video buffer. The PCI circuitry of the card will map the KeyView II's video RAM to the beginning of this segment in the KV-APP's memory.

11—Main card I/O base address MSB—high byte of the I/O base address. This is the I/O address that the KV-APP uses when it sends and receives data to and from the KeyView II card. Specifically, it is the I/O address of the Command Port register. The Parameter Port registers are accessed by adding an appropriate offset to this address (i.e.—base+1, base+2, and base+3). The PCI circuitry on the Key View card will map the command port base register to this I/O address. This is not the serial port base address. It is defined by another FPGA register.

12—Main card I/O base address LSB—low byte of the I/O base address. See above for details.

13—Serial port I/O base address MSB—high byte of the serial I/O base address. This is the I/O base address that the operating system will use when accessing the KeyView card's serial chip. The PCI circuitry on the KeyView card will map the serial port base register to this I/O address.

14—Serial port I/O base address LSB—low byte of the serial I/O base address. See above for details.

15—Serial port IRQ—The IRQ of the serial port. This is the IRQ that the serial port uses to interrupt the operating system. The PCI circuitry on the KeyView II card uses this register to initiate an IRQ interrupt.

16—The FPGA set's version number—The MSN is the major version and the LSN is the minor. All of the FPGA's are considered one piece for version identification purposes.

17—Current video line—This register holds the value of the 12 bit counter in the Pixel Validation Circuit that counts the Hsync pulses. This value cannot be changed by the CPU and represents the true number of lines since the last Vsync pulse.

18—Flash Palette RAM data—This register is reserved.

19—Video Timing Register—"START SEGMENT"—The number of lines, or Hsyncs, including invisible lines after the Vsync and before the first line of captured video. This includes all of the uncaptured active video lines that are before the first horizontal line to be captured. This is the exact physical line on which segment capture begins.

20—Video Timing Register—"START LINE"—The number of invisible pixels, or dot clocks, after the Hsync pulse and before the first active video pixel on all active lines. This is the exact physical pixel on which to start the video line capture. This register is exported to the video FPGA.

21—Video Timing Register—"END LINE"—The number of pixels, or dot clocks, after the Hsync pulse, including invisible pixels as well as all active pixels. This is the exact physical pixel on which to stop the video line capture. This register is exported to the video FPGA.

22—Video Timing Register—"STOP SEGMENT"—The number of lines, or Hsyncs, including both invisible lines as well as captured lines before the last active line of video to capture. This is the exact physical line on which segment capture ends.

23—Chip Select Register—This register is not used.

24—The MSB of the MSW of the 32 bit checksum for the current video bank.

25—The LSB of the MSW of the 32 bit checksum for the current video bank.

26—The MSB of the LSW of the 32 bit checksum for the current video bank.

27—The LSB of the LSW of the 32 bit checksum for the current video bank.

This is the XOR SHIFT-21 checksum for the current video segment that is selected by the video timing registers above. At the start of the first line in the selected segment, the checksum register is cleared. The checksum is continually written to this register when the video scanning beam is in the selected segment. When the video scanning beam exits the selected segment, the value in the checksum register is valid for that segment. If this value is not promptly read, it will become corrupted if the next frame overwrites it. Also, at the end of the captured segment, the FPGA generates an interrupt to the main card CPU by toggling the INT0 pin. These registers are imported from the video FPGA.

28—Vertical Frame Rate—The FPGA has a frequency counter circuit that continually counts the number of Vsync Pulses in-one second. This count is stored in this register as a total and not as an active count.

29—Horizontal Line Rate MSB—The FPGA has another special 16 bit counter that counts the number of Hsync pulses in between Vsync pulses. This register is the upper byte of that 16 bit count.

30—Horizontal Line Rate LSB—This register is the lower byte of the 16 bit horizontal line count.

KeyView PCI Card System Commands

This section provides a command overview to the KeyView PCI card (FIG. 1). All commands are unidirectional. That is, they can only be initiated by the KV-APP and not the card itself. This is primarily due to a lack of need for card initiated communication and the lack of a dedicated interrupt to the KV-APP system. At first glance, one might expect that this would result in the KV-APP processor becoming tangled in redundant polling of the cards, however, this is not the case. As it turns out, because the KV-APP must constantly read the status register to correctly process the video, a bit in this register indicates when the card has something important to say. This way, the KV-APP gets the information it needs without the need for a hardware interrupt.

a. Initialization

To send a command to the KV-CARD 10, it must first be initialized. When the card is powered up, it is in stealth mode and does not contain much of the program needed to implement the commands presented here. The main card CPU program must be loaded, but before that, the I/O port and video segment address must be loaded first.

At power up, the card 10 does not contain any knowledge of which I/O base address is supposed to actually be the command port. Without the I/O base address, there is no way for it to receive commands from the KV-APP. To get around this, a small self-training procedure has been developed. In this procedure, the KV-APP selects one I/O base address out of a possible 8 that the card will be using. It will then send a NOP (code 00) addressed to card 0 to this address repeatedly. These NOP's are sent in 1/10 second intervals for up to ten seconds. If the card is present, it will latch on to the I/O base address and decloak. This function is part of the software and not the FPGA. All cards are in stealth mode during this phase of the initialization or else bus conflicts will occur.

The KV-APP then confirms the card's presence by reading the command/status register and the three parameter ports.

Decloaking is not the normal operation for the NOP command and should not be used to tell the card to decloak. Normally, the NOP command simply does nothing except clear the status register to zero. With the first card properly loaded with the correct I/O base address, the KV-APP then repeats the procedure for all four PCI cards in the Keyview PC. Before proceeding to the next card, the decloaked card is put back into stealth mode (cloaked). During initialization, the code that processes the NOP instruction will be located in the EPROM IPL code. After the main card CPU software is loaded, the old NOP processing code is overwritten by the new code in the RAM.

b. Calling Sequence

Some of the commands to the KeyView II card require multiple parameters. The parameters are first loaded into the parameter port registers and then into the command register. This is because the card will take action on the command as soon as it is written and will not wait for the parameters to be written. The order in which non-packeted parameters are written is not important as long as the command register is written last.

In the case of packeted data, special rules apply. In this case, multiple 256 byte records are transferred under the same command. See below for an explanation of how packets are transferred to and from the main card CPU.

c. Packet Transfer from the KV-APP to the KV-CARD

The transfer of packets to the KV-CARD 10 is fairly straightforward. The code for the device or internal buffer that is to receive the packet is first written into parameter port 0. The file that is to be sent to the card is divided into 256 byte chunks. The 'chunk' number (starting at zero) is loaded into parameter port 1 with the high bit set. Setting the high bit indicates that it is writing and not reading. The 8 bit checksum of the 256 byte packet will be sent as the 257th byte of data, so the CPU on the card can verify a valid transfer. The first byte of the packet is Written to parameter port 2. Writing all of these registers does nothing by itself, however, when the "TRANSFER PACKET" command is written to the command register by the KV-APP, the transfer process begins.

The first thing that happens during a packet transfer command is that the first byte in parameter port 2 is loaded and saved into a temporary buffer. Because writing to the command or parameter ports by the KV-APP causes the FPGA to automatically set the busy flag for that register, the CPU will have to clear the busy flag for parameter port 2 when it is finished processing each byte.

When the busy flag for parameter port 2 is cleared by the main card CPU, the KV-APP detects this and writes the second byte of the packet to this port. With that done, the KV-APP waits until the busy flag is clear again. It then sends the next byte, and so on, until all 256 bytes have been transferred. The 8 bit checksum is then sent as the 257th byte. At that time, the main card CPU compares the checksum with the actual checksum of the received packet. If the two are different, the CPU reports this by setting the ERROR flag in the status register. On error, the contents of the temporary buffer are discarded. If the checksum matches, the contents of the temporary buffer is copied to the device or location that was initially referenced by the value written to parameter port 0 and at the address specified in parameter port 1. The BUSY flag for the command register remains set until the packet transfer is complete. All command and parameter port busy flags are cleared when the packet operation is complete.

The 'chunk' (packet) number that was loaded into parameter port 1 is only used when transferring data to and from the CPU RAM 41 and the flash palette converter RAMs 24A and 24B. With single packet transfers, the high bit is still important, and the packet number should be set to zero. The checksum is valid for all transfers. It should also be noted that if any other command is written to the command register during a packet transfer, even a NOP, the entire packet is discarded.

In the cases where there are multiple packets, such as the program and flash palette converter RAM's, each 256 byte packet is sent separately as a separate command. In these cases, it is important to specify which 256 byte packet is being transferred. Only one of 128 packets (32K) may be specified in parameter port 1 to any given device. These packets do not have to be in sequential order.

d. Packet Transfer from the KV-CARD to the KV-APP

For the transfer of packets from the KV-CARD to the KV-APP, the address of the device or internal buffer that the packets are to be read from is first written into parameter port 0. The index number of the packet that is to be read is loaded into parameter port 1 with the high bit clear. For everything except the RAM devices, this will simply be zero. Clearing the high bit indicates that it is reading and not writing. A zero is written into parameter port 2 in order to force the FPGA to set the busy flag for parameter port 2. During this transfer, the card will first send the 256 bytes of the packet and then the checksum byte, so the CPU on the card can verify a valid transfer. Writing all of these registers does nothing by itself, however, when the "TRANSFER PACKET" command is written to the command register by the KV-APP, the transfer process begins.

During a packet transfer command, first the main card CPU writes the first byte in the packet to parameter port 2. Then it clears the busy flag for that port. When the KV-APP detects that the busy flag for parameter port 2 is no longer set, it reads the port and stores the first byte of the packet. The FPGA automatically sets the busy flag for the port when the KV-APP reads it. This prevents the KV-APP program from reading the same byte multiple times.

Next, the main card CPU places the second byte of the packet in parameter port 2 and clears its busy flag. The KV-APP then reads and stores that byte also. This process continues until all 256 bytes have been read by the KV-APP. At that time, the main card CPU transfers a 257th byte which is the checksum. The KV-APP always makes a point of reading the checksum byte even if it does not use it.

The BUSY flag for the command register remains set until the packet transfer is complete. All command and parameter port busy flags are cleared when the packet operation is complete.

The packet number that was loaded into parameter port 1 is only used when transferring data to and from a RAM device. For all other devices, this is set to zero. The checksum is valid for all transfers. If any other command is written to the command register during a packet transfer, even a NOP, the packet transfer is terminated and may leave the KV-APP in an unspecified state.

In the cases where there are multiple packets for transfer, such as for the RAM devices, each 256 byte packet is sent separately as a separate command. In these cases, it is important to specify which 256 byte packet is being transferred. Only one of 128 packets (32K total) may be specified for any given device. These packets do not have to be in sequential order.

KeyView II Card Commands

The following is a list of the commands and their parameters that the KV-CARD will accept:

a. OO-NOP (No Operation)

This command has the effect of clearing the busy and error flags in the status register. The busy flags are always cleared when the command completes. Since a NOP doesn't do anything in particular, it is always complete and thus clears all four busy flags.

The first 6 bits of the command byte are all zero and the last two, bits 6 and 7, are for card addressing. Only the card that is actually addressed will process the NOP instruction. This is regardless of whether or not the card was in stealth mode.

As discussed above, the NOP command in the EPROM code during IPL will cause the card to decloak.

b. 01 (Stealth)

This command provides the capability to cloak, decloak, turn off, and turn on the cards in the system. The actual function of this command is prescribed by the value present in Parameter port 0. These functions are explained below:

00—Cloak—When the card is cloaked, it cannot be seen by the KV-APP. Attempts to read a cloaked card will fail. The serial chip is also disabled and cannot interrupt the KV-APP CPU. Other than that, the cloak function does not cause the card to stop functioning. The video capture still functions on a card that is cloaked although the video data cannot be read by the KV-APP. When a command is issued to cloak, all cards in the system will cloak regardless of the address specified in the command byte.

01—DeCloak—This reverses the state of a cloaked card. Only cards that were specifically addressed will respond to this command. A "Turn On" command is implied by this command.

02—Turn Off—This causes the PLL dot clock generator to be loaded with a low frequency divisor. This helps reduce FCC emissions. This command will also cause the card to cloak, but can be aimed at a single specific card. If a subsequent "Cloak" command is issued, it will not effect the "Off" status of this card. This function is supplied for the purpose of reducing EMI from these cards. All of the registers in the FPGA remain unchanged as a result of this command.

03—TurnOn—This causes the card to reload the PLL dot clock divisor with the value that was being used before the "Turn Off" command. Since it is possible for a card to be "Turned On" and "Cloaked" at the same time, this function will not cause the card to DeCloak.

c. 02 (Packet Transfer)

This command allows 256 byte packets to be transferred to and from the KV-APP. The device or buffer that the data comes from or goes into is specified by the DEVICE parameter which is loaded into Parameter port 0 before calling this command.

The address of the packet in the card device can be specified in cases where there are multiple packets. This includes the main card CPU program and the flash palette converter RAM contents. The address byte is stored in Parameter port 1. It is actually only 7 bits so that the range of values for the address is limited to 0 to 127. Since this is actually an index to 256 byte pages, it can actually address from 0 to 32,768. The CPU RAM is addressed relative to the beginning of the device and not to the actual CPU address.

This command supports both reads and writes, Bit 7 of the address byte controls this. If bit 7 it set, the operation is a packet WRITE to the card. If bit 7 is clear, the operation is a packet READ from the card.

Parameter port 2 is where all the data is read or written to. The 256 bytes are transferred sequentially until all have been sent. After this, an additional one byte checksum is also sent.

The following are the device codes that are valid for the TRANSFER command:

00—Null Device—This will work for transfers except that the data that is written to the card is automatically discarded. The checksum is compared just like in any other device. In the case of reads from this device, the packet will contain all zeros. This address is useful for debugging.

01—Main Card CPU RAM Device—This is the main program code for the Main Card CPU that is loaded in. This code overwrites a jump table that determines which version of the functions are executed when called.

02—Flash Palette Converter RAM Device (Even)—This buffer is essential for the video capture circuit. The data supplied is a color cube that the captured colors will be matched to in order to palettize the video data in the proper video mode. Another main card CPU command, GENERATE PALETTE, will automatically load a generic color or B&W palette. The difference between the GENERATE PALETTE command and this TRANSFER PALETTE command is that the latter allows custom palettes and the former is a fixed, mathematically generated palette.

03—Flash Palette Converter RAM Device (Odd)—Same as above, but for odd bank.

04—Video Parameter Record—This device is for storing a 256 byte structure of video parameters into the card. This is a quick and simple way to ensure that all the video registers are loaded when a video mode change occurs.

05—Keyboard/Mouse Setup Record—This is a 256 byte structure of keyboard and mouse setup information. This record contains information about the type of mouse and keyboard that are connected to the card.

06—Checksum Registers—This is the entire 64 DWORD (256 byte) checksum array. Individual registers may be read using the Video Checksum Manager. The Transfer command also allows the checksum registers to be written.

d. 03 (Generate Palette)

This command causes the Main Card CPU to mathematically generate a uniform palette and load it into the flash palette converter RAM. The actual palette generated depends on the contents of parameter ports 0 and 1. If parameter port 0 is zero, the palette will be Black & White Greyscale. If there is any other value in parameter port 0, then the palette will be color. Parameter port 1 contains the total number of colors to generate in the palette. The only available options for the number of colors are 0 (2 color), 1 (4 color), 2 (16 color), and 3 (256 color). Only the lower two bits of parameter port 1 are considered.

e. 04 (FPGA Register Access)

This command allows the KV-APP to have full indirect access to all of the registers in the FPGA. This command also allows the KV-APP to have indirect access to the EEPROM and the ICS-1 522 video chip. Parameter port 0 defines the device to access. These are the same as for the serial addressing section:

| Param 0* | Device | Param 1 |
|---|---|---|
| 0 | Main FPGA regs | Register number |
| 1 | Keyboard CPU | Keyboard CPU |
| 2 | ICS 1522 chip | Register Number |
| 3 | Keyboard reset | Don't care (write only) |
| 4-127 | None | Don't Care |

*Only the first two bits are valid device select bits. Bit 7 is a Read/Write bit. All other bits of parameter port 0 are ignored.

Parameter port 2 is where the data is returned for read operations and entered for write operations. For read operations, the data in parameter port 2 is valid when the busy status flag is reset.

The EEPROM is accessed through keyboard commands. The keyboard interface can also require multiple bytes. Since this command can only send one byte at a time, multiple calls to the keyboard may be necessary in order to fully access it. Keyboard reads will always return the keyboard output register.

Since the ICS1 522 chip uses 11 bit registers instead of the usual 8, only the lower 8 bits are returned or set. To access the upper 3 bits of the register, 32 is added to the register number before invoking this command.

f. 05 (Video Checksum Manager)

All video modes are divided into 32K segments. Each one of these segments has a checksum associated with it. There can be up to 64 of these segments in the 1280×1024 resolution. The main card CPU stores the checksums in its RAM memory. The Video CheckSum Manager allows the KV-APP to read these values. Note that to read the entire checksum array (64 DWORDs=256 bytes), the KV-APP may use the TRANSFER command. The TRANSFER command is the only way that the KV-APP can write to the checksum registers.

The following table represents the various video modes. The number of segments in each video mode are shown. The number of physical lines per segment follows in parenthesis. Note that not all modes are supported by KeyView Pro.

| Mode | 2 color | 4 color | 16 color | 256 color |
|---|---|---|---|---|
| 320 × 200 | 1 (200) | 1 (200) | 1 (200) | 2 (100) |
| 640 × 200 | 1 (200) | 1 (200) | 2 (100) | 4 (50) |
| 640 × 350 | 1 (350) | 2 (175) | 5 (70) | 7 (50) |
| 640 × 400 | 1 (400) | 2 (200) | 4 (100) | 8 (50) |
| 640 × 480 | 2 (240) | 3 (160) | 5 (96) | 10 (48) |
| 800 × 600 | 2 (300) | 4 (150) | 8 (75) | 15 (40) |
| 1024 × 768 | 3 (256) | 6 (128) | 12 (64) | 24 (32) |
| 1056 × 350 | 2 (175) | 5 (70) | 7 (50) | 14 (25) |
| 1056 × 400 | 2 (200) | 4 (100) | 8 (50) | 16 (25) |
| 1280 × 1024 | 8 (128) | 16 (64) | 32 (32) | 64 (16) |

The following subcommands should be written into parameter port 0 prior to writing the command port:

00—Return the number of segments (and lines per segment) in the current video mode. Upon completion of this command, parameter port 0 contains the number of video segments used and parameter ports 1 and 2 contain the number of lines in each video segment. The MSB is in parameter port 1 and the LSB is in parameter port 2.

01—Return the lower 16 bits of the selected checksum. The checksum register number is written to parameter port 1. On return, the lower 16 bits of the checksum are stored in parameter ports 1 and 2. The MSB is in parameter port 1 and the LSB is in parameter port 2. The current checksum register number is stored in parameter port 0.

02—Return the upper 16 bits of the selected checksum. The checksum register number is written to parameter port 1. On return, the upper 16 bits of the checksum are stored in parameter ports 1 and 2. The MSB is in parameter port 1 and the LSB is in parameter port 2. The current checksum register number is stored in parameter port 0.

03—Return the currently selected video segment checksum (lower 16 bits). This is the checksum that is associated with the video segment that is in the video buffer. The segment number is returned in parameter port 0. The lower 16 bits of the current checksum are stored in parameter ports 1 and 2. The MSB is in parameter port 1 and the LSB is in parameter port 2.

04—Return the currently selected video segment checksum (upper 16 bits). This is the checksum that is associated with the video segment that is in the video buffer. The segment number is returned in parameter port 0. The upper 16 bits of the current checksum are stored in parameter ports 1 and 2. The MSB is in parameter port 1 and the LSB is in parameter port 2.

g. 06 (Video Capture)

The following commands may be written to parameter port 0:

00—This subcommand selects the segment that the video capture hardware will write to the video RAM. The segment number is written to parameter port 1. With this option, the segment will not increment automatically.

01—This subcommand starts an automatic capture of all of the video segments. A non-zero segment interleave is written to parameter port 1. After this subcommand is executed, segment number 0 will be captured. Then, the current segment plus the interleave will be captured. This continues until the last segment (plus the interleave) is captured. At that time, the capture restarts on segment number 1 and goes to the last segment (plus interleave). This continues until all segments have been captured. At that time, the process repeats. For example, with an interleave of 3, on the first pass the system will capture segments 0, 3, 6, 9, 12, etc. On the second pass the system will capture segments 1, 4, 7, 10, 13, etc. On the third pass the system will capture segments 2, 5, 8, 11, 14, etc. This is the preferred capture method.

h. 07 (Keyboard Manager)

00—This subcommand will send a scan code byte written to parameter port 1 to the keyboard. The scan codes are not verified, authenticated, or checked in any way.

01—This subcommand will read up to two bytes back from the keyboard CPU. On return, parameter port 0 contains a compressed byte. The upper 6 bits contain the total number of keyboard bytes available (including any returned with this command). The lower two bits contain the number of keyboard bytes that are currently being returned. Up to two bytes can be returned with a single call to this command. The first byte returned will be in parameter port 1 and the second will be in parameter port 2.

02—This subcommand will return the keyboard status lights in parameter port 0.
Bit 0=Num-Lock light status
Bit 1=Scroll-Lock Light status
Bit 2=Caps-lock light status i. 08 (Mouse Manager)

This command sends the mouse mickey information. The X-mickeys are written to parameter port 1 and the Y-mickeys are sent to parameter port 2.

j. 09 (Serial Port Manager)

This command sets the base port and IRQ of the 8250 serial port controller. The IRQ is written to parameter port 0 and the base port address is written to parameter ports 1 and 2. The MSB is in parameter port 1 and the LSB is in parameter port 2. If all of the parameter ports are zero, then the 8250 chip will be disabled without affecting the actual IRQ and base port address. If all of the parameter ports are 255, then the current values of the serial port are returned without changing them.

Flash Palette Converter

The Flash Palette Converter Circuit 52 will now be described with reference to FIG. 5.

Figure 5:
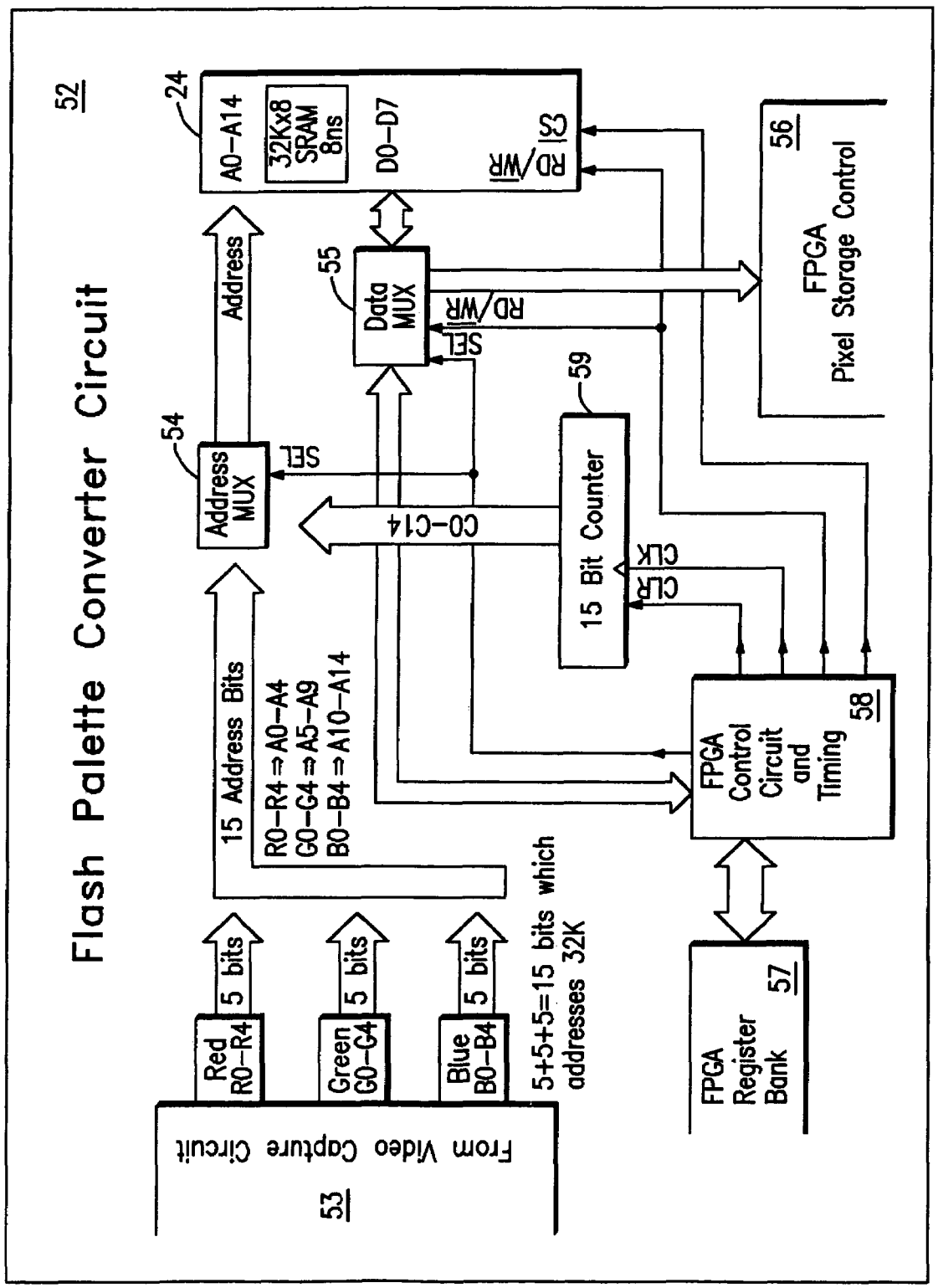
FIG. 5 is a flash pallette converter circuit in accordance with an example embodiment of the present invention.

In order to minimize the data bandwidth requirements and speed pixel delivery to the VGA screen, this design uses a flash palette converter 52, shown in FIG. 5. This circuit uses a simple hardware circuit to convert RGB 5-5-5 color inputs directly to a palette index. The circuit will allow the main card CPU 21 to program the Flash Palette Converter RAM 24 with values on the fly so that the video mode can be changed. It should be noted that the palette index that is output by this circuit is not a color value and has no direct correlation to color or luminance. It is simply an index that is used by the VGA card to look up the preprogrammed color values. Computations and comparisons on the palette index value will not necessarily yield meaningful results. The output from the video capture circuit 53 is digital video in RGB 8-8-8 format. Because the Flash Palette Converter RAM 24 has only 15 address inputs, the three least significant bits of each color are discarded to form video in RGB 5-5-5 format.

The address and data lines of the Flash Palette Converter RAM are both fed by way of two multiplexers 54 and 55. The address multiplexer 54 is a simple, unidirectional multiplexer that will handle all 15 address bits. The multiplexer has two input selections and one output. The data going through the address multiplexer travels in only one direction regardless of which input bank is selected. There are two possible input banks to the address multiplexer. The select input to the multiplexer will switch between bit counter for program mode.

The data multiplexer 55 is a little more complicated. During normal operation, the data signals coming from the I/O pins on the Flash Palette Converter RAM 24 are output only and are sent to the Pixel Storage Circuit 56. The data flow is one way only in normal operation mode. However, in program mode, the data flow is bi-directional. In program mode, the multiplexer 55 makes a bi-directional data connection between the FPC RAM 24 and the FPGA data register 57 that contains the byte to write to it. Thus, in program mode, the RAM contents can be both read and written. The reason for allowing the data to be read out in program mode is for self-diagnostic purposes.

The Flash Palette Converter timing circuit 58 generates the various control signals that are needed throughout the FPC circuit. These signals include RD/WR' and CS' of the RAM 24, CLR and CLK of the address counter 59, and the two SEL lines to the multiplexers 54 and 55. It will use the FPGA registers 57 and the pixel clock as input. The pixel clock is needed during normal operation to ensure that the RAM reads are timed properly. In program mode, the pixel clock is not used. The SEL lines to the multiplexers are connected to the flag in the FPGA registers that control the operation of the SEL signal. The CLR signal to the address counter is done the same way. Since both the SEL and CLR lines are directly connected to a bit in the FPGA registers, they will account for a minimal portion of logic in this circuit. The data lines from the data multiplexer are connected directly to the FPGA register. This register can be accessed directly by the Main Card CPU 21 as though it were RAM memory.

During normal operation, the RD/VR' input to the FPC RAM is held high while the CS' input is connected to pixel clock. The pixel clock is conditioned in such a way as to account for propagation delay and RAM access times. This signal is also passed on to the Pixel Assembly Circuit. In program mode, the address to the FPC RAM is supplied by the 15 bit counter. This counter is cleared to zero under CPU control by toggling the FPGA register flag that corresponds to the CLR pin on the counter. The counter is then incremented by the FPC timing circuit following READ and WRITE operations by the CPU to/from the FPGA data register.

Figure 6:
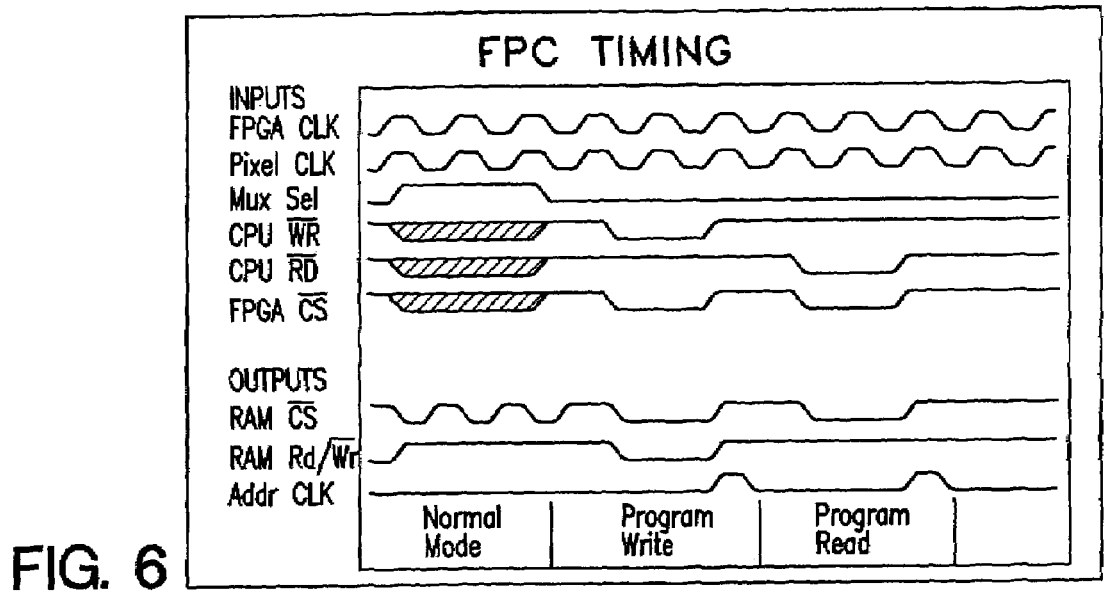
FIG. 6 is a flash pallette converter circuit timing diagram in accordance with an example embodiment of the present invention.

For reading and writing to the FPC RAM 24 in program mode, the sequence of timing signals is shown in the timing diagram of FIG. 6.

A standard clock (FPGA CLK) reference will be necessary for program operation. The pixel clock (PIXEL CLK) cannot be used because there is no guarantee that it will exist, nor is its frequency well established. The standard FPGA clock is therefore used for generating timing patterns when in program mode. Note that the Address Clock signal occurs after the RAM Rd/Wr' signal. The Address Clock (Addr CLK) is the pulse that is used to advance the 15 bit address counter 59 during programming. The CPU RD' and CPU WR' signals are random in length, therefore, the Address Clock signal will not rise until the CPU signal has returned high. When that happens, the Address Clock signal will rise for exactly one FPGA clock cycle.

It is also possible to use the ALE strobe from the main card CPU 21 as the clock source for program mode. In fact, the very next ALE pulse after the conclusion of the RD' or WR' strobe (and only that pulse) can be used directly as the Address clock pulse. Care in designing any circuits that use the ALE should be taken so that there is no direct connection to the Address Counter. If that were to happen, the main card CPU would not be able to correctly read or write to the FPC RAM. The main point is that the Address Counter is incremented only after a byte is read or written to the FPC RAM.

Pixel Assembly Circuit

Figure 7:
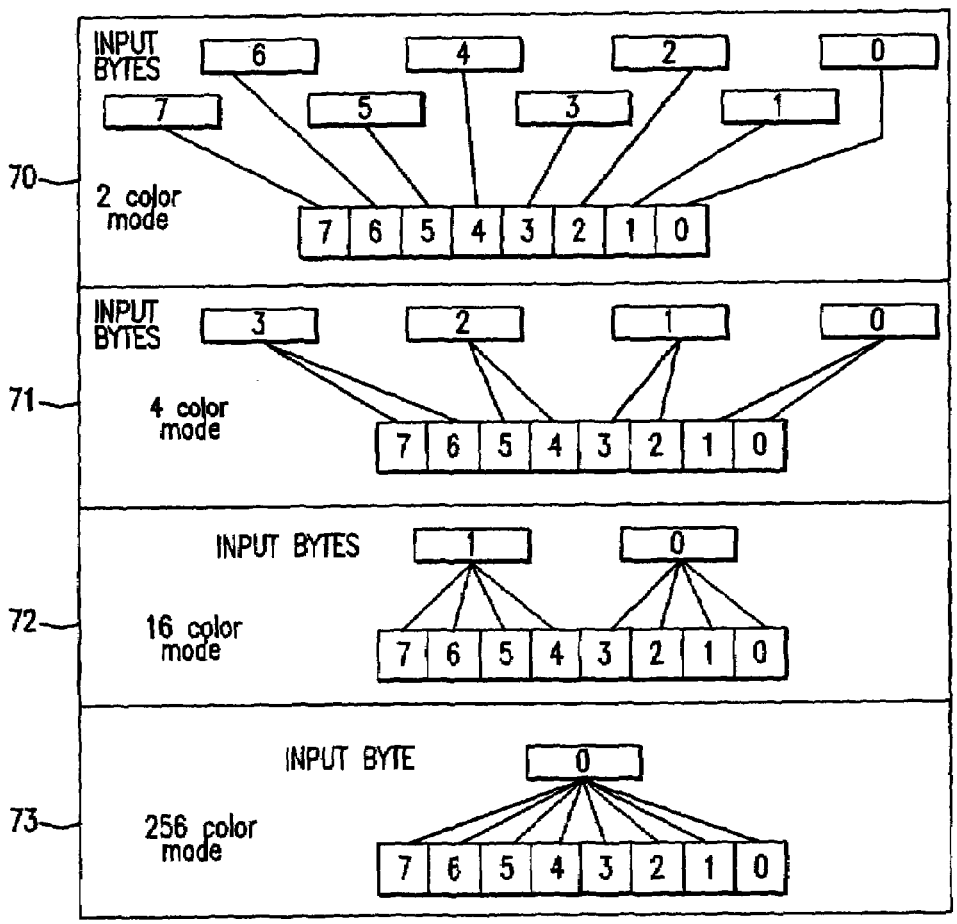
FIG. 7 is a schematic representation of pixel assembly in accordance with an example embodiment of the present invention.

The purpose of the Pixel Assembly Circuit 75 (FIG. 8) is to compact up to eight pixels into a single byte for storage, as shown for example in FIG. 7. The number of pixels that will fit in a byte depend on the number of bits per pixel of the particular color mode in use. There is a direct correlation between the number of bits per pixel and the number of possible colors. There will not be a situation where there are pixels of different sizes stored in the same byte.

In one bit per pixel mode 70, there are only two possible colors and eight pixels are stored in a single byte. Because there are only two possible colors, this mode can only be used for monochrome screens. The colors used in two color mode do not necessarily have to be black and white, but could be any two colors. Similarly, the original captured screens can be any number of colors. The action of the Flash Palette Converter will automatically select one of the two colors that is closest.

In two bits per pixel mode 71, there are four possible colors and four pixels are stored in a single byte. Because there are only four possible colors, this mode is on the borderline of reasonable color. Some text screens, such as those designed for CGA monitors, have only four colors to capture. However, in practice, the two bit mode is best suited for four level grayscale. Again, it makes no difference how many original captured colors exist on the host. The Flash Palette Converter will automatically approximate each color into the appropriate gray level.

In four bits per pixel mode 72, there are 16 possible colors and fit two pixels are stored in a single byte. This mode can be used realistically for 16 colors or 16 level grayscale. Microsoft Windows' screens use 16 color mode at least 95% of the time. This is also true of OS/2. Grayscale mode can also be used where the colors on the screen aren't a good match for the palette colors. In practice however, there will probably not be much need for 16 level grayscale as both grayscale and color modes are transmitted with equal speed.

In eight bits per pixel mode 73, there are 256 possible colors but it takes the whole byte to store it. Because there are fewer calculations needed to display a color on the VGA screen in this mode, this mode is the favorite mode for rapid updates in local mode. However, the 16 color mode is probably the most practical in remote mode. The 256 color mode is generally not needed for remote networking, however it is useful in the case where photo realism is required.

Figure 8:
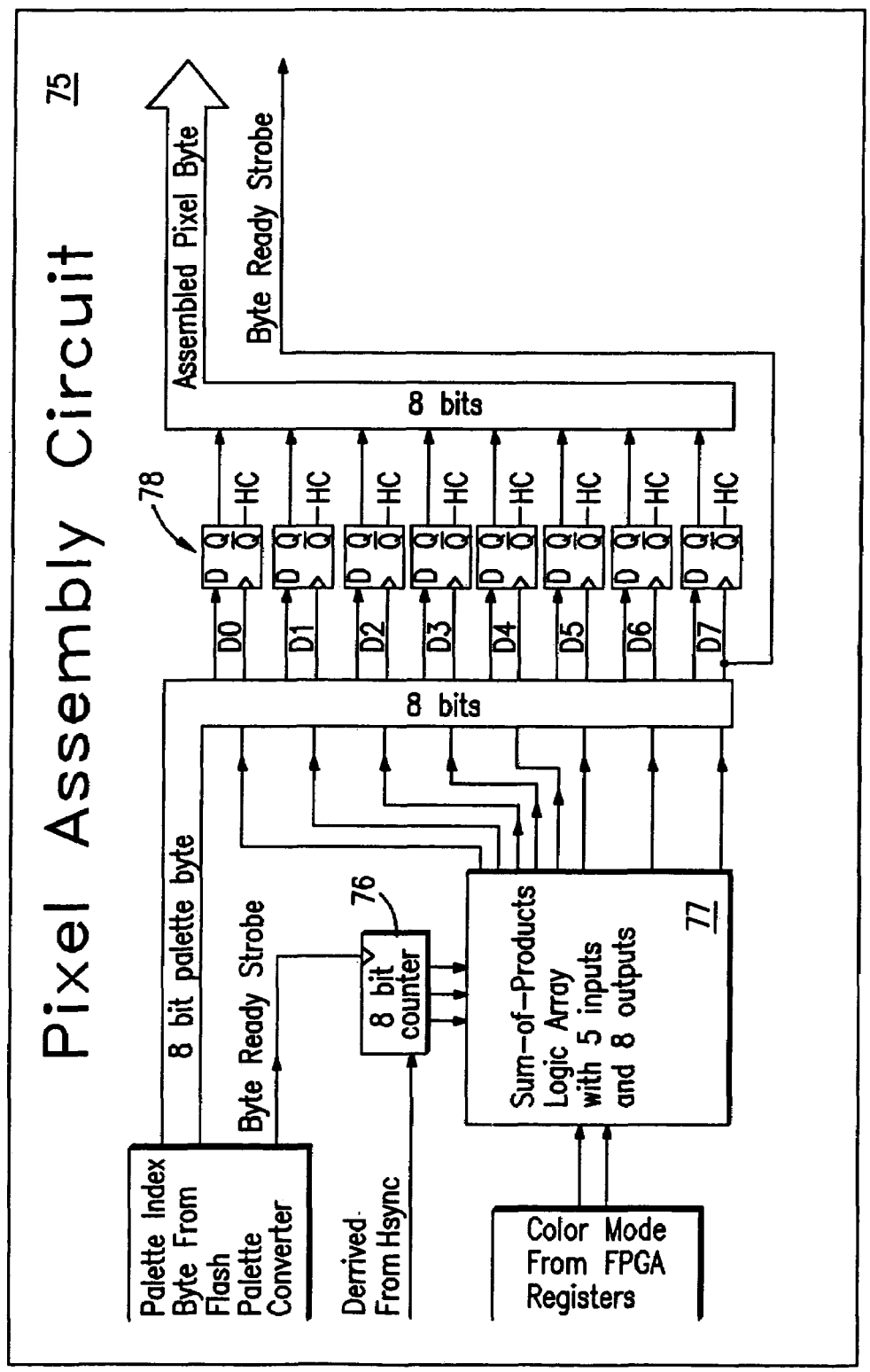
FIG. 8 is a schematic block diagram of an example embodiment of the pixel assembly circuit.

As was stated before, the action of the Pixel Assembly Circuit 75 of FIG. 8 is to pack the pixels into a byte that will be stored in the video RAM and eventually sent across the bus 23 to the PCI APP. In 256 color mode, all eight bits are used so for that mode, the Pixel Assembly circuit simply passes through the byte. In all other modes, the Pixel Assembly Circuit must assemble a byte from fragments of up to eight pixels.

The output byte from the Flash Palette Converter RAM 24 is applied to a special eight bit register. This register is really a latch composed of eight, independently controlled D-type flip-flops 78. With this configuration, each bit on the input side can be selectively loaded into the register. In this circuit, the Sum-of-Products (SOP) logic array 77 controls which bits are loaded and when the inputs to the SOP circuit 77 are the color mode and a three bit counter.

The color mode is as previously defined and is used by the SOP logic array 77 compute the number of pixels that are loaded into a single byte. A value of '00' represents one bit per pixel mode (2 colors). A value of '01' represents two bits per pixel mode (4 colors). A value of '10' represents four bits per pixel (16 colors). A value of '1' represents eight bits per pixel (256 colors). This value is obtained directly from the appropriate FPGA register.

The three bit counter 76 is provided so that the SOP logic array 77 knows which part of the byte to load. In 256 color mode, all eight bits are used so the counter is ignored. In 16 color mode, only the 1sb of the counter is used. Likewise, with 4 color mode, only the two 1sb's of the counter are used. However, in 2 color mode, all three bits of the counter are used. The SOP logic array automatically decides how many bits of the counter to consider. Therefore, there is no need for additional circuitry to modify the number of counter output bits.

The CLK strobe to the three bit counter 76 is connected to the Byte Ready Strobe from the Flash Palette Converter circuit 52. This pulse is used to increment the counter once for each pixel that comes in.

The CLR strobe to the three bit counter 76 is derived from the Hsync pulse. The purpose of this arrangement is to ensure that the counter will be zero for the first pixel on each horizontal line. It might not be possible to use a raw Hsync pulse, but the signal that clears the counter can be derived from it by using the appropriate gates.

In 2 color mode, the pixel byte from the Flash Palette Converter RAM 24 is presented to the inputs of the eight flip-flops 78. The SOP logic array 77 will signal the flip-flop in the DO position to load, and no others. When the next pixel byte comes in, only the flip-flop in the D1 position will be loaded, and no others. This continues until the eighth pixel byte comes in and is loaded into the D7 position. When D7 is clocked, the compressed pixel is fully assembled. The D7 clock strobe also functions as the Byte Ready Strobe for the next circuit.

In 4 color mode, an operation takes place that is similar to the 2 color mode operation. Here DO and D1 are loaded from the first pixel byte from the Flash Palette Converter RAM 24. Then D2 and D3 are loaded next, then D4 and D5, and then finally D6 and D7.

In 16 color mode, only two pixels will fit in each outgoing byte. The packing process is again similar to the 2 color and the 4 color modes. Here the lower nibble, DO-D3, is loaded from the first pixel byte from the Flash Palette Converter RAM. Then the upper nibble, D4-D7, is loaded.

In 256 color mode, all eight bits of the pixel byte from the Flash Palette Converter RAM are loaded at once. The Pixel Assembly Circuit 52 merely passes these bytes directly to the next circuit.

Boolean Equations for the Sum-of-Products Logic Array

The following is the sum of minterm products and the corresponding boolean equations. The X and Y variables correspond to the two bit color mode from the appropriate FPGA register. The X is the least significant bit and the Y is the most significant bit. The color modes are "00" for 2 color mode, "0 " for 4 color mode, "10" for 16 color mode, and "11" for 256 color mode. The A, B, and C variables are the output of the 3 bit counter. A is the least significant and the C is most significant.

8 Bit Data Model $Out0=\Sigma m(0,8,12,16,18,20,22,24,25,26,27,28,29,30,31)$ $Out0=XY+A'Y+A'B'X+A'B'C'$ $Out1=\Sigma m(1,8,12,16,18,20,22,24,25,26,27,28,29,30,31)$ $Out1=XY+A'Y+A'B'X+A'B'C'X'Y'$ $Out2=\Sigma m(2,9,13,16,18,20,22,24,25,26,27,28,29,30,31)$ $Out2=XY+A'Y'AB'X+A'BC'X'$ $Out3=\Sigma m(3,9,13,16,18,20,22,24,25,26,27,28,29,30,31)$ $Out3=XY+A'Y+AB'X+ABC'X'Y'$ $Out4=\Sigma m(4,10,14,17,19,21,23,24,25,26,27,28,29,30,31)$ $Out4=XY+AY+A'BX+A'B'CX'Y'$ $Out5=\Sigma m(5,10,14,17,19,21,23,24,25,26,27,28,29,30,31)$ $Out5=XY+AY+A'BX+AB'CX'$ $Out6=\Sigma m(6,11,15,17,19,21,23,24,25,26,27,28,29,30,31)$ $Out6=XY+AY+ABX+A'BCX'Y'$ $Out7=\Sigma m(7,11,15,17,19,21,23,24,25,26,27,28,29,30,31)$ $Out7=XY+AY+ABX+ABC$ Gate Summary
  8—4 input OR gates
  5—inverter gates
  3—2 input AND gates
  6—3 input AND gates
  2—4 input AND gates
  4—5 input AND gates FPGA designs speak in terms of logic cells and not gates. In reality, since the logic cells include the above gates as well as flip flops, only 8 logic cells are required for this design. The three bit counter will add another three logic cells. Therefore, the total circuit requires only 11 logic cells.

Truth Table
XY=1 bit per pixel
DEC YX CBA

0=00 000=Out0
  1=00 001=Out1
  2=00 010=Out2
  3=00 011=Out3
  4=00 100=Out4
  5=00 101=Out5
  6=00 110=Out6
  7=00 111=Out7

XY=2 bits per pixel
DEC YX CBA

8=01 000=Out0+Out1
  9=01 001=Out2+Out3
  10=01 010=Out4+Out5
  11=01 011=Out6+Out7
  12=01 100=Out0+Out1
  13=01 101=Out2+Out3
  14=01 110=Out4+Out5
  15=01 111=Out6+Out7

XY=4 bits per pixel
DEC YX CBA

16=10 000=Out0+Out1+Out2+Out3
  17=10 001=Out4+Out5+Out6+Out7
  18=10 010=Out0+Out1+Out2+Out3
  19=10 011=Out4+Out5+Out6+Out7
  20=10 100=Out0+Out1+Out2+Out3
  21=10 101=Out4+Out5+Out6+Out7
  22=10 110=Out0+Out1+Out2+Out3
  23=10 111=Out4+Out5+Out6+Out7

XY=8 bits per pixel
DEC YX CBA

24=11 000=Out0+Out1+Out2+Out3+Out4+Out5+Out6+Out7
  25=11 001=Out0+Out1+Out2+Out3+Out4+Out5+Out6+Out7
  26=11 010=Out0+Out1+Out2+Out3+Out4+Out5+Out6+Out7
  27=11 011=Out0+Out1+Out2+Out3+Out4+Out5+Out6+Out7
  28=11 100=Out0+Out1+Out2+Out3+Out4+Out5+Out6+Out7
  29=11 101=Out0+Out1+Out2+Out3+Out4+Out5+Out6+Out7
  30=11 110=Out0+Out1+Out2+Out3+Out4+Out5+Out6+Out7
  31=11 111=Out0+Out1+Out2+Out3+Out4+Out5+Out6+Out7

An alternative, preferred arrangement for the video storage RAM circuit is now described, with respect to the use of two 32K×8 bit SRAMS, rather than eight 8K×8 bit chips. Such chips can be found from Motorola and others.

The 32×8 SRAM approach requires wait states even if very fast 5 ns SRAMs are used. The reason for this assumption is that the FPGA would have to operate at over 200 MHz in order to make the four 8 bit reads, concatenate them into a single 32 bit word, and present them on the PCI bus. Since the FPGA/PCI MASTER only operates at around 100 MHz, this means that there could be as many as four wait states per 32 bit word transfer. This would choke data transfer speeds and would not be acceptable. Instead, it is better to keep the video storage at 32 bits for the present embodiment.

Regarding the use of a 32K×32 bit SRAMs for video storage, a speed of 12 ns or faster should be acceptable. One further requirement will be that the SRAM may have "Byte Write" capability (an example of such is Cypress CY7C1337). This alternative allows the use of an 8 bit Pixel Assembly Circuit (thus reducing the number of gates) while still presenting a full 32 bits to the PCI bus. Since there are 4 write strobes on the RAM (one for each byte), a simple cyclic 4 bit counter can be used to load the byte into the proper location of the 32 bit word.

Figures 1, 9:
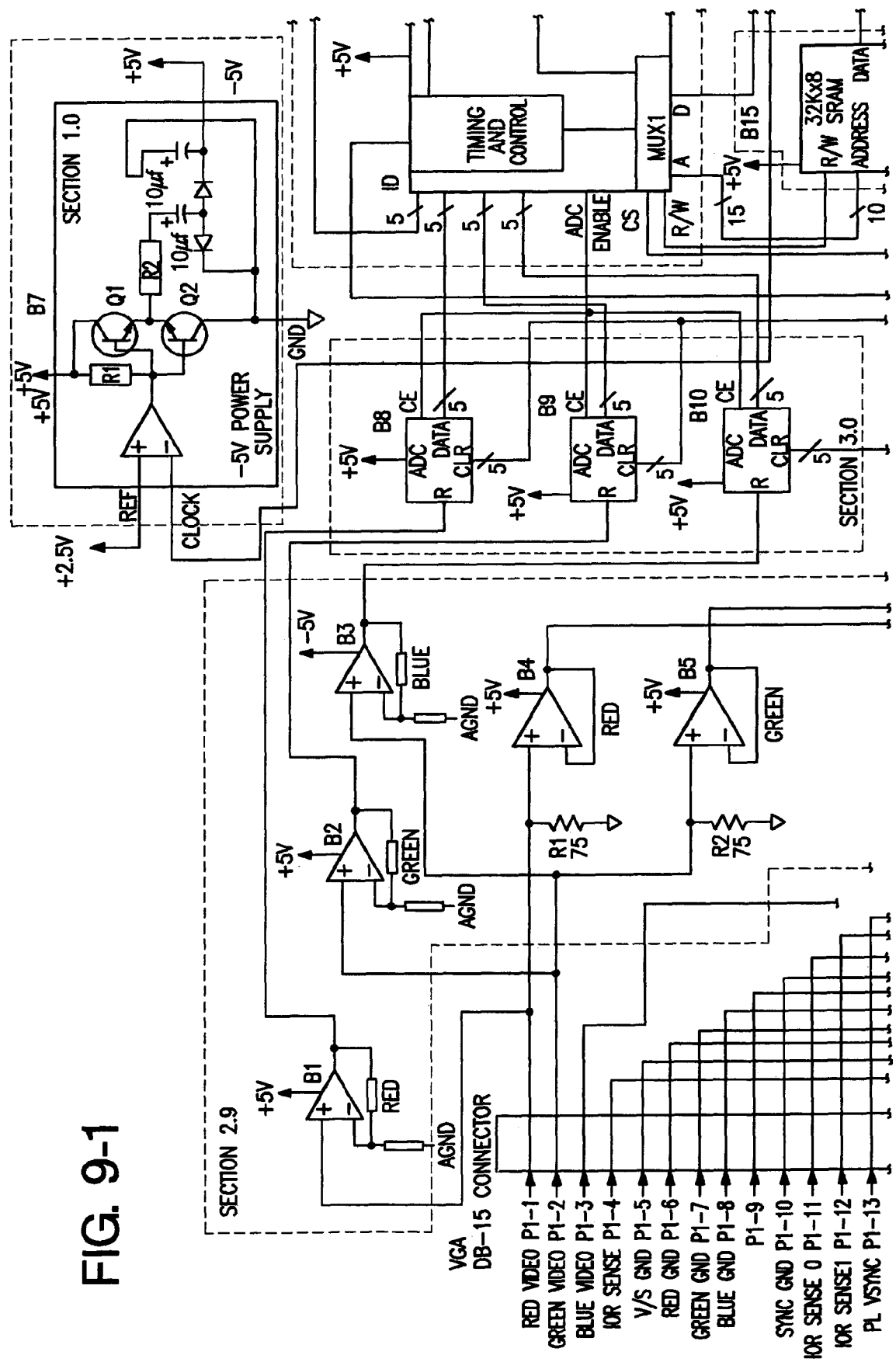
FIG. 9 is a detailed schematic diagram of an example embodiment of the PCI card in accordance with the present invention.
Figures 2, 9:
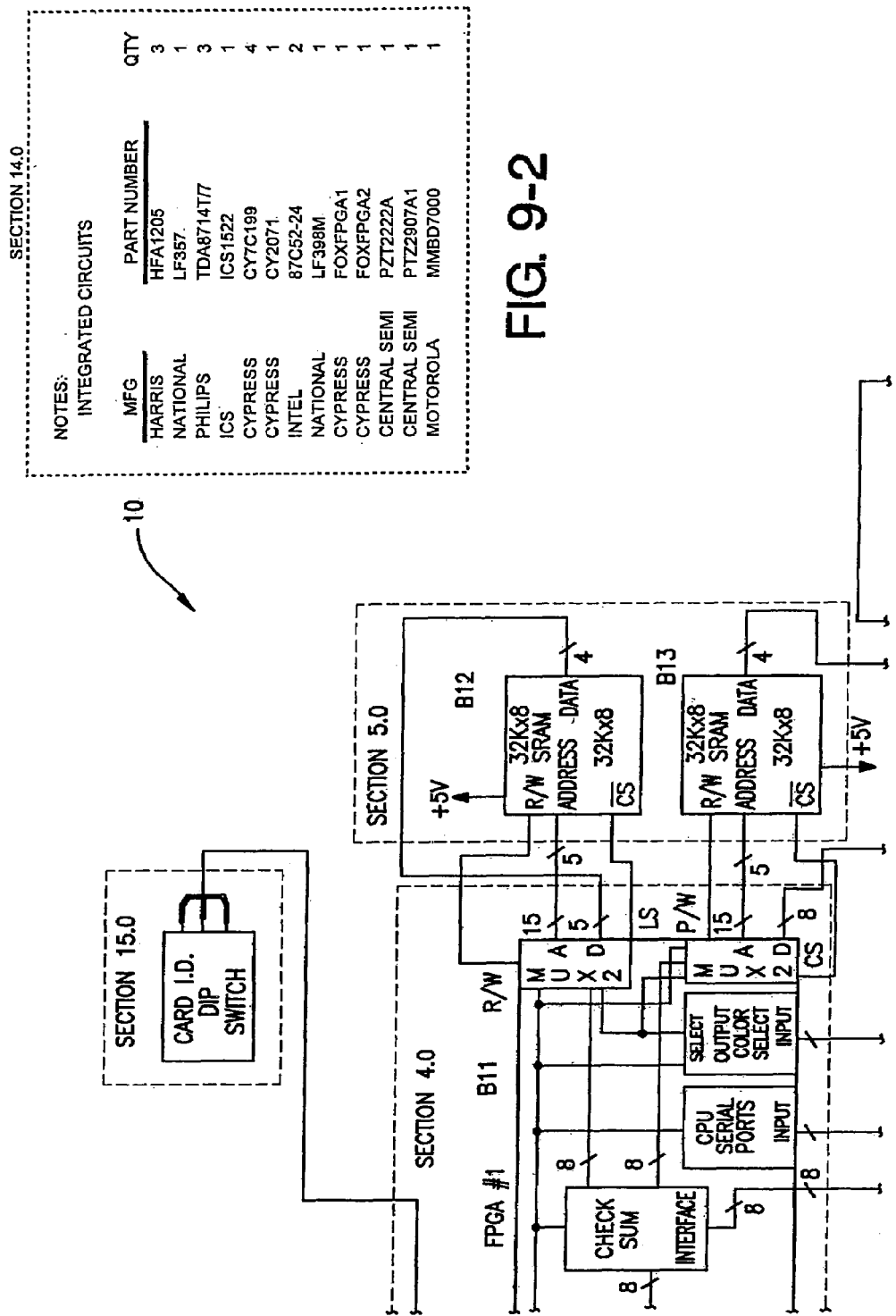
Figures 3, 9:
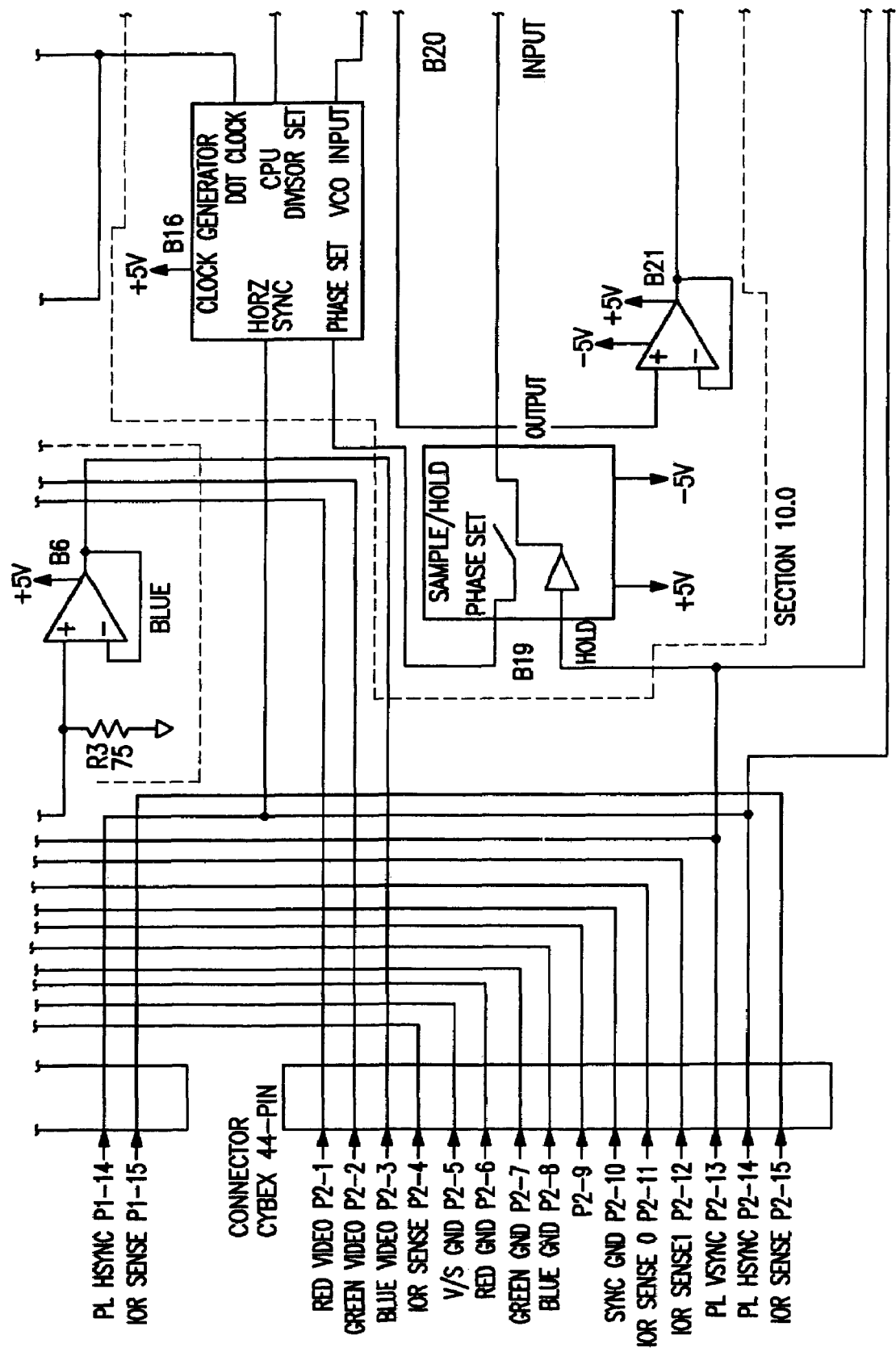
Figures 4, 9:
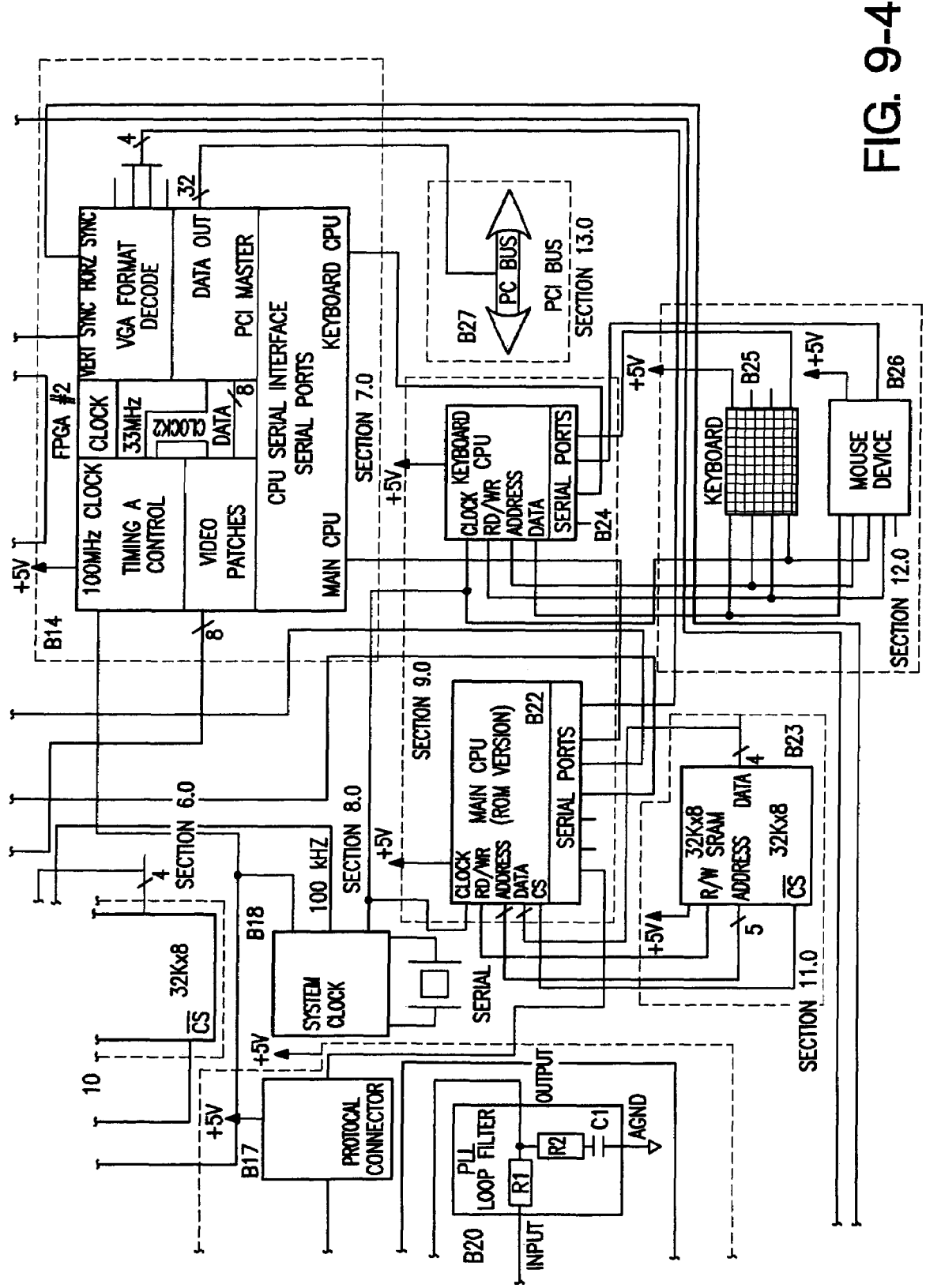

A detailed diagram of the Keyview II example embodiment Expansion Card is shown in FIG. 9. The attached FIG. 9 is not to be interpreted as an exclusive schematic for the expansion card but only as a general block diagram description for the functionality of the Keyview II Product.

The block diagram is divided into fifteen separate sections as identified by the broken line enclosures for each block. All I/O's for the Keyview II card ("KV card") is through three connectors, i.e., the VGA DB-15 the Cybex 44-pin, and the PCI plug-in connector located at the bottom of the expansion card. Input power for the card (+5VDC) is derived from the PCI motherboard of a standard PC, through the PCI connector.

Section 1.0 of FIG. 9 is the power supply circuit. Because the KV card requires a negative −5VDC rail which is used in the input video section of the card, it is necessary to derive the negative voltage from the standard +5VDC rail supplied by the PC motherboard. The negative voltage is derived by using a charge-pump technique in which the +5VDC is converted to a power dock signal using a comparator circuit and a power buffer stage arranged in a push-pull mode. The output of the power clock is AC coupled and DC rectified using a two diode bridge as shown. The diode bridge acts as a DC restoration circuit in which the reference level is +0.7 volts. The second diode biases the reference level to ground potential. The fill excursion of the clock (5Vpp) is forced to operate below ground, thereby providing the necessary negative rail of −5 VDC.

Section 2.0 of FIG. 9 is the Video Input Buffering circuit. The input video buffer circuits is composed of six (6) wide bandwidth operational amplifiers configured as unity gain amplifiers and as non-inverting amplifiers with sufficient voltage gain to meet the input voltage requirements of the analog-to-digital converters (ADC's) of Section 3.0, discussed below.

The input video signals (Red, Green, Blue) from the 15-pin VGA connector must be properly terminated into 75 ohms to minimized overshoots and ringing also known as impedance matching the coaxial cables. Once terminated, the video signals are buffered using three non-inverting unity gain amplifiers and allowed to pass-thru to the Cybex 44-pin connector to be used by an external monitor which will also terminate the signals into 75 ohms. The other three video amplifiers are configured with a gain of 4× to amplify the video levels to a maximum level of 3Vpp, which is the level required by the ADC's.

Section 3.0 of FIG. 9 is the Analog-to-Digital Converter (ADCs) circuit. Three high-speed analog-to-digital conversion circuits (preferably TDA8714) are used to digitize the input video levels provided by Section 1.0. The ADC's have an 8-bit resolution specification and can process at a conversion sampling rate of up to 80 MHz. This sampling rate is sufficient to meet the video bandwidth requirements of the SVGA pixel format of 1024×768 at 60 Hz, refresh rate. All digital inputs and outputs are TTL compatible, which is commensurate with the logic level requirements of the main FPGA#1 (of Section 4.0 described below). The ADC's receive the conversion clock from the pixel clock generator which is derived in the clock generation circuit of Section 10.0. The clock from the pixel clock generator (PCG) is precisely synchronized with the original clock which generated the input video signals. The outputs from the ADC's are fed to the main FPGA#1 of Section 4.0. The ADC's are enabled (CE) by the FPGA#1 by an active low level. Power to the ADC's is supplied by an analog +5V and a digital +5V. Although both voltages are the same, the analog and digital references are with regard to the required external power supply filtering to the appropriate input power pins. They also refer to the PCB layout trace procedure for the appropriate power pins.

Section 4.0 of FIG. 9 is the Main FPGA#1 circuit. FPGA#1 (element 12 in FIG. 1) is an 7K gate array (144-pin) which controls all video data traffic between the ADC's, the three external 32K×8 S-RAMs 24-26, the main CPU (21), and the PCI Master Gate Array 22. It also receives the card ID code which is read by the main CPU 21. The FPGA#1 also determines the Check Sum difference between two video frames and delivers the difference to the FPGA#2 (corresponding to elements 13 in FIG. 1 and Section 7.0 in FIG. 9) to be processed by the PCI master. The check sum difference is derived from the comparison between one of the S-RAMS in Section 5.0 and the Palette RAM in Section 6.0. It also receives commands from the main CPU to activate the number of colors to be transferred from the ADC's to the PCI Master. The FPGA#1 can select either two (2), four (4), sixteen (16) or two hundred fifty-six (256) colors to be processed by the PCI Master, as dictated by the main CPU. It controls the interleaving function of the two external S-RAMS as shown in Section 5.0 (and corresponding to elements 25-26 of FIG. 1). This interleaving function allows the external S-RAMS to operate as Read and Write elements to the PCI Master Array. The interleaving function is initiated from the CPU via the PCI Master Array to the main FPGA #1. As shown in the Block Diagram, three logic multiplexers (MUX1, MUX2, and MUX3 of FPGA #1) are required to access the three external S-RAMS of Sections 5.0 and 6.0. In addition, the input serial ports for the main CPU are also provided by the main FPGA #1. Finally, a Timing and Control Section is required within the FPGA #1 to precisely synchronize the various control functions as describe above. The only input power to the FPGA #1 is +5VDC.

Sections 5.0, and 6.0 of FIG. 9 are Interleaving 32K×8 External RAMS. All Address, Data, Read/Write, and Chip-Enable (CE) control lines are provided by the main FPGA #1's multiplexer sections. The two external RAMS of Section 5.0 and the RAM of Section 6.0 are not part of the Main FPGA and are stand-alone chips. The access times of the S-RAMS can be 12n5 maximum, which is commensurate with the maximum data rate of 80 MHz.

Section 7.0 of FIG. 9 is the FPGA #2. FPGA #2 is the second Field-Programmable-Gate Array of the KV card and is a 4K gate array, 144-pin chip. It is composed of the same logic family as the main FPGA and is capable of 100 MHz operation and beyond. Within the subsections of the FPGA #2, FIG. 9 shows that there is a Timing and Control Section, a VGA Format Decode Section, a Video Latch Area, CPU Serial Ports, and the PCI Master Gate Array Section. It is the function of the PCI Master to act as a "bridge" between the main FPGA 11 and the PCI Buss. The FPGA #2 receives the video difference calculation from FPGA #1 and stores the data in input video latches. In conjunction with the Timing and Control Section, it transfers the video data to the PCI Master to be read out to the PCI Buss (Section 13.0) at the PCI transfer rate of 33 MHz. The VGA Format Decode section determines the VGA pixel format. The VGA modes can occur at either 640×480, 800×600, or 1024×768, all at either 60 Hz or 72 Hz refresh rate. It is the function of this section to determine which VGA format is being addressed by using the coded information present in the polarities of the horizontal and vertical sync signals. By using logic which interprets the sense of the logic levels, a combination of active high and active low TTL signals, the correct VGA format can be decoded. The information is then stored in a shift register and presented to the main CPU, (Section 9.0). This information is required by the Main CPU to calculate the required divisor number for the pixel clock generator, in Section 10.0. The required shift registers for the main CPU and the Keyboard CPU are also provided by the FPGA#2, such that the Keyboard CPU can communicate with the Main CPU. As such the second FPGA acts as a conduit for the two CPU's to communicate.

Section 8.0 of FIG. 9 is the System Clock circuit. This section of the block diagram is a stand-alone clock chip which can provide three separate clock frequencies. The output frequencies can be manually programmed and are derived using a frequency synthesizer involving PLL techniques working from an external crystal. The system clock provides a 100 MHz, 24 MHz and 100 KHz clock. The 24 MHz clock is used by the on board CPU's (87C52-24). The 100 KHz clock is used to generate the −5VDC rail, and the 100 MHz clock is used to drive both FPGA's. Although a 24 MHz clock is shown as inputs for both CPU's this frequency can be changed to another frequency such as 22 MHz if desired.

Section 9.0 of FIG. 9 includes the Main CPU and Keyboard CPU. The main CPU and Keyboard CPU communicate with both FPGA's. The main CPU is programmed to direct data between the external SRAMs and FPGA#2 in accordance with the interleaving function, the number of colors selected, and the readout of the checksum difference to FPGA#2. The main CPU requires an external SRAM (32K×8) (Section 11.0) similar to the other three SRAMS around the main FPGA#1. It's external SRAM is used to store data from the keyboard and mouse devices, and from the VGA Format Decode Section of the second FPGA#2. The data from the VGA Format Decode Section is used by the main CPU to produce the correct divisor number for the Pixel Clock Generator (Section 10.0). The number will be a difference value for each pixel format ranging from 640×480 to 1024×768 at 60 Hz and 72 Hz refresh. The KV card is designed to capture video at 640×480, 800×600, 1024×768, at 60 Hz and 72 Hz. Therefore, a total of six divisor numbers will be generated by the main CPU and fed to the Protocall Corrector of Section 10.0, which in turn will feed the number to the ICS 1522, dot clock generator.

Section 10.0 of FIG. 9 includes the Pixel Clock Generator (Dot Clock Generator)

It is the function of Section 10.0 to accurately reproduce (frequency and phase) the pixel clock which was used by the Host PC Graphic Card to produce the analog video signal present in the Red, Green, and Blue inputs to the KV card. Section 10.0 uses the feedback divisor input from the main CPU (Section 9.0) and the Horizontal Sync Input from the Host PC via the DB-15 input connector, to produce the output pixel clock which is used by the three Analog-to-Digital Converters in Section 2.0 to convert the analog data to digital data. As explained in Section 9.0, the output frequency of the PLL is determined by the input Horizontal frequency and the Feedback Divisor number from the main CPU which changes as a function of the VGA Pixel Format. In accordance with the VGA video standard, the Horizontal Sync is actually a Composite Sync Signal which includes—the Vertical Sync Signal. During the duration of the Vertical Sync period, there can be a complete absence of Horizontal Sync pulses, or there can be what is known as Equalization and Serration pulses in accordance with the EIA Standard R5343A. Some Graphics Cards will include the Equalization and Serration pulses while others will exclude them entirely. The Equalization and Serration pulses are actually 2× horizontal pulses during the vertical blanking period, where 2× corresponds to twice the horizontal frequency.

The effect of either the absence or the existence of the 2× pulses has a profound effect on the Phase-Lock-Loop. It is the nature of any PLL to operate as either a second-order or third-order feedback system requiring time to respond to any differential change in input frequency. Depending on the amplitude of the damping coefficient of the second-order system, the PLL will overshoot and undershoot due to an input frequency change and will finally settle to a steady-state condition. In addition, if the PLL looses "lock" during the differential change in frequency, i.e. loss of horizontal pulses, it will require a finite time to re-acquire and re-lock to the input frequency. It is for this reason that the PLL must be designed to perform, i.e., not loose lock, during the absence or frequency doubling of the horizontal input signal. In Section 10.0 a method is used to avoid the loss of lock by using a Sample-and-Hold Circuit which effectively "breaks" the feedback loop of the PLL during the vertical blanking period. The disconnection is performed at the output of the phase detector of the PLL. Recall that the phase detector accepts a signal from the input horizontal sync and the feedback clock. In a normally connected PLL, at the time of the Vertical Sync period the loss or addition of 2× pulses would cause the output of the phase detector to produce a large phase error signal causing the VCO to move in the direction of the frequency change, i.e., either lower or higher in output frequency. Due to the differential change, the PLL loop would require additional time to acquire and settle to its steady-state condition. The result would be a disturbance period once the normal horizontal pulses returned, after the vertical blanking period.

The design technique which is used in Section 10.0 is to remove the phase error signal from the phase detector, during the Vertical Blanking Period. The Vertical Blanking Period is also generated in the VGA Format Decode Section of the second FPGA#2 and fed to the Hold signal of the Sample-and-Hold Circuit. The Vertical Blanking Period also varies as a function of the VGA Pixel Format and can vary from 500 us to 1.2 mS. It is therefore only necessary to use a hold period which exceeds the maximum vertical blanking period. To accomplish this, the input vertical sync pulse is extended within the Sample-and-Hold Circuit to a maximum of 1.5 mS. In order to insure that the DC level on the integrating capacitor (C1) maintain a steady hold level it is necessary to buffer the input and output sections of the loop filter with high impedance, low leakage, buffer circuits.

Section 11.0 of FIG. 9 is Main CPU SRAM, the reason for which is described above with respect to Section 9.0.

Section 12.0 of FIG. 9 is the Keyboard & Mouse Devices. These devices are needed in order for the Remote PC to Control the Host PC during an access session.

Section 13.0 of FIG. 9 is the PCI Bus. The PCI Bus is part of a standard PC Motherboard Design.

Section 14.0 of FIG. 9 is a brief list of example integrated circuits disclosed KV card embodiment:

| MANUFACTURER | PART NUMBER |
| --- | --- |
| HARRIS | HF1205, OP AMP |
| NATIONAL | LF357, OP AMP |
| PHILIPS | TDA8714T/7, ADC |
| INTEGRATED CIRCUITS SYS | ICS1522, PLL |
| CYPRESS | CY7C199, SRAM |
| CYPRESS | CY2071, CLOCK |
| CYPRESS | CY38007P208, FPGA |
| CYPRESS | CYC386P-XAC, FPGA |
| INTEL | 87C52-24, CPU |
| NATIONAL | LF398M, S/H |
| CENTRAL SEMI | PZT2222A, XISTOR |
| CENTRAL SEMI | PZT2907AT, XISTOR |
| MOTOROLA | MMBD7000, BRIDGE |
| PRAEGITZER | 4-LAYER PCB |
| MOLEX | DB-15 CONNECTOR |
| CYBEX | 44-PIN CONNECTOR |
| KOA-SPEER | RESISTOR, CAPS |

Section 15.0 of FIG. 9 is the ID Dip Switch To meet the requirement of remotely accessing multiple Host PC's, where each Host PC is matched with one Keyview-Pro Expansion Card, it is necessary to provide an I.D. code for each card, up to a total of eight cards. In order to accomplish this, a manually programmable DIP switch will be used as shown in Section 15.0. This 3-Bit code will be accepted by the main FPGA#1 and passed to the main CPU for card identification and tagging.

Remote Reset Card Specification

Figure 11:
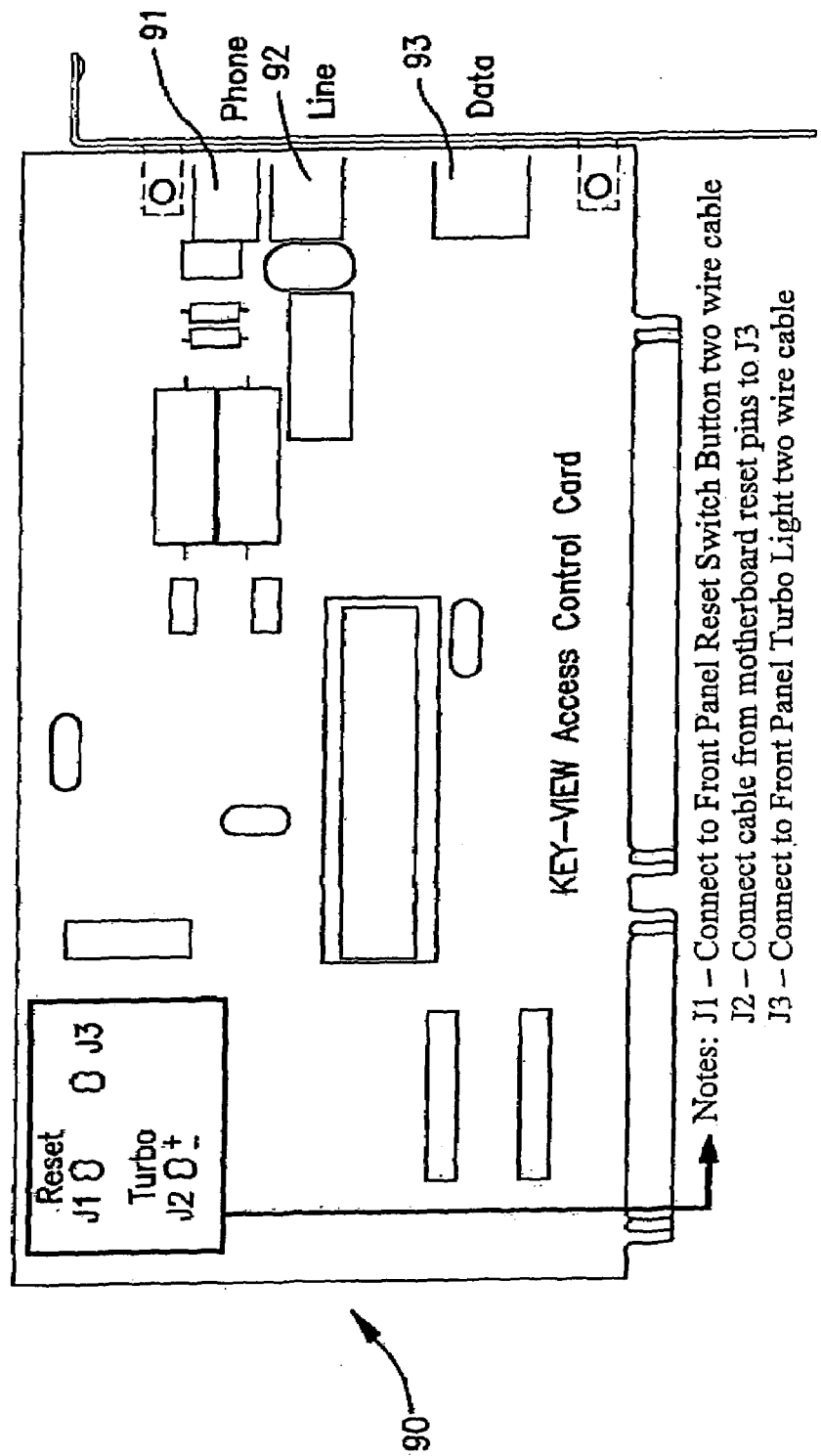
FIG. 11 is an example embodiment of an access control card in accordance with an example embodiment of the present invention.

In addition to the KV PCI cards each KEY-VIEW PC includes one KEY-VIEW ISA "Reboot" card 90 designed to permit the KEY-VIEW PC to be remotely reset, to capture the caller's ID and to control the KEY-VIEW PC's turbo light. An example Reboot card (AKA access control card) is shown in FIG. 11, with further detail shown in FIG. 12.

When the Reboot card is installed, a phone line is connected into the phone jack 91 on the back plate of the card. A phone out jack 92 permits the pass through of the phone signal to either a telephone or a modem.

When a call is received, the card captures the caller's ID and passes any ID received to the KEY-VIEW APP via the ISA bus. Storage on the card is sufficient to handle the current caller's ID (i.e., one may, but need not provide storage on the card of caller ID numbers from previous calls). Since the caller ID can only be captured between the first and second ring, pcAnywhere on the KEY-VIEW PC is set to answer on the third ring (or a higher number of rings), if the user wishes to capture the caller's ID.

The card has the ability to count incoming rings and thereby permit the CPU on the card to take actions based on the number of rings detected. Ideally this ring detection feature also handles rings in foreign countries. If this is not possible then the hardware supports the ability to write custom operating system software to detect special types of ring conditions in foreign countries.

The card also has a DTMIF decoder capable of accurately distinguishing a remote user's touch tone entries after the modem in the KEY-VIEW PC has answered a call. Since a modem generates noise immediately after answering a call and until the call is terminated by the modem, the DTMF decoder is able to accurately recognize a remote user's tones while this noise is occurring. Any tone received by the remote user will be passed back to the card's operating system. Up to eight tones may be captured in this manner per call.

When the remote user enters a correct touch tone reboot code, hardware means on the card sends back an audible tone to the caller (that can be heard over the modem noise discussed above) confirming that the correct code has been received.

In some cases, the operating system of the card may need to reboot the PC if less than a user specified number of rings (e.g. 3 rings) are detected. This feature is necessary in cases where the modem answers a call on three rings, but the KEY-VIEW APP or pcAnywhere APP is locked up and the user is not at a touch tone phone that will activate the touch tone code feature or in a country that the DTMF decoder will not recognize tones.

In other cases the KEY-VIEW PC may need to be booted if more than a user specified number of rings (e.g. 10) is detected to handle a case where the modem fails to answer a call, in which case a remote user would have no way to enter touch tones. This user option will also be needed in cases when the KEYVIEW PC does not have a modem.

From an operating viewpoint, the hardware on the card simply passes ring information, caller ID information and touch tone information back to the card's operating system which would decide what to do with the information based on how the user has configured the card to operate. In addition, for foreign countries, it may be necessary for the operating system to perform the ring/tone detection features in place of the standard hardware on the cards, so there hardware links can be used to avoid further hardware changes.

The reboot card 90 will cause the KEY-VIEW PC to reset by sending a signal to the reset pin on the PC's motherboard, assuming that a two pin cable is installed between the re-boot board's reset pins and the reset pins on the KEY-VIEW PC's motherboard. In addition, a PJ-45 jack, standard serial interface is provided, to permit the card's operating system to control power to the KEY-VIEW module connected to the port.

The second function of the reboot card 90 is to control the turbo light on the KEY-VIEW PC's front panel, assuming that a two pin cable is installed between the re-boot board's turbo pins and the turbo pins on the KEY-VIEW PC's motherboard. The turbo light would be used to visually indicate when a remote user is accessing the KEY-VIEW PC and to indicate whether the KEY-VIEW PC was in Host mode or a Menu mode.

The KEY-VIEW PC's turbo light will be off when the KEY-VIEW PC is in a Menu mode and is not being remotely accessed. The KEY-VIEW PC's turbo light will be ON when the KEY-VIEW PC is in a Host mode and is not being remotely accessed. This light will flash ON briefly whenever the KEY-VIEW PC is in a Host mode and is being remotely accessed. More specifically, the turbo light should remain OFF but flash ON (for 0.5 seconds) every 5 seconds, whenever the KEY-VIEW PC is being remotely accessed (i.e. pcAnywhere is "In session") and is in a menu mode. If the KEY-VIEW PC is in a mode where both pcAnywhere is "In Session" and the KEY-VIEW PC is in a Host mode, the turbo light should remain ON and then flash OFF for 0.5 seconds every 5 seconds.

The KEY-VIEW APP running on the KEY-VIEW PC must be able to send commands or a code to the reboot card via the ISA bus to tell the boot card what to do with the turbo light as follows:

Code Action
1 Turn light ON
2 Turn light OFF
3 Turn Light ON but blink OFF every 5 secs
4 Turn Light OFF but blink ON every 5 secs Setting the turbo light in this manner coupled with the user beep option, which is handled by the KEY-VIEW APP, gives anyone working at the Host site a visible and audible indication whenever the site is being remotely accessed. Moreover, whenever the turbo light stays OFF, the user at the Host site will know that the KEY-VIEW PC is not in a Host mode and will not pass keyboard or mouse input through to the Host PC. In this case the user at the Host site will need to connect a monitor to the KEY-VIEW PC's SVGA card to see what state the KEY-VIEW PC is in. Normally when the light is OFF it will indicate that someone has shut-down the KEY-VIEW APP.

Keyview System Structures

To install the KEY-VIEW PC 200 (FIGS. 28-29), each Host PC's (201-204) keyboard, mouse, and monitor are disconnected from the Host PC. These peripheral devices are of no further use and may used for the KEY-VIEW PC or elsewhere by the customer. Next, a supplied multi-port interface cable 213 is connected from the KEY-VIEW PC's PCI card's 25 pin connector to the Host PC's keyboard, mouse and video card input ports, so that when necessary the KEY-VIEW PC's optional monitor, keyboard and mouse (not shown in FIGS. 28-29) could be used to control the Host PC 20-1204, similar to how a PC switch box is used on site to control multiple PC's. An appropriate mouse driver would be installed on the Host PC and may be a Keyview mouse driver in place of any existing driver. In such a case, the KEY-VIEW PC would be automatically trained (as described later) to recognize the video output signals of the Host PC and mouse control procedure of the Host PC using software provided with the KEY-VIEW II system.

Figure 10:
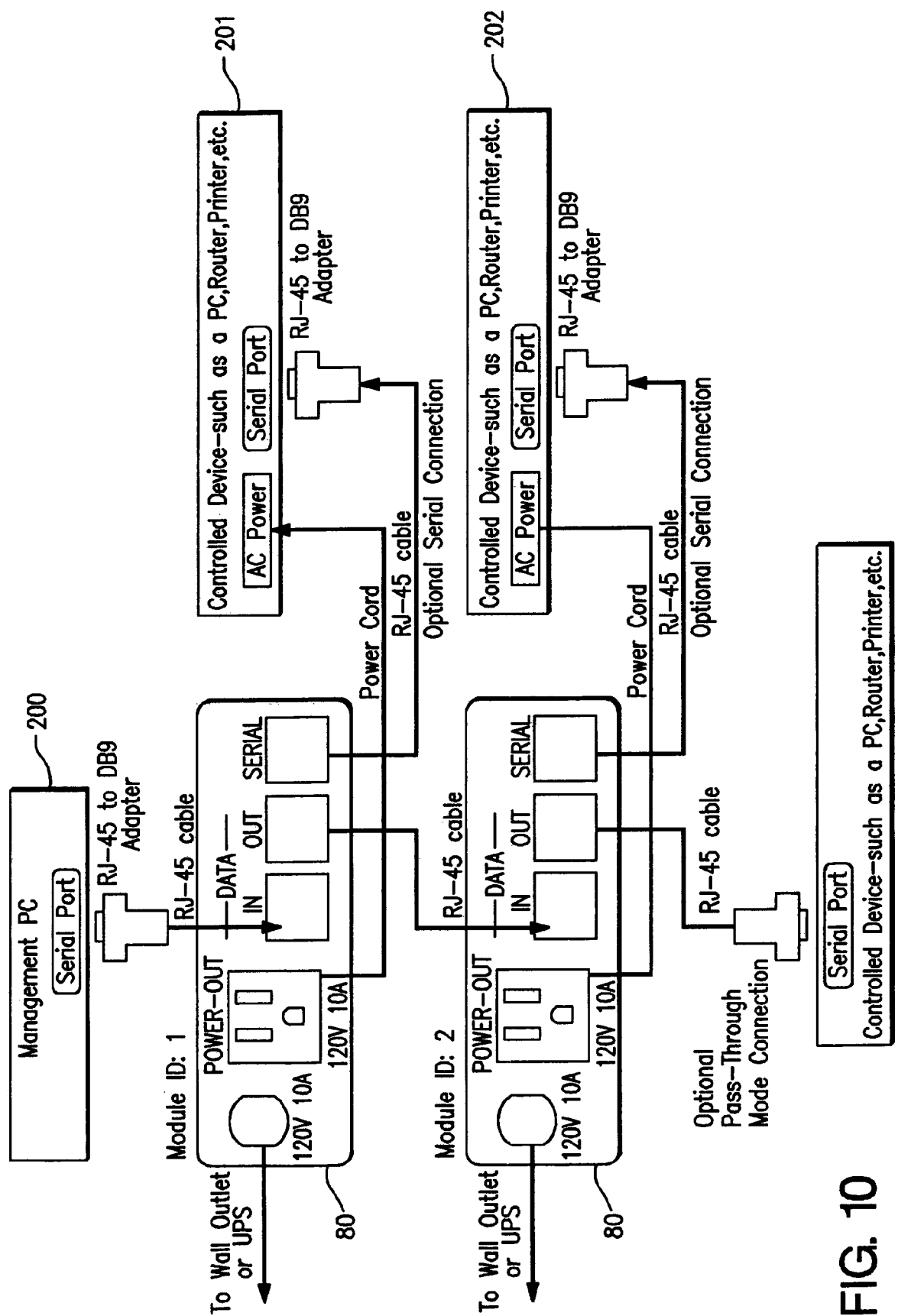
FIG. 10 is an example embodiment of daisy-chained control modules in accordance with an example embodiment of the present invention.

Instead of connecting the KEY-VIEW PCI card directly to a single Host PC, as described above, KEY-VIEW II alternatively permits connecting the card directly to a supported PC switch box that may in turn allow switching between multiple PC's using special keyboard hot keys. If the KEY-VIEW PCI card is to be connected to a supported third party switch box, it is advisable to power off all PCs connected to the switch box. If NET-911 Control Modules (FIG. 10) are to be connected to the Host PCs connected to the Switch Box, then the Control Modules are daisy-chained and connected to these Host PCs; as shown in FIG. 10.

Figure 12:
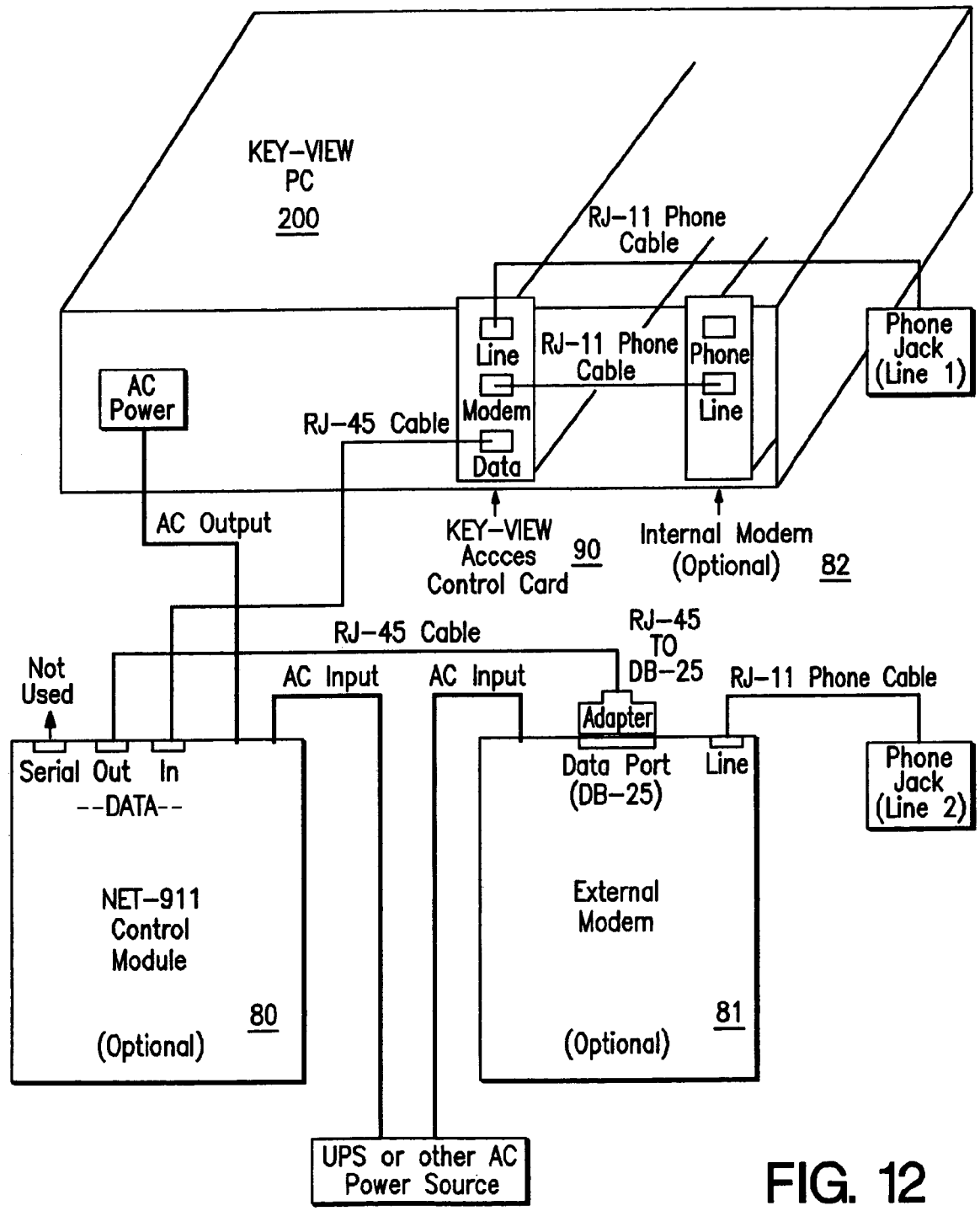
FIG. 12 is a combination schematic and perspective view of an example embodiment of the present invention including a remote access PC, control module, and modem.

One KEY-VIEW Access Control Card 90, shown in FIGS. 11 and 12, may be installed in a ISA slot in KEY-VIEW PC. The primary functions of this card are (1) to permit the KEY-VIEW PC to be remotely rebooted in the event it should lockup; (2) to alert host site personnel that someone is remotely accessing the KEY-VIEW PC by causing the turbo light on the PC to blink; (3) to capture and log the caller ID of anyone attempting to access the KEY-VIEW PC by modem, (4) to optionally automatically terminate a phone connection if the caller ID has been blocked or the caller's phone number does not match a list of pre-authorized numbers, and (4) to issue pager alerts in the event an unauthorized user is detected.

One of two alternatives can be used to permit the KEY-VIEW PC to be remotely rebooted.

The first alternative is shown in FIG. 12 and requires that an optional NET-911 Control Module 80 be connected to the Access Control Card's RJ-45 DATA port using the RJ-45 cable provided with the module 80. In this case the module's AC power output cord is plugged into the KEY-VIEW PC's power input receptacle and the module's AC power input cord is plugged into a source of AC power such as a wall outlet or UPS. Mien a KEY-VIEW Control Module is used in this manner no other modules may be daisy chained to this module. After a module is connected in this manner, the KEY-VIEW PC will be automatically cold-booted by instructing the module to temporarily cut power to the KEY-VIEW PC for 20 seconds when the reset card determines that the KEY-VIEW PC should be rebooted (see below). This alternative is the recommended remote boot approach.

The second alternative for rebooting the KEY-VIEW PC requires that the two pin cable supplied with each access card be connected from the pins labeled Reset (FIG. 11) on the card 90 to the reset pins on the KEY-VIEW PC's motherboard and the reset button on the front of the KEY-VIEW PC be connected to the Access Control card 90. After a module is connected in this manner, the KEY-VIEW PC will be automatically reset by closing the pins on the KEY-VIEW PC's motherboard (as if the reset button was physically pressed) when the reset card determines that the KEY-VIEW PC should be rebooted (see below).

The main advantage of using the Control Module alternative over the internal reset alternative is the Host PC can be cold booted, which is usually a more reliable means to insure that the KEY-VIEW PC and all cards in the PC are fully reset. The primary advantage of the internal reset alternative is that it avoids the added cost of a Control Module 80. If both alternatives are installed at the same time, the Control Module alternative will be invoked first and the reset option only used if the Control module fails or is removed. In other words, when a Control Module 80 is connected to Access Control Card 90, the card will automatically sense the module's presence and cold-boot the KEY-VIEW PC, when necessary, instead of using the internal reset approach.

In addition to the two different hardware approaches to remotely rebooting the KEY-VIEW PC, there are also two options for initiating the reboot process, remotely. Reboot processing can either be initiated (1) based on the number of phone rings detected by the reset card or (2) via a password sent to an optional modem connected to the optional NET-911 Control module 80. Rebooting the KEY-VIEW PC remotely is necessary in the event the KEY-VIEW PC should ever lockup (i.e. not respond when a user attempts to access the KEY-VIEW PC remotely).

The access card 90 monitors all incoming phone calls and may be configured to reboot the KEY-VIEW PC in the event (1) less than a user defined number of rings are detected or (2) more than a user defined number of rings are detected.

When a modem is installed in the KEY-VIEW PC, it is possible that the modem answers a call, but the KEY-VIEW and/or the remote access engine is locked up. In this case, it will be necessary to remotely reboot the KEY-VIEW PC. In order to do this the remote access engine is configured to tell the modem 82 to answer a call only after four rings. Then, the KEY-VIEW Enable Reboot when less than rings option (discussed later) should be set to three rings. Using these settings, a remote user would then simply call the KEY-VIEW PC and hang up after two rings, thereby causing the KEY-VIEW PC to reboot.

It is also possible that when the KEY-VIEW PC locks up the modem 82 locks up too and will simply not answer a call. Also, in cases where a modem is not installed in the KEY-VIEW PC and the KEY-VIEW PC is accessed remotely either via a LAN or the Internet, a means is still be necessary using a phone line to remotely reboot the KEY-VIEW PC should it lockup. Both of these problems can be solved by setting the Enable Reboot when more than rings option to six or more rings. In this situation, a remote user would simply call the KEY-VIEW PC and wait for more than six rings before hanging up, which will cause the KEY-VIEW PC to reboot.

In rare cases, it is possible that a modem installed in the KEY-VIEW PC could lockup and hang onto a phone line, so that the line was always busy when a remote user attempts to access the KEY-VIEW PC or to reboot the PC. In addition, remote users may wish to have the ability to terminate another remote user's access during an emergency situation. Both of these situations can be resolved by connecting an external modem 81 to the RJ-45 DATA OUT port of the optional NET-911 Control Module 80 connected to the Access Control card (using the CMM modem RJ-45 to DB-9 (male) connector provided with the module). In this configuration (shown in FIG. 12), a second (different) phone line must be connected to this optional modem 81. An older, surplus external modem works well in this case, since this modem doesn't operate above 2400 baud. FIG. 12 illustrates how to connect both an optional NET-911 Control Module 80, an external modem 81, and an internal modem 82 to a Access Control Card 90.

When an external modem 81 is installed, any DIP switch setting on the modem should be set so as to not prevent the modem from auto-answering a call. After installing the external modem, the option to use this modem must be enabled and a password defined. After the modem has been properly installed and set to accept a password, a remote user would simply use a terminal emulation program such as Hyperterminal (supplied with Windows) to (1) call the external modem, (2) type "RESET" when the connection was completed and (3) enter the correct password when prompted by the Access Control card 90 thereby causing the KEY-VIEW PC to reboot.

An Access Control Card 90 also has the capability to issue pager alerts in the event a potential intruder is detected. Such pager alerts would be appropriate if a user fails to enter a correct password within a pre-specified number of guesses or a caller ID is detected from an unauthorized phone number. Person(s) to be alerted via pager and the related pager codes can be defined using the Pager Alert menu option (discussed later). In order to issue a pager alert, an optional external modem 81 must be connected to the Access Control Card 90, as discussed above.

When the KEY-VIEW Access Control Card 90 is installed, one of the cables from a front panel status light (e.g. turbo light) on the KEY-VIEW PC is unplugged from the KEY-VIEW PC's motherboard and plugged back into the LED pins (J2 in FIG. 11) on the Access Control Card 90. This connection insures that one of the LED lights on the front of the KEY-VIEW PC blinks whenever someone is remotely connected to the KEY-VIEW PC. This blinking coupled with an audible beep is designed to alert personnel at the Host site whenever someone is remotely accessing the KEY-VIEW PC.

Preferably, the phone line has the optional caller ID feature from the phone company enabled so that KEY-VIEW will automatically capture the caller ID when a call is received. Activating the caller ID service on this line permits the KEY-VIEW Access Control Card to track and log all calls received and to optionally automatically terminate a call from a remote user whenever (1) a caller ID is not available, (2) has been intentionally blocked (i.e. the caller precedes their call with *67). or (3) where the caller's ID is not on a list of pre-authorized ID's. See the Caller ID topic for information on how to configure these KEY-VIEW caller ID features.

KEY-VIEW PC Video Monitor Installation

A VGA monitor 214 is plugged into the KEY-VIEW PC's video card. Normally the monitor that was unplugged from the Host PC 201-204 or Switch Box is used for this purpose. This video monitor reflects what is happening in the KEY-VIEW PC or active Host PC and is normally the only monitor needed for the KEY-VIEW PC. When the KEY-VIEW PC is in a Host Mode this monitor reflects what appears on the active Host PC 201-204 on a slightly delayed basis. Since the KEY-VIEW PC can switch from Host PC to Host PC only one monitor is needed to view the active PC once the switching process is complete.

Some users want to view the active Host PC 201-204 on a real time basis. For these users, a Video output port exists on back of each PCI card that passes through the video output signal of the active Host PC for each PCI card on a real time basis. In cases where more than one PCI card is installed in the KEY-VIEW PC multiple monitors would be required at the Host site to see the output of the active Host PC. To avoid the need for such multiple monitors, a simple, inexpensive A-B style video switch box can be installed to switch between each of the PCI cards video output ports and the KEY-VIEW PC's video card's output, so that one monitor will be able to view anything on a real time basis.

Normally an internal modem is installed in the KEY-VIEW PC permitting remote access via modem to the KEY-VIEW PC. In addition to the modem, it is also suggested that another means of remote access be also installed in the KEY-VIEW PC, such as a LAN card.

Figure 29:
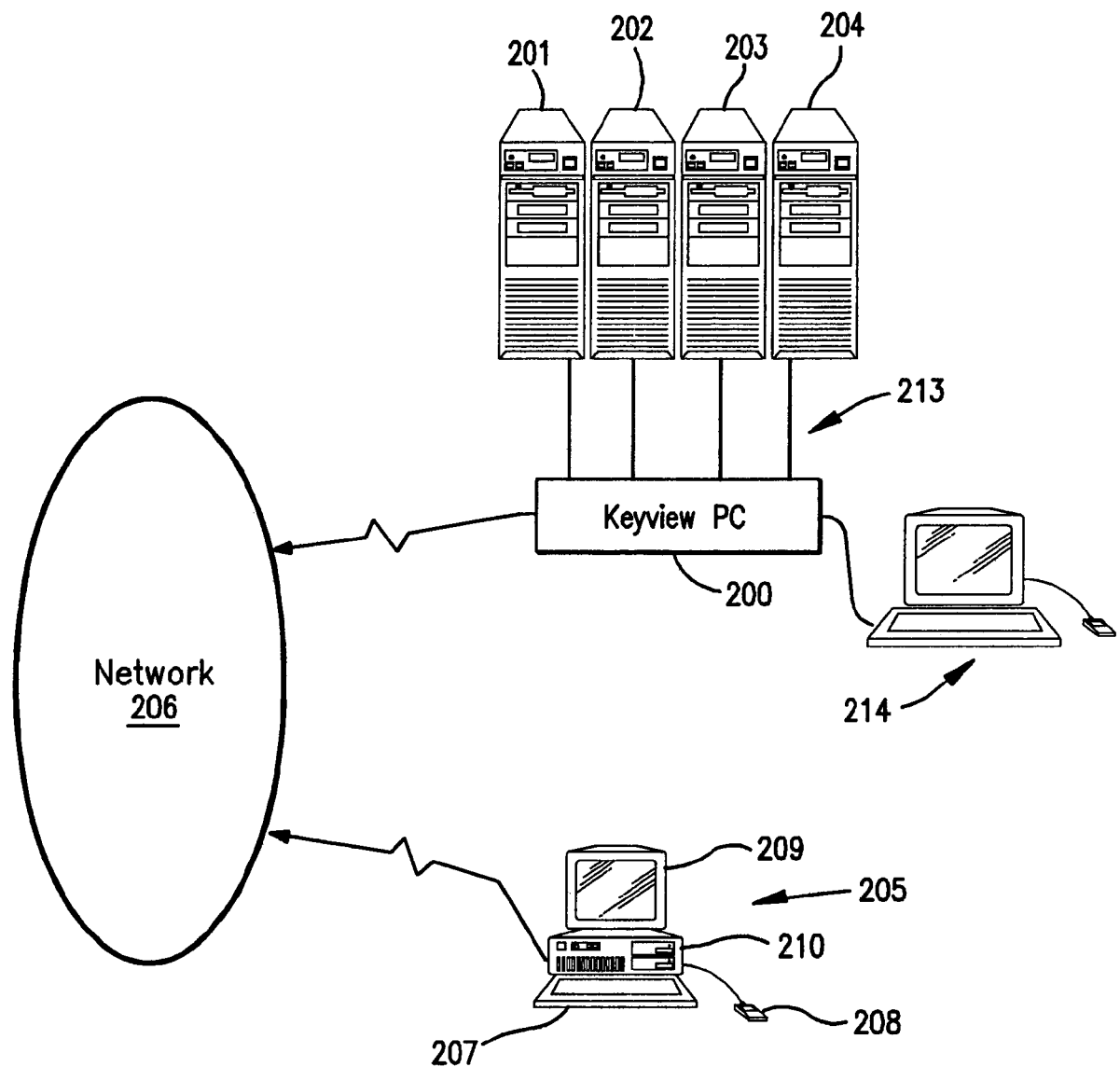
FIG. 29 is another example embodiment of present system configuration.

Normally a LAN card is installed in the KEY-VIEW PC that is compatible with a customer's internal network to permit remote LAN or Internet access to the KEY-VIEW PC. An example of this is shown in FIGS. 28 and 29, where remote site 205 accesses the Keyview PC directly via network 206. Network 206 may be a LAN wherein the remote PC 210 and Keyview PC 200 include internal LAN cards. Since remote access to a KEY-VIEW PC is often needed on an emergency basis, another means of remote access can be installed in the KEY-VIEW PC, such as a modem 81/82.

After the applicable LAN card is installed in the KEY-VIEW PC, the card should be connected to the LAN as shown in FIGS. 28 and 29.

Normally NET-911 Control Modules are connected to one of the KEY-VIEW PC's serial port (FIG. 12). These modules are daisy chained together (FIG. 10) and connected to each Host PC accessible by the KEY-VIEW PC to permit serial access to and power control of the Host PCs by a remote user. The serial access feature of the modules is normally used to facilitate file transfers between a Host PC 201-204 and KEY-VIEW PC 200. Any other device for which serial access and/or power control is required remotely, such as routers or printers, may be connected to modules on the daisy chain. So, in this regard the KEY-VIEW PC becomes an all inclusive platform for remotely managing network devices.

Start-Up Processing

Each time the KEY-VIEW II PC is rebooted the following major events occur:

The operating system is loaded including any device drivers such as a LAN driver for a network interface card or the modem driver for any modem installed in the KEY-VIEW PC.

Any Device drivers needed to access the KEY-VIEW PCI card(s) will be loaded to permit the KEY-VIEW application to communicate with the card.

The KEY-VIEW PCI cards operating system will be loaded from the KEY-VIEW PC's disk drive into the cards memory. This approach facilitates PCI card firmware upgrades to occur simply by replacing the PCI card's operating system's program files with new program files.

Next, the remote access engine is automatically loaded in a "Host" mode using whatever means (up to 2) the user has specified to permit remote access to the KEY-VIEW PC (e.g. modem and LAN access could both be specified).

The KEY-VIEW II application (KV-APP) is then activated automatically, whereupon the following events occur:

The KEY-VIEW PC switches to an 800×600 graphics mode and the KEY-VIEW II graphics logo displays for 5 seconds. This Logo can be cleared sooner by pressing any key or clicking a mouse button.

While the KEY-VIEW II logo is being displayed, the KEY-VIEW application accesses information stored on a disk status file as to the last active Host PC (e.g. PCI Card ID, switch box PC ID, video driver for the PC, etc.). This information is then be sent as commands to the KEY-VIEW PCI cards thereby causing the appropriate KEY-VIEW PCI card to become the active card.

If the last accessed KEY-VIEW PCI card is no longer accessible (e.g. it does not respond to the KEY-VIEW II applications request to become active), an error message will be displayed and the KEY-VIEW II system reverts to it's Menu Mode. While in a Menu Mode, all Remote or Host site key-board or mouse input controls the KEY-VIEW PC instead of the Host PC. From this Menu mode, a user can attempt to re-access the last active PCI card or select another PCI card to access, if there is more than one KEY-VIEW PCI card in the KEY-VIEW PC.

If the last accessed KEY-VIEW PCI card is accessible, the KEY-VIEW PC will automatically initiate Host mode processing wherein the active Host PC's screen is mirrored using the KEY-VIEW PC's full screen (i.e. the KEY-VIEW PC graphics mode is automatically adjusted to the graphics mode of the active Host PC) and Remote or Host site keyboard/mouse inputs are forwarded to the active Host PC.

As indicated by the above steps, once the KEY-VIEW application becomes operational, it will operate in one of two modes, namely either a Host Mode or Menu Mode and normal KEY-VIEW II processing commences. Tapping the left Ctrl key four times causes the KEY-VIEW PC to switch from a Host Mode to a Menu Mode. From the Menu Mode, either pressing the F5 key or selecting the Exit Menu Mode option from the KEY-VIEW main menu bar Other option causes the KEY-VIEW PC to switch from a Menu Mode to a Host mode.

The KEY-VIEW Host Mode gives a user total control over the active Host PC from the KEY-VIEW PC. In the Host Mode all remote or host site mouse or keyboard input is trapped (i.e. redirected) by the KEY-VIEW application and passed to the active Host PC, as if the Remote/Host site's keyboard/mouse was directly attached to the active Host PC. In cases where multiple Host PCs are connected to the KEY-VIEW PC only one Host PC may be designated at any point in time as the active Host PC. If necessary, information, such as the status of the keyboard's num lock, caps, lock and scroll lock lights would be passed back through the KEY-VIEW system so the Remote and local PC's keyboard status lights would reflect the status lights of the active Host PC.

The KEY-VIEW II Menu Mode permits (1) configuring the KEY-VIEW PC for KEY-VIEW processing including adding PCI cards, Host PCs definitions, etc., (2) switching between Host PCs, (3) accessing NET-911 Control Modules to control power to Host PC and/or serial access Host PCs, and (4) creating video or mouse drivers necessary to successfully control a Host PC. In the KEY-VIEW Menu Mode both Remote and Host keyboard/mouse activity is input is directed to the KEY-VIEW PC. Normally a user would only switch to a Host Mode temporarily to perform a specific task, which is typically to switch from Host PC to Host PC or to access NET-911 Control Modules. A more detailed discussion of the processing options available under the Menu Mode are discussed under that topic.

Host Mode

The KEY-VIEW Host mode gives a user total control over the active Host PC. In the Host Mode all Remote or Host site mouse or keyboard input is trapped by the KEY-VIEW application and passed to the active Host PC, as if the Remote/Host site's keyboard/mouse was directly attached to the Host PC. If necessary, information, such as the status of the keyboard's num lock, caps, lock and scroll lock lights would be passed back through the KEY-VIEW system so the Remote and local PC's keyboard status lights would reflect the status lights of the active Host PC.

When in a Host Mode, the KEY-VIEW PC's screen reflects what is being displayed on the Host PC's screen. In cases where the Host PC screen is in a different graphics mode, then the KEY-VIEW PC's screen, the KEY-VIEW application will automatically change the graphics resolution of the KEY-VIEW PC to match the graphics resolution of the Host PC's screen, so that the Host PCs screen will always be displayed on a full screen basis on the KEY-VIEW PC. Supported graphics resolutions are 640×480, 800×600 and 1024×768.

From a Host mode certain "hot key" combinations are trapped by the KEY-VIEW application and not passed back to the active Host PC. Hot key actions are triggered by 4 consecutive press-releases (taps) of the hot key within a 3 second interval. A list of these keys are discussed below. Tapping hot keys four times was set as a standard for KEY-VIEW II to minimize any chance of interfering with similar multi-tap hot-key approaches that may be used by applications running on a Host PC. Hot keys must be tapped consecutively, so any key pressed other than the hot-key resets the hot-key tap counter.

In cases where a user taps one of the above hot keys less than 4 times during a 3 second interval, then all of the key taps will be assumed to be directed at the active Host PC and will be passed through to the Host PC. This approach insures that the KEY-VIEW application will not trap possible hot key tap combination used by other applications.

When a KEY-VIEW PCI card is connected to a switch box, a special procedure exists to help avoid the need to switch from a Host mode to a Menu mode. The KEY-VIEW menu system permits the assignment of any one of the various supported switch box hot key sequences to the standard KEY-VIEW hot key sequence of tapping the Left Shift key four times. For example, the switch box command code of <NumLock> <Minus> <Num Lock> could be assigned to this special Left Shift key sequence for a given KEY-VIEW PCI card, so that when KEY-VIEW detects the Left Shift key sequence from either a Remote or Host site user while in a Host mode, KEY-VIEW would send the <NumLock> <Minus> <Num Lock> sequence to the Host PC and do whatever is necessary to load any drivers or other steps required when switching between PCs. This approach has the added benefit of permitting a user to use the same procedure at either a Host or Remote site to switch between PC's connected to a switch box.

To avoid having to trap a variety of different Hot keys for switch boxes, which may conflict with hot keys used by user applications, KEY-VIEW will not look for the entry of any switch box vendor's hot key sequences. If such keys are entered and cause a switch box to switch PCs, the KEY-VIEW application may be unaware of the change and may not decode the video output of the new PC correctly. This may cause an unreadable Host screen image to appear on the KEY-VIEW PC.

When a user switches between PCs on a switch box via either (1) pressing a different channel selector button on the switch box or (2) entering the vendor's hot key sequence instead of tapping the Left shift key four times, KEY-VIEW will not be aware of the change until after the change occurs. In these cases, supported switch boxes are designed to send a special code back to the KEY-VIEW application alerting the application that a change has already occurred. In rare cases it is possible that this feedback may not occur. In this event the KEY-VIEW PC will not be in sync with the Host PC, causing the Host PC's screen to be scrambled. Moreover, even when the change is detected, the Host screen will be scrambled from the time the change is detected until KEY-VIEW performs the necessary steps to sync to the new Host PC's video output. Accordingly, tapping the Left Shift key is the recommended approach to switch between switch box PCs.

In cases where this is no active Host PC, the KEY-VIEW application will not permit switching from a Menu Mode to a Host mode until a Host PC is successfully selected as the active Host PC.

When in a Host mode, the user at the Host site will see a slightly delayed painted image of the Host PC's screen (assuming a monitor at the Host site is connected to the SVGA card in the KEY-VIEW PC) and will be able to use the KEY-VIEW PC's mouse and keyboard to control the Host PC. To avoid Host PC screen display delays, a Host site user could plug a monitor directly into the SVGA output of a PCI card and plug a second monitor into the KEY-VIEW PC's SVGA card to access KEY-VIEW Menu mode or to test how fast KEY-VIEW is displaying the Host screen (by using the two monitors to compare the KEY-VIEW PCI card's real time video output to the KEY-VIEW PC's SVGA card output). For normal operation users at a Host site will likely just plug one monitor into the SVGA output of the KEY-VIEW PC and minimize any screen paint delays by reducing the number of colors displayed. This approach would avoid any confusion caused by the need to switch to different video ports when the KEY-VIEW PC is in a menu mode or when multiple PCI cards are installed. If real-time displays are essential for Host site users, then an inexpensive video switch box to switch between the PCI card(s) video outputs and the KEY-VIEW PC's SVGA video output.

As mentioned, a user at a KEY-VIEW PC with only one KEY-VIEW PCI card would rarely need to use KEY-VIEWs Menu mode or see the normal SVGA output of the KEY-VIEW PC's SVGA card. Even if this single PCI card were connected to an external PC switch box, the Host site user could enter keyboard "hot-key" commands to switch between PC's connected to the card, as opposed to going into a KEY-VIEW Menu mode. However, remote users would need to use the Menu mode because pcAnywhere may block the necessary keyboard hot key commands necessary to switch between PC connected to the switch box (e.g. <NumLock> <Minus> <Num Lock>). Avoiding this need to switch to a Menu mode is desirable. If the remote user leaves a KEY-VIEW PC in a Menu mode and the timer used to automatically switch back has been disabled; a subsequent user at the Host site may become confused (because they will not see the KEY-VIEW's screen is in a Menu mode) when they try to use the KEY-VIEW PC's mouse or keyboard and it doesn't pass through to the Host PC.

When a KEY-VIEW PC is rebooted, it will automatically attempt to initiate Host mode processing. This approach assures that KEY-VIEW PC is always ready to control the active Host PC.

When KEY-VIEW user security has been activated on a KEY-VIEW PC, KEY-VIEW will automatically terminate Host mode processing and display a special login screen each time the KEY-VIEW PC is remotely accessed. The remote user must then enter the correct Login ID and password before KEY-VIEW will permit access to the KEY-VIEW application. In addition to prevent a situation where a remote user attempts to gain access to the application by rebooting the KEY-VIEW PC, when user KEY-VIEW user security has been activated, KEY-VIEW requires that a user login whenever KEY-VIEW application processing is initiated.

Menu Mode

The KEY-VIEW IT Menu Mode permits (1) configuring the KEY-VIEW PC for KEY-VIEW processing including adding PCI cards, Host PCs definitions, etc., (2) switching between Host PCs, (3) accessing NET-911 Control modules to control power to Host PC and/or serial access Host PCs, and (4) creating video or mouse drivers necessary to successfully control a Host PC. In the KEY-VIEW Menu Mode both Remote and Host keyboard/mouse activity is input is directed to the KEY-VIEW PC.

The KEY-VIEW main menu options bar is at the top of the KEY-VIEW PC's screen while in a Menu Mode. This menu consists of several options and sub-options. When a main menu option is selected, additional menus are displayed. An example menu is shown in FIG. 13.

From anywhere in the Menu mode, including in the middle of a data entry operation, control can be returned to the last active PCI card and Host PC whenever a Remote or Host site user taps the F5 key. When the F5 key is pressed, any active data entry item or unfinished new entry, such as the definition of a new PC. will be ignored. For this reason, it is not recommended to hit the F5 key while any data entry process or transaction is active. The recommended method to return to the Host mode is to select the Exit Menu Mode item from the Other menu option.

In cases when a KEY-VIEW PC has only one PCI card, a Host site may not have a monitor connected to the KEY-VIEW PC's SVGA card. If someone at a Remote site leaves the KEY-VIEW PC in a Menu mode when terminating their connection, a Host site user may get confused and frustrated when they attempt to access a Host PC and find they do not have keyboard/mouse control. To correct this situation, the KEY-VIEW system has a feature that automatically returns to a Host mode if either Remote or KEY-VIEW keyboard input is not detected for a user defined number of seconds. The number of seconds desired is one of the data entry options in the Menu mode. This auto-switch feature may be disabled by setting the number of seconds to zero.

When either (1) a KEY-VIEW PC at a Host site is switched to a Menu mode or (2) KEY-VIEW application processing has been terminated on the Host PC, the Host site user will need to either reboot the KEY-VIEW PC or connect a monitor to the KEY-VIEW PC's SVGA card to control the KEY-VIEW PC. In either of these cases, control of any Host PCs connected to the KEY-VIEW PC will not be possible until the KEY-VIEW PC is returned to a Host mode. For this reason, it is recommended that (1) the KEY-VIEW application on the Host PC never be terminated from the Menu mode and (2) the auto-switch feature be implemented to permit the KEY-VIEW application to automatically return from a Menu mode to a Host mode after a user defined number of seconds. The latter feature will solve the problem where remote users leave a KEY-VIEW unit in a Menu Mode when terminating a connection, thus precluding Host site users from controlling Host PCs until they exit the Menu mode.

Switch

The "switch" menu option of FIG. 13 coordinates switching between PCs and switching between modules.

The Switch PCs sub-menu (FIG. 14) option is used to add/delete Host PC definitions or permit a user to switch between Host PCs in cases where multiple Host PC's are connected to a KEY-VIEW PC. KEY-VIEW supports switching between PCs either by (1) switching between KEY-VIEW PCI cards in the KEY-VIEW unit or (2) switching between PCs connected to a single card (via a supported switch box). This menu option permits switching between PCs in either of these two cases.

Figure 15:
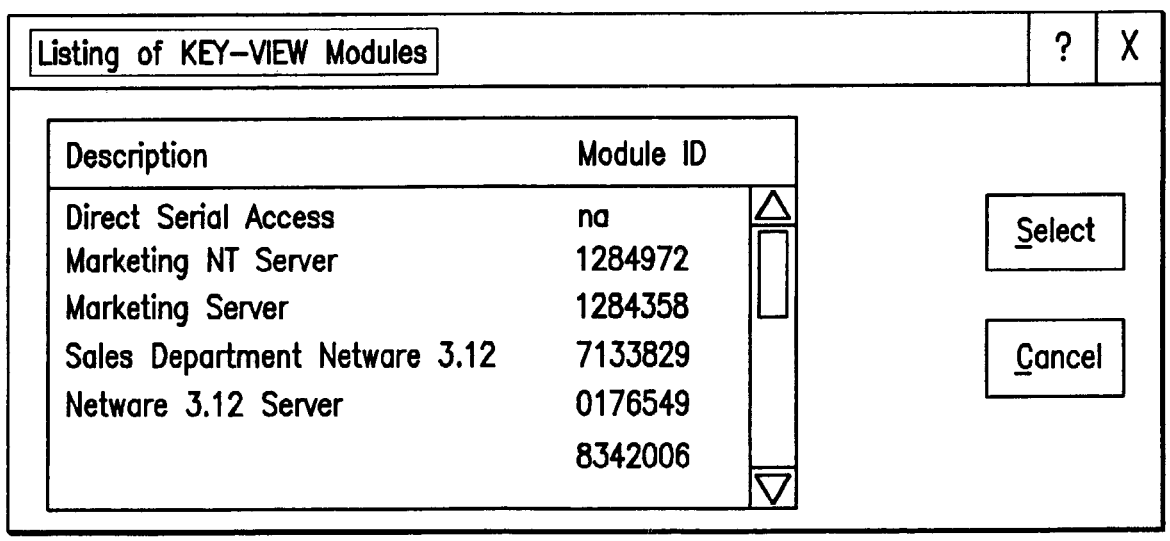

The Switch Modules sub-menu (FIG. 15) option permits switching between optional NET-911 Control Modules that may be daisy-chained together and connected to one of the KEY-VIEW PC's serial port. This approach permits a remote user to control AC power or serial access to any device connected to each module (e.g. a Host PC, router, etc). When this menu option is selected, a list all NET-911 modules detected on the serial port is displayed. From this list a module may be selected as the "active module" permitting AC power to turned ON or OFF to the device(s) receiving AC power from that module or the KEY-VIEW PC to serial access any device plugged into that module's serial port.

a. Switching PCs

Figure 14:
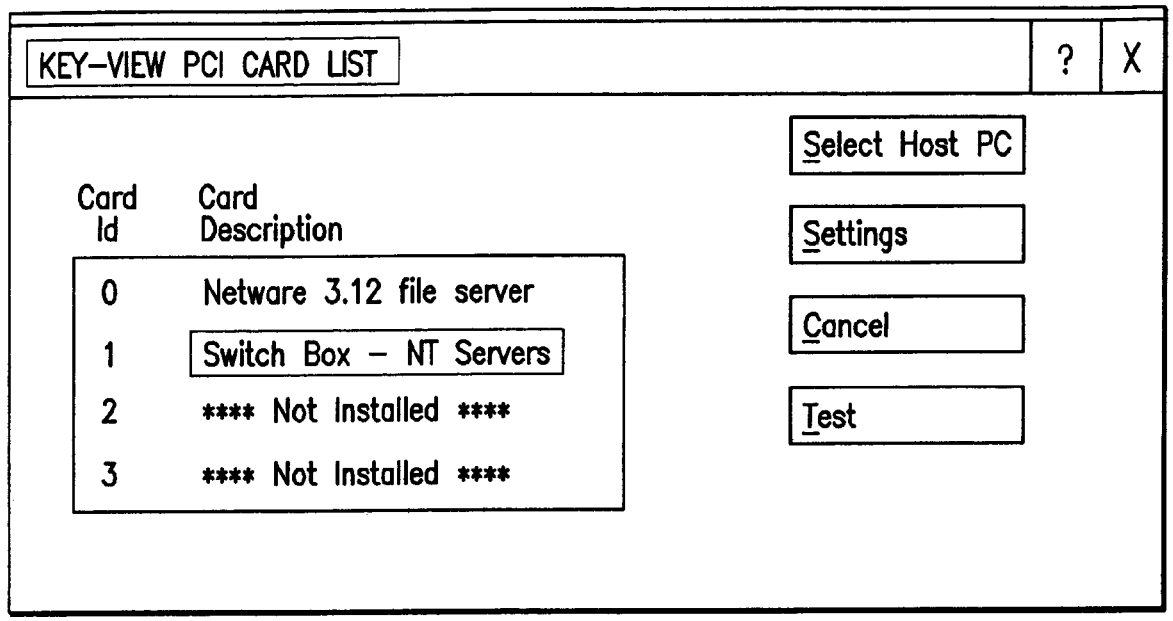

The switch pc's sub-menu option is a list of the all of the possible PCI card numbers (Card-IDs), and related, user specified, 40 character Description of what is connected to the card. An example list is shown in FIG. 14.

When the KEY-VIEW PC is booted the KEY-VIEW polls each of the 8 possible PCI card ID's to see which cards respond to the poll. A table will then be built by the KEY-VIEW of the cards that respond.

The Card ID column displays the KEY-VIEW PCI cards ID number which would range from 0 to 7.

The Card Description column displays a 40 character description of the card previously defined by the user.

The Select Host PC button applies to the PCI card ID presently highlighted in the PCI card list box. If the highlighted PCI card is connected directly to an active Host PC, then that Host PC will become the active Host PC and that PC will be controlled by the KEY-VIEW when the KEY-VIEW PC is in a Host Mode. If the highlighted PCI card is connected to a PC Switch box, then a window of those Host PC's defined for this Switch Box will be displayed as discussed further under the Switch Box PC List topic. What the KEY-VIEW PCI card is connected to is determined by the "Card Connected to" setting, as defined by clicking on the Settings button.

When a PCI card is selected, the PCI card is internally retested to make sure the card is still accessible. If it is no longer accessible, an error message is displayed.

The Settings button permits the configuration data for the highlighted PCI card to be entered or changed. A window entitled "KEY-VIEW PCI CARD SETTINGS" appears showing the current setting for the PCI card. Processing occurring for this window is discussed under the "PCI Card Settings" topic following Test—If a card ID is installed that was not detected, that card number may be highlighted and the Test button option selected to check if the card may have just temporarily malfunctioned at boot up. When the Test option is selected, the highlighted card ID will be retested and if found the card's description will be displayed next to the Card ID on the PCI card ID list.

An entry is added to the KEY-VIEW event log whenever a new Host PC is selected as the active Host PC.

PCI Card Settings

The KEY-VIEW PCI Card Settings screen, an example of which is shown in FIG. 17, permits entering or changing the configuration of the selected KEY-VIEW PCI card. A description of each setting on this screen is as follows:

"Card Description" is a user-defined description for each PCI card installed in the KEY-VIEW PC.

"Card Connected To" references whether a KEY-VIEW PCI card is connected directly to either a (1) Host PC or (2) Switch Box that permits the PCI card to access multiple Host PC.

Switch Box Hot Keys This entry is not accessible (i.e. it is grayed out) when the Card Connected To setting is set to PC. Otherwise, the currently selected switch box hot key entry is displayed in this pull-down Window. Switch Box Hot Keys are whatever key sequence has been specified by the switch box manufacturer to cause their switch box to go into a command mode to permit switching between channels (i.e. PCs) on their switch box.

Figure 18:
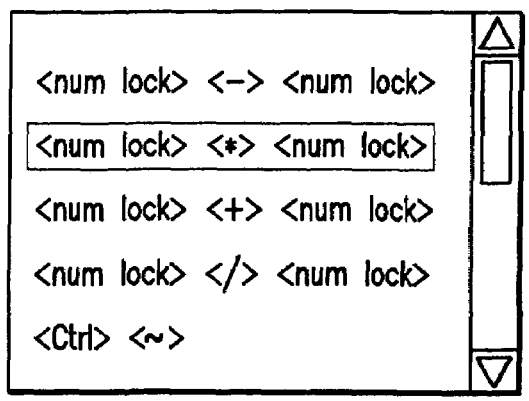

Upon clicking on this pull down menu's arrow, a list of any switch box hot key commands supported by KEY-VIEW is displayed, an example list is shown in FIG. 18.

A Hot key sequence is selected for each switch box connected to each PCI card. This approach permits different command mode sequences to be defined for each PCI card in a KEY-VIEW PC. This sequence will also be assigned to the KEY-VIEW PC's left Shift key, so that when the left shift key is tapped four times when connected to this PCI card, the command sequence will be sent to the switch box connected to the active PCI card. This left shift key procedure is very useful shortcut for Host site users to switch between PCs connected to a switch box without having to enter the KEY-VIEW menu system.

Returning to FIG. 17, the "Video Drivers" menu specifies up to a 12 character video driver name containing the video attributes needed by KEY-VIEW to properly interpret this Host PC's video output signal.

The "Mouse Interface" menu entry indicates the type of interface (i.e. PS/2 or Serial) to which this PCI card's mouse cable is connected.

The "Mouse Driver" menu defines the mouse driver name for any PC connected directly to the card.

KEY-VIEW PC ID—This entry is not user updatable. The PC ID number is displayed only if the Card Connected To entry is set to PC. Internally KEY-VIEW assigns a unique sequential number to any Host PC defined. This number will be a part of any driver file names related to the PC.

Switch Box PC List

When a KEY-VIEW PCI card is connected to a PC switch box, each PC connected to the switch box must be defined and configured to permit the KEY-VIEW PC to access each PC. This dialog box, an example of which is shown as FIG. 19, contains a list of all those PC previously defined and permits (1) designating a PC on the list the active Host PC, (2) modifying the configuration of a PC on the list, (3) adding and configuring a new PC, or (4) deleting a PC definition from the list.

The Switch Box PC List window displays information on each PC connected to the switch box as follows:

1) The PC ID column displays the PC's identifying number. Internally, KEY-VIEW assigns each PC added to the list a unique, sequential PC ID number. This number is useful in identifying the PC when viewing the KEY-VIEW event log.

2) The PC Description column displays the 40 character user defined description of the PC.

When the "Settings" button of FIG. 19 is selected, the Switch Box PC Settings screen permits entering or changing the configuration of each PC connected to the PC switch box that is connected to the selected KEY-VIEW PCI card. An example screen is shown in FIG. 20. A description of each setting on this screen is as follows:

PC Description—For a newly added PC the description is blank. In this case a unique description must be entered that clearly identifies the new Host PC to KEY-VIEW users.

The Switch Box ID entry identifies the key sequence (e.g. channel ID) that needs to be sent to the switch box (immediately following the Switch Box Hot keys command Setting—see below) to cause the switch box to switch to this PC.

The Video Driver entry specifies up to a 12 character video driver name containing the video attributes needed by KEY-VIEW to properly interpret this Host PC's video output signal.

The Mouse Driver entry defines the mouse driver name for the PC.

The KEY-VIEW PC ID in FIG. 20 is an internally assigned a unique sequential number for each Host PC defined. This number will be a part of any driver file names related to the PC.

b. Switching Modules

Under the switch menu a switch modules sub-menu exists. The Modules main menu bar selection permits accessing the module daisy chain (referenced in FIG. 18), designating a module on the daisy chain as active, turning power OFF, ON or rebooting the device connected the active module and configuring module parameters. When this menu option is selected two sub-menu options appear as follows:

1) Module Processing—This menu selection permits accessing and controlling all of the modules on a daisy chain. This includes (1) designating a module on the daisy chain as active so that the device connected to the module may be serially accessed, (2) turning power OFF, ON or rebooting the device connected the active module, (3) placing the module daisy chain in a Pass-Through mode, and (4) specifying criteria to be used by NET-911 to automatically control power to devices connected to modules based on external events.

2) Module System Configuration—This menu option permits (1) specifying the COM port to be used to access a module daisy chain, (2) determining if users must enter into NET-911 a reason whenever power is turned OFF or ON (for event logging purposes) and (3) specifying the number of seconds between the time power is turned OFF and power is turned ON when rebooting a device connected to a NET-911 module.

Module Processing

Before activating Module Processing for the first time, the COM port to which the module daisy chain is connected must be properly specified using the Module System Configuration menu option. For newly installed NET-911 module software the COM port is set to COM1 by default.

When the Module Processing menu option (FIG. 16) is selected, the module daisy chain on the COM port specified in the Module System Configuration is polled automatically. The polling process takes about 1 second per module. During the polling process NET-911 determines if (1) new modules have been added to the chain, (2) modules have been deleted from the chain, or (3) the physical positions of the modules have changed, since the last time the daisy chain was polled. If any of these events occur, applicable messages are displayed on the screen at the end of the polling process and the changes are logged to the NET-911 event file. Also, any active modules are cleared during the polling process, which places the daisy-chain into a pass-through mode.

If no modules are detected during the polling process, an appropriate message is displayed and the Activate, Settings and Pass Through buttons on the Listing of Net-911 Control Modules window are grayed-out. When this occurs it is likely the wrong COM port has been specified, another device in the PC is interfering with access to the COM port or the daisy chain is not properly installed as discussed under the Hardware Installation topic.

When user security is enabled and the current user does not have access rights to all modules on a daisy chain, then only those modules for which the user may access appear on the module list. Setting user access rights is discussed under the "Security" below.

For each NET-911 control module detected on the daisy-chain, the Windows list box contain the following information:

| | |
|---|---|
| Pos | This field shows the modules physical order (position) in the chain. |
| Power | This field contains the current power status of the AC power "POWER OUT" cord on the back of each module. "ON" indicates any device(s) connected the module are receiving power. "OFF" indicates power has been cut to the device(s). |
| Module Description | This is a user defined description of the device to which the module is connected. |

Figure 16:
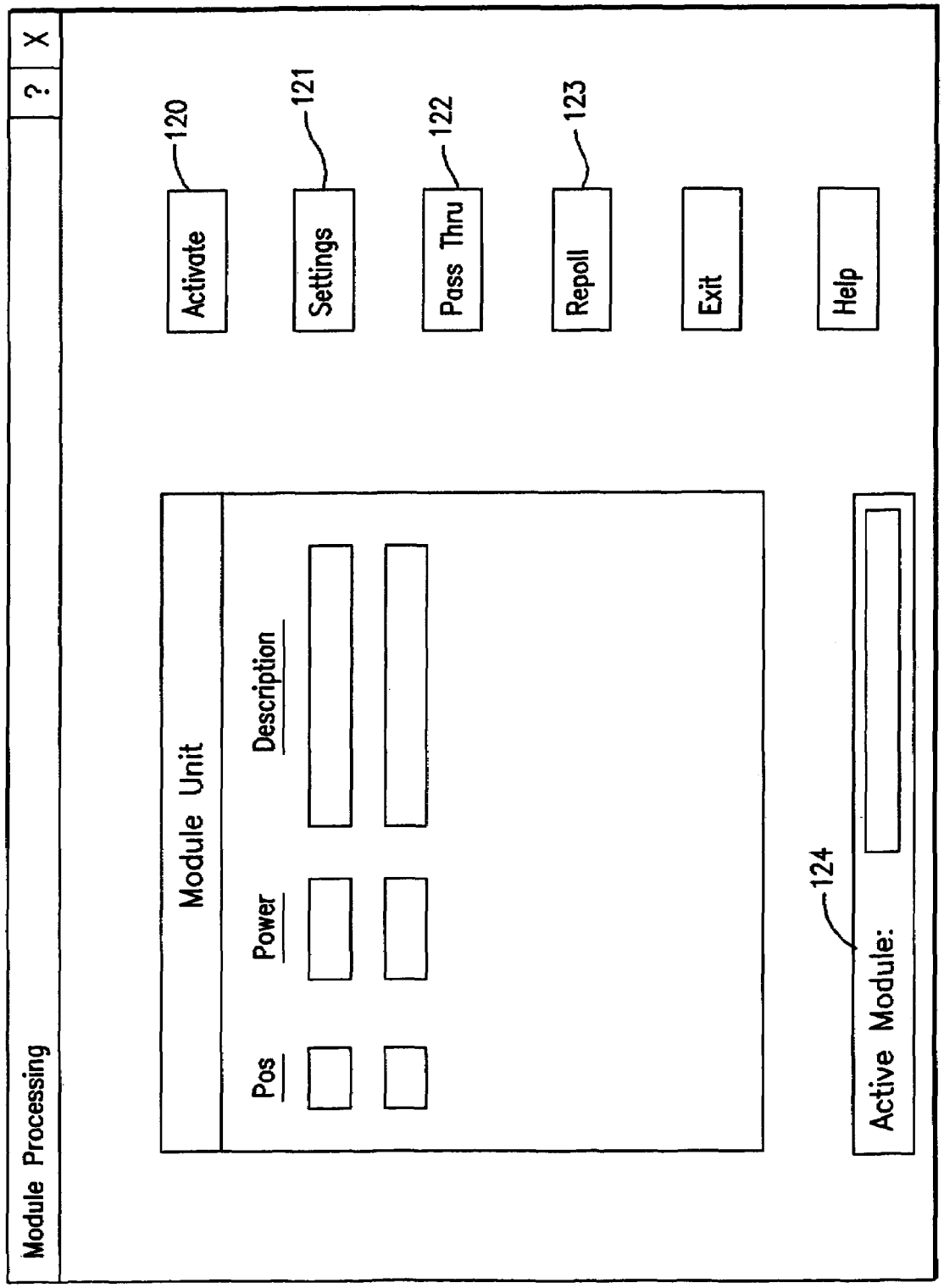

A description of processing occurring related to each of the options buttons on the List of NET-911 Control Modules in the window of FIG. 16 is as follows:

The Activate button 120 makes the currently highlighted module active. A module must be made active before the module's power or other settings may be changed or before any device connected to the module may be accessed serially by third party supplied terminal emulation software programs.

The Settings button 121 causes a setting window to appear with the following processing options and settings:

A Reboot button will reboot the active module. If this button is grayed-out, it means the module's "Output" AC power status is currently OFF in which case a reboot can be accomplished by simply clicking on the Power ON button. When this option is selected, a confirmation window appears requesting confirmation to start the reboot process. In addition, if either of the "Require Reason" settings (see Module System Configuration) are checked, a window pops up requiring up to two 50 character lines describing why the devices connected to the modules are being rebooted. After the action is confirmed (and any required reason entered), power will be temporarily cut to any device receiving power form active module's "Output" AC power receptacle for the number of seconds specified in the Module System Configuration "Reboot Delay in Seconds" settings.

When the reboot process begins, NET-911 exits from all module processing and returns to the main menu. This action is taken to preclude any further access to the module daisy chain until the reboot process is completed.

If necessary, the Reboot button could be used to reboot the PC that a NET-911 module is running on. When a reboot occurs, a NET-911 module acts on it's own to restore power in the user specified number of seconds without any support from the NET-911 application.

A Power ON button will turn power ON to the active module. If the "Require Reason for Power ON Actions" settings (see Module System Configuration) is checked, a window pops up requiring up to two 50 character lines describing why power is being turned ON.

A Power OFF button will turn power OFF to the active module. If the "Require Reason for Power OFF Actions" settings (see Module System Configuration) is checked, a window pops up requiring up to two 50 character lines describing why power is being turned OFF.

Also under the Settings sub-menu are:
a. Description of Device Connected to Control Module—This edit box displays the current description and permits the description to be changed.
b. Schedule Module Events—this section of the dialog box permits module power actions to be automated, as follows:
c. File Name to Trigger Reboots—This unique NET-911 feature permits a Drv:\directory\file name to be specified which, when detected by NET-911 causes any device(s) receiving power from the module to be rebooted. When the specified file is detected by NET-911, it is deleted before the reboot action occurs to prevent continuous rebooting. This features is useful to NET-911 customers with third party monitoring systems by allowing any device (where a problem is detected by the monitoring system) to be automatically rebooted. In this case the monitoring system would merely create the specified file to cause NET-911 to reboot the device. The contents of a reboot trigger file does not matter. NET-911 is only concerned about the existence of the file.
d. File Name to Trigger Power OFF—This unique NET-911 feature permits a Drv:\directory\file name to be specified that when detected by NET-911 causes power to be turned OFF to any device(s) receiving power from this module. When the specified file is detected by NET-911, it is deleted before the power OFF action occurs to prevent infinite power OFF actions. This feature is useful to NET-911 customers with third party monitoring systems by allowing power to be turned OFF when a problem is detected. In this case the monitoring system would merely create the specified file to cause NET-911 to turn power OFF to the device connected to the module. The contents of a power OFF trigger file does not matter. NET-911 is only concerned about the existence of the file.
e. File Name to Trigger Power ON—This unique NET-911 feature permits a Drv:\directory\file name to be specified that when detected by NET-911 causes power to be turned ON to any device(s) receiving power from this module. When the specified file is detected by NET-911, it is deleted before the power ON action occurs to prevent infinite power ON actions. The contents of a power ON trigger file does not matter. NET-911 is only concerned about the existence of the file.
f. Daily Scheduled Reboot Times—the devices connected to a NET-911 module may be rebooted on a time scheduled basis up to three times per day.
g. Daily Scheduled Power OFF Times—the devices connected to a NET-911 module may be have their power turned OFF on a time scheduled basis up to three different times each day.
h. Daily Scheduled Power ON Times—the devices connected to a NET-911 module may be have their power turned ON on a time scheduled basis up to three different times each day.
i. Module Information—this status section of the settings Window contains additional information about the module which cannot be updated. A description of each of these status items is as follows:
   a. Position Current—The current physical position of the module on the module daisy chain.
   b. Position Previous—The physical order (position) the module was at the last time the module daisy chain was polled.
   c. Power Status Indicates if power is ON or OFF to any devices connected to the module.
   d. Serial Number This field contains the module's serial number as assigned by the factory.
   e. Firmware Version This is the hardware/firmware version of the module and the modules operating system.
   f. Module Type Indicates if the module is Single Break module or a port on a Multi-Break module.

The Pass_Through button 122 clears any active module and places the module daisy chain into a Pass-Through mode where any serial communications pass through to any device connected directly to the data-out port of the module at the end of the chain.

The Repoll button 123 repolls the module daisy chain and refreshes the module list box.

The Active Module status box 124 at the bottom of the List of Active Modules window contains the currently active module. If no module is current active, this status box contains "No Modules Active-Pass-Through Mode."

The Module System Configuration menu (FIG. 27) option permits changing parameters applicable to all module processing as follows:

Require Reasons for Power OFF Actions—Checking this box causes users to provide a reason whenever they reboot or turn OFF power to any device connected to a NET-911 module. The reason entered may contain two lines of 50 characters per line. The reason entered is saved in the KEY-VIEW Event Log. If this check box is cleared, reasons for power OFF action will not be requested.

Require Reasons for Power ON Actions—Checking this box causes users to provide a reason whenever they turn ON power to any device connected to a NET-911 module. The reason entered may contain two lines of 50 characters per line. The reason entered is saved in the KEY-VIEW Event Log. If this check box is cleared, reasons for power ON action will not be requested.

Reboot Delay in Seconds—This option sets the number of seconds that power will be temporarily shut OFF to the device connected to an active module whenever the Reboot option is selected from the Module Processing Settings window. The factory default for this option is 20 seconds, which should give any disk drives on the device time to spin-down before power is automatically restored.

Module Daisy Chain COM Port—This menu option designates the COM port that NET-911 uses to access a module daisy chain. For PCs with only one module daisy chain, this setting only needs to be set once. NET-911 modules are installed on COM1 to COM 4 and should not share an IRQ with any other device.

In those rare cases where a PC has more than one module daisy chain, it will be necessary to change the COM port whenever a different daisy chain needs to be accessed. The factory default COM port is COM1. If this setting is not set to the proper COM port, the module daisy chain will not be accessible.

In an alternative embodiment, a DOS-based program is created when the DOS version of the NET-911 Control Module software is installed and may be initiated using command line parameters. This DOS based approach may be more convenient for use by third party monitoring application instead of using the NET-911 32-bit Scheduled Event approach discussed above. On this alternative DOS-based basis, NET-911 modules may be accessed by anti other third party application and power cut or restored to modules automatically when necessary. The following DOS commands can be executed:

? or HELP—Displays help.

NOLOGO—Omits the logo screen on startup.

NOMSGS—Eliminates messages from command line functions.

COUNT—Returns the number of attached modules.

LOGIN:n—Logs into module number 'n'.

LOGOUT—Logs out of all modules.

POWER:v—If 'v' is 'O'~turn off power from current module. If 'v' any other value, turn power on.

REBOOT—Reboots the active module

Most third party monitoring systems and timer based software applications permit program(s) to be executed on the occurrence of an event. When an event occurs, the DOS program can be invoked using one of more of the above parameters to automatically select a module, then cut power, restore power or reboot a device connected to the module.

When using the command line option, it is important to confirm (by logging into the desired module) that the intended module number is active before taking actions to cut or restore power or reboot the device. Otherwise, power could be inadvertently cut or restored to the wrong device. As an example, the command line format "N9MODDOS login:2 power:0 logout" will cut power to module position number 2 and restore the daisy chain to a pass-through mode.

When modules are first installed on the daisy-chain, it is important to test that the module functions properly by accessing the module, toggling power to the device connected to the module, and testing that whatever is connected to the module's SERIAL port can be successfully accessed serially.

A NET-911 module can handle any 110 volt devices with a total power consumption up to 10 amps. Some laser printers require as much as 10 amps of power periodically. Normally, most PC configuration require less than 5 amps of power. A module may be disconnected from the daisy-chain at any time without affecting the power status of other modules on the chain. If a module removed from a daisy-chain is not the last module on the chain, any re-connect any remaining modules should be reconnected to the daisy-chain. If a module is removed or added to the chain, the sequence number assignments of some or all of the modules may change and should be re-verified by the Module Management Software described later to insure that each module is correctly described in relation to its (i.e. sequence) on the daisy-chain.

In cases where (1) a large number of modules are daisy-chained together, (2) there are long RJ-45 cable runs between modules, or (3) there is excessive electronic emissions from other devices, it may be necessary to reduce the serial baud rate for a device or devices connected to the daisy-chain. Also, at high baud rates, serial transmission errors may occur unless, highly shielded serial cable is used.

Also, when pcAnywhere is running in Host mode, pcAnywhere should be assigned the necessary priority as a background task to communicate with the remote client PC.

In rare cases, any device accessed in a serial "Pass-Through" mode at the end of the daisy-chain may temporarily interfere with the Module Management Software's ability to detect the modules present on the daisy-chain. This occurs because the device at the end of the chain may also be polling while it is waiting for a connection. In this case, additional modules may appear on the chain, if this should occur, the daisy-chain can be re-polled to remedy the issue.

There are three status lights on the front of each module 80. The purpose of each of these lights is as follows:

| | |
|---|---|
| Power In | When lit indicates the NET-911 Control Module is receiving AC power through the module's power cord. |
| Power Out | When lit indicates the module is passing AC power to the POWER-OUT receptacle on the back of the module. |
| Module Active | When lit indicates the module is has been selected as the active module using the NET-911 Module Management Software. |

The NET-911 Module ACTION button is located next to the "Power Out" indicator light on the front of the unit. A pen or pencil point may be used to press this ACTION button to manually cause AC power to the device connected to the module to switch from ON to OFF or vice-versa.

If KEY-VIEW security is enabled, a user must have supervisor access rights to access the NET-911 Module Configuration settings.

Security

The "security" selection of FIG. 13 will now be described. pcAnywhere has extensive security features designed into the product, including encryption, user passwords, support for special DES security modems, event logging, blanking the screen at a Host site, call back support and an option to require someone at the Host site to specifically permit a remote access session to begin. For users demanding even higher levels of remote access security, there are numerous third party supplied hardware based user authentication and encryption devices that are compatible with both pcAnywhere and KEY-VIEW II. Most of theses devices comply with the Federal Government's Data Encryption Standard (DES) for high security situations.

In addition to these extensive remote access security available with the pcAnywhere application, additional security measures have been built into the KEY-VIEW II system. These additional KEY-VIEW security features can create a second, independent manufacturers fire wall preventing a situation where a manufacturer's employee knowledgeable about the about manufacturer's security procedures could break into a customer's system. A brief description of each of these additional security features are as follows:

Users—permits defining users, Login ID's and encrypted passwords, user supervisory authority, and access rights to KEY-VIEW PCI cards or NET-911 Control Modules.

System—permits specifying (1) the number of login attempts allowed by a remote user, (2) an optional expiration period for passwords, (3) the minimum characters required for a password, (4) how often the KEY-VIEW PC should beep when a remote user is accessing the KEY-VIEW PC, and (5) an event timer that permits either automatically logging out users or automatically switching from a Menu Mode to a Host Mode if no activity is detected for a user specified number of minutes.

Caller ID—permits requiring remote users to have a caller ID and further optionally restricting remote user access to only designated caller ID numbers. the KEY-VIEW PC's Access Control card captures each caller's ID. As a result the KEY-VIEW PC may be configured to lock out users who are not calling from designated numbers and/or who have intentionally blocked their caller ID.

Pager Alerts Permits issuing alerts to one or more pagers whenever a user fails to successfully Login to KEY-VIEW within the allowed number of password guesses.

System Backup Permits saving any KEY-VIEW configuration changes made or restoring configuration files from backup files automatically created weekly by KEY-VIEW.

Event Log—permits viewing the KEY-VIEW event log which tracks a remote users use of the KEY-VIEW system and access to KEY-VIEW cards as a supplement to the pcAnywhere event log. This date/time stamp log shows the user's login information, if applicable; caller ID information; when the KEY-VIEW application processing was initiated or terminated; any switching that occurred between PCI cards; and a log of any changes made to the User Security, System Security, or Caller ID security settings.

Change Password—permits a user who has successfully logged in to change their password.

Logout—permits a user to Logout of the KEY-VIEW application.

In addition to the above optional security features, the KEY-VIEW PC issues audible beeps or wav file sounds to notify Host site personnel when a remote user is accessing the KEY-VIEW PC. Furthermore, the turbo light on the KEY-VIEW PC starts flashing as a visual alert that the KEY-VIEW PC is being remotely accessed. The audible alert sounds can be amplified to desired volume levels by installing an optional sound card in the KEY-VIEW PC. This approach insures on-site personnel can clearly hear that someone is remotely accessing the KEY-VIEW PC.

When user security is enabled, any on-site user currently logged into the KEY-VIEW system will be automatically logged out should another user access the KEY-VIEW PC remotely. This feature prevents a situation where a on-site user forgets to logout giving a remote users the opportunity to assume the on-site user's identity. Conversely, should a remote user fail to logout of the KEY-VIEW system before terminating a remote access session, KEY-VIEW will automatically logout the remote user upon termination of any remote access session. Again, this approach precludes someone else from assuming the Login ID of a remote user who has terminated access. Finally, after a user logs out of KEY-VIEW processing always returns to the KEY-VIEW menu mode to preclude a new user from accessing or viewing a Host PC to which they may not be authorized.

The KEY-VIEW users security supports defining two classes of users namely supervisory and regular (non-supervisory users). Supervisory users have full access to all Host PCs and KEY-VIEW security and configuration settings. Regular users cannot change any KEY-VIEW security or system settings (i.e. the main menu options are grayed-out). In addition regular users may be restricted as to which KEY-VIEW PCI cards or NET-911 Control Modules that they may not access.

User Security

KEY-VIEW Security also permits defining KEY-VIEW users, passwords, supervisory authority, and access rights to KEY-VIEW PCI cards. In order to access this menu item either (1) security must be disabled or (2) the user currently logged into KEY-VIEW must have "Supervisory" rights.

The ENABLE SECURITY check box determines whether KEY-VIEW security is enabled (box checked) or disabled (box cleared).

If security is disabled, anyone may access the KEY-VIEW application without logging into die system. In this case any user lists that have been previously authorized will simply be ignored and the list box containing the list of any users who may have been previously setup will be grayed-out. If security is disabled no logging of events occurs. In addition, the Event Log, Change Password and Logout Security menu items will be grayed-out.

When security is enabled, anyone attempting to access the KEY-VIEW application either remotely or on-site must first Login using a valid user ID and password. Before KEY-VIEW will permit security to be enabled, at least one user must be defined with supervisor access rights.

The Add User button permits a new user to be defined. The Change User button is similar and permits a previously identified user profile to be edited. When selected, a dialog box appears requesting the following information for the new or changed user:

User Name—defines a user name up to 25 characters long.

Password—A password may be up to 15 characters long. All passwords are internally encrypted by KEY-VIEW.

Confirm Password—All passwords entered must be reentered to confirm the desired password.

Supervisor Rights—When this box is checked, the user has "supervisor rights" meaning the user has full access to all KEY-VIEW systems settings including the ability to enable/disable security, add or delete other users, or change user's passwords. If this box is not checked, the user's will be classified as a "Normal" user. A Normal user's access rights may be restricted to only designated KEY-VIEW PCI cards and NET-911 control modules. Normal users cannot change systems setting, add users, disable security, etc.

Force Password Change—When this options is checked it forces the user to change their password the next time they login.

User Locked Out—If this box is checked, the user will be prevented from logging into the KEY-VIEW system. This box is checked automatically by the KEY-VIEW system whenever the user exceeds a user specified number of Login attempts without entering a valid password.

Non-Supervisor KEY-VIEW PCI Card Access Rights— Designates up to 8 PCI cards may be installed in a KEY-VIEW PC that normal (i.e. Non-Supervisor) users may have access. Users who have their Supervisor Rights box checked automatically have rights to all PCI cards.

Non-Supervisor NET-911 Module Access Rights—Up to 250 NET-911 Control Modules may be connected to the serial port of a KEY-VIEW PC to control AC power and serial access to devices connected to the modules. Normal (i.e. Non-Supervisor) users, may be prevented from accessing designated module numbers (i.e. positions on the module daisy chain). Users who have their Supervisor Rights box checked automatically have rights to all NET-911 Control modules connected to the PC.

Before restricting user access to designated modules, the daisy chain must have been previously accessed so that KEY-VIEW can identify the COM port to which the module daisy chain is connected. This is necessary because, in rare cases, it is possible that a customer may have more than 1 NET-911 module daisy chain connected to different serial ports of the KEY-VIEW PC. If user access will be restricted in such cases, it will be necessary to access the daisy chain (i.e COM port) where module access is to be restricted immediately prior to entering any user module access restrictions for that daisy chain. In other words, KEY-VIEW automatically associates any newly specified user module access restrictions with the last COM port where modules were successfully accessed.

The User Delete button causes the highlighted user to be deleted. An "Are You Sure?" message will pop up to confirm that the user should be deleted.

A System Security Settings dialog box permits specifying the number of unsuccessful log in attempts allowed by a remote user, criteria for the expiration of passwords, criteria for automatically logging out users, the minimum size for passwords and caller ID requirements. These features are defined and may be configured as follows:

Enable Limit on LOGIN Attempts—This feature limits the number of successive attempts a given user has to enter a valid password.

Enable Password Expiration—This feature forces users to periodically change their passwords.

Remote Session Beep Interval—This feature alerts users at a Host site whenever someone is remotely accessing the KEY-VIEW PC by causing the KEY-VIEW PC to beep at periodic intervals.

Enable Minimum Password Length—This feature sets the minimum number of characters required for a user password.

Enable Inactivity Timer This setting is used to initiate one of two possible actions in the event "user activity" is not detected for a user specified number of seconds. User activity occurs whenever (1) a menu option is selected or an OK/CANCEL button is clicked while in a Menu Mode, or (2) any keyboard input occurs while in a Host Mode When this check box is checked, the specified action will be taken after no activity for the period specified in NUMBER OF MINUTES entry. The NUMBER OF MINUTES setting may be any value between 1 and 99 minutes. The possible actions that may occur in the event no activity is detected for the specified number of minutes depends on which Timer Option button is marked as follows:

Automatic Logout—This option handles cases where users forget to log out when they are done, leaving the system open for possible security breaches by unauthorized persons. When this button option is enabled, KEY-VIEW automatically logs out any user after the NUMBER OF MINUTES specified, whenever there is no activity for this period of time. Immediately prior to logging out a user in this manner, a message box will be displayed giving 20 seconds to abort the log out process. If this automatic logout feature is enabled, but User Security has not been activated, the setting will be ignored, since users are not required to LOGIN.

Automatic Switch to Host Mode—This option only applies when the KEY-VIEW PC is in a Menu mode. It is designed for customers who want the KEY-VIEW PC to automatically default to a Host Mode so that users do not have to bother switching from a Menu Mode to the Host Mode whenever they initially access the KEY-VIEW PC (because a previous user left the KEY-VIEW PC in a Menu Mode). When this radio button option is selected, KEY-VIEW will automatically switch to a Host Mode, whenever there is no activity for the NUMBER OF MINUTES specified. If no Host PC is active at the time this automatic switch occurs, an appropriate error message is displayed and no switch to a Host Mode occurs.

Immediately prior to switching to a Host Mode in this manner, a message box will be displayed giving 20 seconds to abort the switching process.

If the Enable Inactivity Timer box is not checked, the timer will be disabled and no automatic logout or switching to a Host Mode processing will occur.

Site ID

The Site ID menu option permits assigning the KEY-VIEW PC an up to 8 character Site name.

The purpose of the site ID is to permit each of the event logs stored within each remote KEY-VIEW PC to be consolidated into a central company wide event log file.

Each time a KEY-VIEW PC (site) is accessed remotely, the Event Log stored in the PC can be automatically transferred to the remote site by setting the "Auto File Transfer" file option of pcAnywhere to transfer the file immediately after logging into the site. When this transfer is initiated. pcAnywhere automatically transfers (using it's file synchronization feature) only the records that have been added to the KEY-VIEW PC since the last file transfer to the remote site.

Caller ID

Most telephone companies now offer an optional "Caller ID" feature permitting capturing a caller's phone number whenever a call is received.

The KEY-VIEW PC's Access Control card can capture each caller's ID. As a result the KEY-VIEW PC may be configured to lock out remote users attempting to connect to the KEY-VIEW PC (via modem) who are not calling from a pre-authorized phone number or who have intentionally blocked their phone number (i.e. their caller ID). If this caller ID service is installed, KEY-VIEW automatically captures the caller ID received from any incoming call and logs the caller ID information in the KEY-VIEW Event Log, even if none of the additional security features discussed in this topic are activated.

New caller ID phone locations can be added by specifying the phone number for the location to be authorized. The following fields are required:

Location of Phone Number—Describe the location where the phone number specified is physically located. This description must be 40 character or less.

Phone Number—Enter the phone number that is authorized to remotely access this KEY-VIEW PC via modem. This phone number must include an area code and be formatted exactly as reported in the KEY-VIEW log.

Pager Alerts

When KEY-VIEW User Security is enabled and a user fails to successfully Login to KEY-VIEW within the allowed number of password guesses, KEY-VIEW may be configured to issue pager alerts to one or more pagers announcing that a potential intruder has been detected.

Prior to implementing this feature, a modem must be connected through a NET-911 Module to the KEY-VIEW Access Control Card as more fully discussed with respect to the Access Control Card 90 of FIG. 12. The modem connected 81 may be used to dial the pager alert phone calls and to enter a password to remotely reboot the KEY-VIEW PC.

The Pager Alert Settings include:

a. When enabled, the Pager Alert issues a page in the event (1) a caller ID violation occurs (see Caller ID topic) or (2) KEY-VIEW security is enabled and a user fails to login to KEY-VIEW within the allowed number of attempts and is put in a Lock-Out status (see System Security Settings topic). In the later case, pager alerts are not re-issued in the event a user who is "locked-out" of KEY-VIEW attempts to login again after being locked out.

b. All persons or locations to be paged in the event an authorized user is detected are included in a list. When an unauthorized intruder is detected, all persons on this list will be paged.

c. New persons to be paged can be added by entering a description of the person or location where the pager number specified is physically located and the Pager Phone Number and Alert Code. The pager alert code specified should first clearly identify to the NET-911 administrator receiving the page that it is a KEY-VIEW alert. A code prefix of 911 can be used for this purpose. This code can be followed by a Site ID number to uniquely identify the KEY-VIEW PC that is issuing the alert. In cases where a KEY-VIEW PC has an internal modem, the code can end with the phone number used to access this modem.

d. Changes can be made to the page alert list by editing the information described above in section c.

When a KEY-VIEW administrator receives a pager alert, he or she should access the KEY-VIEW PC that issued the page (either remotely or on site) and reviews the end of that site's event log to determine why the page was issued.

Each pager alert takes about 70 seconds to complete. No activity occurs on the KEY-VIEW PC until all specified pager alerts are delivered. So, the number of pager alerts should be kept to a minimum, to prevent the possibility that an administrator can access the log while pages are being issued. A pager alert will not be delivered if the number being called is busy.

System Backup

This menu option permits (1) encrypting and saving the current status of any KEY-VIEW configuration changes made or (2) restoring the KEY-VIEW configuration from backup in the event KEY-VIEW files become corrupted.

KEY-VIEW configuration changes can be optionally stored to permanent disk storage.

The system backup routine maintains a list of configuration backup files saved by KEY-VIEW. Each time a KEY-VIEW menu option is selected, KEY-VIEW checks the current date against the date that the system configuration was last backed up and automatically backs up the configuration if more than 7 days have elapsed. Up to one year of configuration files are maintained by KEY-VIEW in this manner.

Upon user initiation, the current status of the KEY-VIEW configuration is encrypted and saved to disk. Thereafter, a selected backup file can be restored as the current KEY-VIEW configuration.

Event Log

The Event Log option on the KEY-VIEW Security menu is a unique feature that keeps a record of all Keyview II activity and permits viewing the KEY-VIEW activity at a later date. This log contains date/time stamped entries tracking all aspects of user access to KEY-VIEW Host PC's as well as changes made by users to the KEY-VIEW system configuration.

More specifically, the KEY-VIEW Event Log shows the user's login activity, if applicable; caller ID information; when the KEY-VIEW application processing was initiated or terminated; any switching that occurred between PCI cards; and a log of any changes made to the User Security, System Security, or Caller ID security settings or other system configuration settings.

The Event column contains a brief 1 line description of each event that occurred. Some of these lines may be indented. Indented lines mean the event relates to a preceding event line. For example if a user connected a switch box to a KEY-VIEW PCI card that was previously connected to a PC, the user would change the PCI card's setting from "Switch Box" to "PC". This event would then cause other events to occur namely the deletion of any video drivers and mouse drivers associated with the PC that was formally directly connected to the PCI card. These resulting events would then appear on the log indented and immediately following the event that noted the setting change from "Switch Box" to "PC".

Mouse

The Mouse menu bar option of FIG. 13 permits creating and listing mouse drivers, that are used to control Host PC mouse movements and synchronize the Host PC's mouse position with the KEY-VIEW PC's mouse position. In cases where Host PCs does not need mouse support or the special KEY-VIEW mouse driver has been installed on the Host PC, this menu option will not apply.

Before discussing the process for creation of a mouse driver, it is important to understand why a mouse driver needs to be created.

During a KEY-VIEW session, the KEY-VIEW PC's PCI card must process video output data from the active Host PC before displaying the video screen on the KEY-VIEW PC. The slight delay resulting from this processing causes the Host PC's mouse pointer to appear to trail behind the KEY-VIEW PC's mouse pointer as a shadow. This delay is even longer for a remote user, because the Host screen data must be processed a second time by the pcAnywhere application to transmit the screen data to a remote user.

When the KEY-VIEW PC's mouse pointer is properly synchronized with the Host PC's mouse pointer (i.e both pointers converge whenever mouse movement stops), the KEY-VIEW PC's pointer represents the true position of the mouse on the Host PCs screen and the shadow can be ignored. Because two pointers appear on the screen during mouse movements, it can become confusing. This problem can be avoided by either using the mouse configuration setting on the Host PC to blank out the Host PCs or use the Windows 95 mouse pointer control panel option to change appearance of the KEY-VIEW PC's mouse pointer to be different from the Host PC's mouse pointer, so users are able to tell which mouse on the screen is the KEY-VIEW PC's pointer vs. the Host PC's pointer. A mouse pointer in the shape of a FOX is provided with KEY-VIEW II.

The main problem in this synchronization process is that an application running on the Host PC could cause the mouse position to jump to a new location causing the KEY-VIEW PC's mouse to be out of sync with this new location. Other synchronization problems would result if someone changed the mouse acceleration factors on the Host PC.

The main problem when the mouse positions become unsynchronized is that it is impossible to move the Host PC's mouse to all positions on the screen using the KEY-VIEW PC's mouse. For example, if the KEY-VIEW PC's mouse pointer becomes unsynchronized to the left of the Host PC's mouse pointer it would be impossible to move the Host PC's mouse to the left edge of the screen because mouse movement data on the KEY-VIEW PC would no longer occur (i.e., detected by the application running on the Host PC) when the KEY-VIEW PC's mouse reached the left edge of the screen.

In order to keep the KEY-VIEW PCs mouse pointer synchronized with the Host PCs mouse pointer several approaches are possible.

Under a first approach, a special mouse driver provided with KEY-VIEW II would be installed on the Host PC in place of the Host PCs mouse driver. This approach allows this mouse driver to communicate with the KEY-VIEW PC application to insure all mouse movements are always synchronized.

Under a second mouse synchronization approach, a special KEY-VIEW mouse driver must be created on the KEY-VIEW PC when the Host PC is defined for access by the KEY-VIEW. The creation of this mouse driver is a'simple task. When this approach is used, any special mouse options set on the Host PC to (1) change the mouse sensitivity or acceleration factors, (2) change the click speed or (3) permit automatic jumping to a specific location (e.g. a highlighted button of a new dialog box) must be disabled. Any such feature that are active on the Host PC will cause the Host PC's mouse to become out of sync with the KEY-VIEW PC's mouse, making mouse control of the Host PC difficult or impossible.

Another approach uses a specially colored and/or drawn mouse pointer, that could be trapped by looking for the pointer on the video screen data captured from the Host PC.

Under still another approach, a special software in the KEY-VIEW PC, specifically looks for a situation where the mouse reaches any edge of the screen. When this occurs, the software continues to transmit mouse movements (mickeys) in that direction to the Host PC until the mouse on the KEY-VIEW PC was moved off of the edge of the screen. This embodiment solves the problem where the mouse position on the KEY-VIEW PC becomes unsynchronized with the mouse position on the Host PC so that the mouse cannot be moved to the end of the screen as previously discussed in an example above. A variation of this embodiment captures raw mouse movement data directly from the mouse itself.

Synchronizing the KEY-VIEW PC's mouse with the Host PC's mouse thus presents numerous technical obstacles. Several synchronization designs were evaluated and determined to be less preferable, though not necessarily excluded from the present invention. For the sake of completeness, these alternatives are also discussed below.

The preferred approach identified for mouse synchronization appears to be writing a mouse driver to be installed on the Host PC that captures the mouse's current position on the Host PC screen and feeds this position back to the KEY-VIEW PC through either a serial or PS-2 mouse interface cable, depending on what type of mouse interface had been used for the Host PC. The mouse driver written is designed to replace any mouse driver currently installed on the Host PC.

Unlike existing mouse drivers, the KEY-VIEW mouse driver is designed for two way communications between the Host and KEY-VIEW PCs. Instead of sending mickeys through the mouse interface cable to the Host PC, exact X/Y co-ordinates are sent to the Host PC from the KEY-VIEW PC that cause the Host PC's mouse to jump the specified coordinate, as if the mouse had been told to jump to that co-ordinate by an application on the Host PC. When a Host or Remote site user clicks their mouse button, the exact X/Y co-ordinate and button that was clicked is transmitted to the Host PC in a single data packet. In a case were no click occurred when an X/Y co-ordinate was transmitted, the button clicked segment of the packet is set as a null value, so that all packet formats sent are consistent. Any packet sent to the Host PC by the KEY-VIEW PC must be acknowledged via a typical serial ACKINAK protocol. Packets not acknowledged by the Host PC that do not include mouse click information may be dropped by the KEY-VIEW PC in favor transmitting any more recent X/Y co-ordinates packets in the KEY-VIEW PC's buffer.

Having a means to permit the KEY-VIEW PC to cause a Host PC's mouse to jump has one major side benefit. Each time a mouse pointer is moved across a Host PC's screen, it causes more screen differences to occur, which means more 32 k screens are sent to the KEY-VIEW APP merely to track the mouse. By having the KEY-VIEW PC intentionally ignore a selected number of mouse co-ordinate changes that do not involve mouse clicks, the Host PC mouse is moved less frequently and in greater jumps. As a result, the number of screen differences that will occur is reduced. This significantly increases the speed at which a remote user sees the Host PC's mouse synced with the KEY-VIEW PC's mouse.

The KEY-VIEW mouse driver is designed to service all required functions of a typical mouse, but ignores most typical requests by Host PC applications to change mouse functionality. For example, requests to (1) change the mouse sensitivity or acceleration factors, (2) change the click speed or (3) implement a feature to permit automatic jumping to a specific location (e.g. a highlighted button of a new dialogue box) are acknowledged like a normal mouse driver, but ignored and hence have no impact on mouse movements. In any case where one of these mouse features is ignored by KEY-VIEW, if possible, the application (e.g. Windows) that requested the change is notified that the option is not supported by the KEY-VIEW driver. This permits the application to notify the user that the feature is not supported.

In the design of the KEY-VIEW mouse driver, special routines support the essential functional requirements of a mouse in cases where a Host application cannot be told the function is not available. For example, as a result of a KEY-VIEW PC's mouse movement/click packet, the application on the Host PC may have the right to call the mouse driver and cause the mouse to jump to another location on the screen. If the application cannot be told at the time of the request that the jump function is not supported, the mouse driver must accept the jump. In this case, the jump movement is ignored and discarded by the mouse driver and the pointer left at it's current location. Ignoring this application generated jump should have no impact on the application code because the application thinks the user moved the pointer back to it's original location when it next queried the current position of the pointer. Permitting the jump to occur will have a major impact on the KEY-VIEW design, because provision must be then be made to transmit a X/Y packet back to the KEY-VIEW PC and then the KEY-VIEW PC must have a means to force its mouse pointer to the jump location. Adding this level of complexity to the design is not warranted.

It is believed that one of the older required support functions of a mouse driver is to pass raw mickeys, if requested, directly to a Host PC application, so that the application can present and control it's own mouse movements. Applications that control their own mouse are rare and most modem applications rely on the mouse driver to move the mouse, keep track of it's position and report the position back to the application. The preferred embodiment does not tap into applications requesting mickeys to determine how many mickeys per pixel are being used to move the mouse, when the application has caused the mouse to jump to a different location, etc., but instead presumes that all modern applications rely on the mouse drivers. As mentioned, it is believed that only older applications rely on mickey input for mouse control. Accordingly, the preferred embodiment does not provide mouse support for such applications.

To stop mouse support in such cases and avoid unpredictable mouse movements, the KEY-VIEW Host PC mouse driver simply does not update mickey movements whenever X/Y co-ordinate changes are received from the KEY-VIEW PC. This approach could create a problem where a Host PC application starts with a mouse pointer in the middle of a screen and the user has no way to move the mouse pointer out of the way. To resolve this problem, a special packet could be sent to the KEY-VIEW mouse driver with a x/y co-ordinate of 9999/9999, that would tell the driver that the Host PC has just been accessed by KEY-VIEW and to send an excessive number of mickeys to the current application to force any mouse pointer relying on mickeys to move to the bottom, right corner of the screen, which is the normal place most typical slanted mouse arrow pointer would disappear from the screen. This packet would also cause the mouse pointer to be positioned in a consistent place in the middle of the screen for those normal applications that rely on X/Y co-ordinates.

If the Host PC's KEY-VIEW mouse driver is capable of detecting applications that rely on mickey input for movement, which is probably unlikely, then the driver returns a special packet back to the KEY-VIEW PC that alerts the user that mouse movements are not supported for the current application.

Developing special KEY-VIEW mouse drivers for installation on Host PCs is the recommended approach. This assures that the Host PC's mouse movements will occur on a real time basis and the KEY-VIEW PC's mouse pointer will reflect actual position of the mouse on the Host PC's screen. A minor problem will occur when a Host PC is accessed by a Remote PC because, due to screen refresh delays, the Host PC's mouse's image will lag behind the KEY-VIEW PC's mouse's current position. In such cases the user will be instructed to simply ignore the Host PC's mouse image, which will have a different pointer appearance, because the unique KEYVIEW mouse pointer will be installed on the KEY-VIEW PC. In any event, dual mouse pointers cannot be simply solved by blanking out the Host PC's mouse pointer because the Host PC's mouse pointer will need to be visible to a user at the Host site viewing the Host PC's screen from the video output port of the KEY-VIEW PCI card. Alternatively, the Host PC mouse can be cloaked and then restored as necessary under program control.

a. Less Preferred Mouse Synchronization Options

Under the new KEY-VIEW system all mouse input to Host PC's connected to the KEY-VIEW PC will be controlled by the KEY-VIEW PC's mouse interface. Four major design approaches that could be taken to control the Host PC's mouse are discussed next and are not preferred for various reasons. The recommended approach, which involves the creation of a custom KEY-VIEW mouse driver for installation on each Host PC in place of any existing mouse driver, is described above.

Approach #1:

Under the first design approach, the KEY-VIEW PC's mouse pointer could be setup to use a blank (null) pointer which would cloak the pointer whenever the KEY-VIEW PC was in a Host mode. The KEY-VIEW PC's pointer would be restored when switching back to a Menu mode. In order for this approach to work, any mouse movements from either the KEY-VIEW or remote PC's mouse would have to be transmitted to the Host PC even when the true pointer's position was at the corner of the host or remote PC's screen. This is a good approach, but is not presently feasible.

pcAnywhere stops transmitting mouse movement data to the Host site whenever the mouse reaches or passes the boundary of the KEY-VIEW PC's window on the remote PC. On this basis, if the Host PC's mouse is at the bottom of the screen and the KEY-VIEW PC's mouse is at the top of the screen boundary when the KEY-VIEW PC is first accessed; there will be no way to move the Host PC's mouse pointer up from a remote PC. In this case, a trick to grab the Host PC's pointer by using a "hot key" to temporarily suspend the transmission of mouse movement data would require a visible pointer on the Host PC and would only work temporarily due to differences in mouse sensitivity and acceleration as discussed below. These problems would force the need for a driver file and eliminate the simplicity of this design approach. Also, there is a secondary technical issue of being able to change the mouse pointer on the fly from within the KEY-VIEW APP to a new mouse pointer when switching between host and Menu modes.

Approach #2:

One reliable way to insure that the KEY-VIEW and Host PC's pointers will eventually synchronize is to install a unique mouse pointer on a Host PC. This technique is herein referred to as the "unique pointer" approach. Using a unique pointer, the KEY-VIEW or PCI APP could always detect the exact current location of this unique pointer on the Host PC via scanning the Host screen differencing file.

Under the unique pointer approach, the KEY-VIEW APP must be able to determine the exact position of the mouse pointer's hot spot by analyzing the Host PC's screen display data. To avoid a potential processing burden on the KEY-VIEW PC's CPU, it may be necessary to initially incorporate pointer detection in the PCI card's analog to digital video hardware requirements. Ultimately, this process would likely be removed from the PCI card and included in the KEY-VIEW APP if it does not adversely affect throughput.

The unique pointer concept requires that the Host PC's mouse pointer's shape, color(s) and location of the hot spot (which is a single pixel) be pre-defined.

When a mouse pointer moves, the PC's mouse driver insures the hot-spot remains within the screen area. Under Windows, the hot spot is at the tip of the standard arrow pointer, so when the arrow is positioned at the lowest, right most section of the screen, the pointer appears to disappear. But, in fact the hot spot's pixel is positioned at the very edge of the screen.

To permit the PCI card to detect the location of the pointer, we will need to design a pointer with a unique set of color combinations that will be unlikely to occur on any Host PC's screen. Because the KEY-VIEW PC can only capture a portion of a Host PC's screen as it is being displayed, a problem occurs when attempting to detect the location of a pointer that is "sitting" (i.e. stopped) over the edges of one or more blocks. Because these blocks will likely be built from left to right and from top to bottom, the most straight-forward way to detect the location of the cursor would be based on a unique horizontal pattern of color pixels, so that the video capture engine does not have to look up and down (just left to right). Using only horizontal pattern identification means that the cursor could never be fragmented into more than two blocks. Furthermore, if the horizontal line was composed of an even number of pixels on both sides of the hot spot, the majority of the pointer's x-axis would always be in only one block, so the pointer could never be in stopped in an undetectable position.

The color pattern selected should include only the least distortable primary colors of red, green and blue with a white pixel hot spot. The following pattern is suggested—B R C B R G W C R B G R B. On this basis if either the horizontal pixel pattern B R C B R C W or W G R B G R B was detected while building a block the Hot spot would be the location of the W pixel. Thus, with two simple pattern "mask" tests, it will be possible to find the pointer's hot spot in all cases, even if the pointer is stopped between adjoining blocks. If the pattern test is too long to be captured efficiently, it could be reduced to just B R G W or W G R B.

As mentioned, one problem with the unique pointer approach is that any application running on the Host PC must be able to support this custom mouse pointer. This is no problem for Windows NT or 95 based Host PCs, but is not a universal solution for other Host PC's. In addition, totally relying on a custom pointer feedback from the Host PC could slow down mouse movements waiting on video data to be decoded and scanned before the mouse position could be determined. This delay in the mouse's responsiveness would be frustrating for a remote user. Finally, the process of detecting where the mouse was positioned may be processing intensive which may either significantly increase the cost the PCI card's hardware or slow down KEY-VIEW APP processing on the KEY-VIEW PC depending on where the pointer detection function was performed.

Approach #3:

Under the third design approach, the Host PC's mouse would be kept synchronized with the KEY-VIEW PC's mouse position by properly controlling mouse data input to the Host PC via the KEY-VIEW PC's PCI card. Synchronization would be accomplished by training the KEY-VIEW PC to understand the exact effect that mouse movements would have on the Host PC.

Mouse driver software supplied with the mouse can be used to change the sensitivity of the mouse connected to the PC. When the mouse sensitivity is low, it will take greater physical movement by the mouse to move the pointer on the screen. A mouse's movement causes a fix number of "clicks" to occur for a given distance. When the sensitivity is lowered, the mouse driver reading the mouse clicks requires more clicks to move the mouse on the screen a given distance. Data to move a mouse on a screen is often referred to as "mickeys"

As merely a point of information, the mouse's pointer position of the Host PC could be automatically synced to the mouse's pointer position of KEY-VIEW PC simply by sending excessive mouse movement commands to the Host screen to force the mouse to move to position 0,0 regardless of where it is currently positioned (e.g. stuff 1024 movements up by 768 movements left into the Host PC's mouse interface cable). Then, mouse movements could be transmitted and tracked to move the mouse from it's known position 0,0 to it's current location on the KEY-VIEW PC.

If the mouse sensitivity of a Host PC is set differently than the mouse sensitivity of the KEY-VIEW PC, as controlled by pcAnywhere, when a remote user moves their real-time (remote) mouse, the Host PC's mouse (as shown on the captured Host screen) will not stay in sync. Because it is highly unlikely that the sensitivity of a remote PC's mouse will be set the same as a Host PC's mouse, it will not be possible to have real-time synchronization between the Host and KEY-VIEW PC's because the difference must be calculated and tracked.

In addition to mouse sensitivity, many mouse drivers also support an acceleration factor, whereby the longer a mouse is moved without stopping the faster the mouse accelerates. In other words, when a mouse is constantly being moved, the first mouse movements will be at less mickey's per click that the last mouse movements. Mouse acceleration settings are not of concern on either the remote or KEY-VIEW PCs because the KV-APP only needs to know where the mouse is positioned (i.e. x/y coordinates) at any point in time on the KEY-VIEW PC. The KV-APP is not concerned how fast the KEY-VIEW PC's mouse got to it's current position. But, when the Host PC is set to use an acceleration factor, a problem is created. In this event the number of mickeys needed to move the Host PC across a vector could vary depending on the length of the vector. So, the Host PC's mouse could become constantly out of sync with the KEY-VIEW PC's mouse. Moreover, creating a mouse driver with a synchronization factor based on different acceleration equations used by mouse driver authors could be a difficult task.

To resolve the mouse acceleration problem, one could (1) require all users to disable any mouse acceleration feature on Host PC's or (2) add a mouse speed factor to the Menu mode that permits the user to slow down mouse movement data transmitted to a Host PC below the minimum level for acceleration. Option 1 is preferable because it assures the Host and KEY-VIEW PC's mice will always be accurately synced in the shortest period of time using the minimum amount of processing. Option 2, may cause major delays in moving the Host PC's mouse to align with the KEY-VIEW PC's mouse and could involve tedious user controlled trial-and-error mouse speed adjustment settings.

To predict the effect of mouse movements on the Host PC without alerting the Host PC's mouse settings would involve training the KEY-VIEW PC to know the precise number of mickeys needed to move a Host PC's mouse pointer one pixel along either the x or y axis. The number of mickeys required to move the mouse pointer for a given Host PC would be stored as that Host PC's mouse driver file in the KEY-VIEW PC. Because the effect of any Host PC mouse acceleration routine may be difficult to capture, this approach would likely require disabling any mouse acceleration on Host PC. This approach has the major benefit of avoiding any delays on waiting for the video feedback required in the unique pointer approach, because the driver has the necessary information to predict where the Host PC mouse is positioned. However, if mouse clicks are dropped in transmission to the Host PC, the user forgets to disable the acceleration feature, or a custom Host PC application includes an acceleration feature that cannot be disabled, the Host and KEY-VIEW PC mouse pointer may become permanently out of sync. Moreover, some applications running on the Host PC may issue a command to the Host PC's mouse driver to tell it to jump to a given co-ordinate. If this were to occur, the KEY-VIEW PC's would become totally out of sync with the Host PC.

Approach #4:

In order to overcome many of the shortcoming of Approaches 2 and 3, both of these approaches could be combined and improved. However, using both the mouse driver and a unique pointer approaches further complicates mouse synchronization. By the time video feedback positioning occurs, the mouse driver MAY have been synced beyond that point with the KEY-VIEW PC's mouse. To resolve this problem, video mouse synchronization should occur only when the KEY-VIEW PC's mouse position has not changed (i.e. it has stopped moving) as determined by the unique pointer approach. Waiting for the mouse to stop moving insures the captured Host PC's video screen will accurately reflect the current position of the mouse.

KEY-VIEW could also support cases where a user (using the unique pointer approach) elects not to create a mouse driver. However, as mentioned host PC's pointer movements will likely be far more jumpy that using both the unique pointer and mouse driver approaches. In cases where a unique pointer is not installed, the Host user would be required to create a mouse driver for the Host PC as described below and insure acceleration is disabled. Otherwise, the Host PC's mouse will not stay in sync with the KEY-VIEW PC's mouse.

Using the mouse driver approach, the KEY-VIEW APP will always know the current, exact, X/Y co-ordinate position of the KEY-VIEW PC's mouse pointer regardless of mouse sensitivity differences between the remote and KEY-VIEW PC's mouse settings. When creating a mouse driver, the trick is to sync this known position precisely with the Host PC's mouse position. As mentioned, this becomes complicated because the Host PC could be set to any one of a numerous different sensitivity settings and the pointer could be anywhere on the screen when the Host PC is initially accessed. The objectives would then be to (1) determine the Host PC's sensitivity setting and store this setting as a driver file for that Host PC and (2) force the Host PC's mouse to a known position (e.g. position 0,0) after a Host PC is initially accessed. In rare cases a user may have different applications ruining on the Host PC with different sensitivity settings. In these cases KEY-VIEW will need to save multiple mouse drivers for a Host PC similar to how the KEY-VIEW design now provides for saving multiple video drivers for a Host PC.

Unlike video training which requires a special screen to be displayed on a Host PC, creating a mouse driver must be done so as not to require software resident on a Host PC. This is a requirement because a Host application that could set sensitivity will not likely support running a mouse training program while the application is running.

To create a KEY-VIEW mouse driver the user will need to select one of the four corners of the screen where there is no video movement (e.g. blinking cursor) within the corner selected. After a Host PC was properly setup in this manner, the Host PC would be selected as the active PC on the KEY-VIEW PC via the KEY-VIEW APP. Then, a new menu option would be selected that would prompt the user to select in which of the four corners of the screen the Host PC mouse pointer was currently located. The KEY-VIEW APP would then cause excessive mickeys to be sent to the Host PC to force the mouse pointer's hot spot to the corner's edges of the-screen. Next, the KEY-VIEW APP/PCI APP would test for several seconds that no video differences were reported in that corner (from the PCI video capture circuitry) within that 1"×1" area. If differences were reported, an applicable error message would be displayed for the user and the mouse driver generation process terminated. Otherwise, mickeys would be counted and transmitted to the Host PC until the pointer moved 10 pixels (right) horizontally from its currently location and then counted again to the left until the pointer returns to it's original position. The same process would then be repeated vertically up, then down. At the end of this testing, a driver file would be created containing the exact number of mickeys per pixel required to move the Host PC's mouse right or left vs. up or down.

To verify that mouse acceleration had been disabled on the Host PC after the driver information had been gathered, the exact shape of the pointer could be determined by moving the pointer at least 20 pixels diagonally from the corner edges of the screen using the new mouse driver information. Since a cursor can be no more than 16 pixels, this approach assures the entire cursor is visible. Next, a check sum would be computer for a 50×50 pixel area cover the entire area of the screen where the pointer is now located. Then, mickeys would be sent by the KEY-VIEW PC using the new mouse driver data to move the cursor around the entire screen at a rapid rate for several seconds at the end of which the pointer would be returned to it's exact starting location. At this point a second check sum would be calculated on the same 50×50 area. If the two check sums did not agree, it would mean that training failed because either mickeys were lost in transmission or the mouse on the Host PC had an acceleration factor. In this event, the test could be automatically repeated using a slower rate of transmission of mickeys to the Host PC to determine that point at which a driver could be reliably be generated. Then, the user would be advised of need for a speed reduction as well as the reduction factor required. This mouse speed factor would need to be included in the mouse driver file. The presence of a mouse acceleration factor on the Host PC or mickeys dropped in transmission could make it impossible to create a mouse driver for the Host PC. In this case an error message would be displayed requested the user to check if acceleration has been disabled and suggesting the use of the unique-mouse approach.

Once the mouse driver was successfully created in this manner, a warning message would be displayed advising the user that the driver had been successfully created, but that any changes made to the mouse sensitivity or acceleration settings after the driver was created would cause the Host PC's mouse to become out of Sync with KEY-VIEW PC's mouse and preclude proper remote mouse control. The message would also advise the user to re-run training for any other applications on the Host PC that may change the mouse sensitivity setting, which should be a rare occurrence.

Regardless of the mouse synchronization approach used, the current location of Host PC's mouse pointer image will always lag behind the mouse pointer current position on the KEY-VIEW PC or remote PC. This occurs because of the delay required to display a Host PC's screen on the -KEY-VIEW PC. As a result of this lag, a KEY-VIEW user will see two mouse pointers on the screen when the mouse is being moved. To eliminate this problem, it would not be feasible to blank out the Host PC's mouse pointer using a null mouse pointer, because a user at the Host site using a monitor plugged directly into the Host PC's video output port on the KEY-VIEW PC's PCI card will need to see where the mouse is positioned. Similarly, the mouse pointer on the KEY-VIEW PC could not be blanked out unless a normal pointer could be automatically restored via software whenever the KEY-VIEW PC was not in a Host mode, which may be possible and solve the problem. However, in this case a user would have no visible means of knowing if the host and KEY-VIEW PC pointers are out of sync.

When the unique KEY-VIEW pointer is installed on the Host PC, it will be much easier for a user to tell the differences between the two pointers on the screen because they will be different. However, they will not be different if only the mouse driver approach is used, since the special pointer ("KVHOST.ANI") will not be installed on the Host PC. To help a remote user distinguish between the two pointers, another optional, custom, "bulls-eye" mouse pointer called "K.ANI" will be available on the KEY-VIEW PC. This pointer is entirely red. However, when the pointer is viewed from a remote PC it appears as a black pointer because pcAnywhere apparently does not support color pointers. It was further noted that having a different pointer design on the KEY-VIEW PC had another desirable effect for the remote user. Presently, when the KEY-VIEW PC's screen appears as a downsized window on the remote PC and other windows also appear on the KEY-VIEW PC, it becomes very confusing as to whether the pointer is—pointing at the remote PC or KEY-VIEW PC. However when the pointers are different, pcAnywhere changes the pointer to the remote PC's format, when the pointer moves out of the KEY-VIEW PC's window making it clear where the KEY-VIEW PC's screen ends and the remote PC's screen begins.

Finally, under the mouse driver approach, whenever a Host PC is first accessed, the KEY-VIEW APP must automatically sync the KEY-VIEW mouse with the Host mouse by sending excessive mickeys to the Host mouse to insure the Host mouse is moved to position 0,0. Then, a vector would be computed to the current mouse position of the KEY-VIEW PC's mouse and the mickeys sent to move the Host mouse to that position thereby causing both mice to be synced, so that normal mouse processing could begin.

Under the mouse driver approach, the KEY-VIEW Menu mode will provide an option to create a mouse driver. Also, a mouse driver list menu option will need to be added similar to the video driver list option to permit a user to list and delete mouse drivers. Finally, each KEY-VIEW PCI card and Switch Box PC list will need to contain a field for updating the mouse driver file name associated with each PC connected to KEY-VIEW.

When a Host PC is accessed, if the mouse driver name is blank (for the PCI card and switch box PC, if applicable), it should be assumed that the unique cursor is being used. If the unique mouse footprint is not detected (and the "Skip Message" option has not been set,—as discussed below) by the PCI APP on the selected Host PC's screen, then a message should be displayed by the KEY-VIEW APP indicating:

Warning: a mouse driver or KEY-VIEW pointer was not detected for the active Host PC. Click on the "Training" button to create a mouse driver. Click on "Skip Message" button to stop displaying this message for this PC in the future. Click on the "Ignore" button to continue accessing the Host PC without a mouse driver, or select the "Cancel" button to return to the KEY-VIEW main menu.

The "skip message" button is necessary for Host PCs, such as Novell servers that don't use a mouse. In this case, a user will not want to see an unnecessary message each time they access the PC. When the training button is selected, it will be important to have a "HELP" button that will use the text in this section to explain the mouse driver and pointer options that are available and permit the user to cancel training if they want to use the KEY-VIEW pointer option.

b. When a mouse driver is necessary to control and synchronize the Host PC's mouse, the KEY-VIEW Mouse bar option must be selected to create the necessary mouse driver. When selected two sub-menu items appear as follows:

Mouse Training This menu option is used to create a mouse driver for a given Host PC.

List Mouse Drivers This menu option is used to list and delete mouse drivers previously created and switch between mouse drivers previously created for the active Host PC.

The above menu options will not be accessible in cases where the Settings for the currently active Host PC indicate that the special KEY-VIEW mouse driver is installed on the active Host PC, the active Host PC doesn't need mouse support (see the Switch PC's topic for more information on how to set the mouse requirements for a Host PC), or no Host PC is active.

A Mouse Training menu option is used to create a mouse driver for a given Host PC. Prior to selecting this menu option, the Host PC for which the mouse driver will be created must be selected as the active PC and the Mouse Driver option for the active PC must be set to use the Driver Name option, as discussed under Switching PCs above. In addition, the operating system that normally uses the mouse should be running on the Host PC (e.g. Windows, OS/2. DOS etc.), so that the mouse is visible on the Host PC. Finally, the Host PC must have a stable video image in approximately a 1"×1" area bounded by one of the four corners of the screen. In other words there should be no flashing cursor, color changes or movement in one of the four corners of the Host PC's screen.

Figure 21:
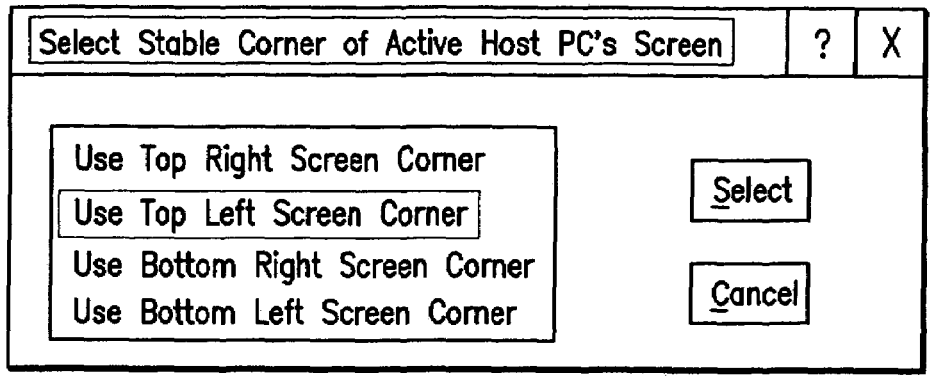

When this menu option is selected, a pop up menu appears, such as is shown by example in. FIG. 21, requesting the selection of a stable corner of the active Host PC's screen. After one of the four corners is selected (either by double clicking on the option or highlighting the desired option and clicking on the Select option), KEY-VIEW will move the Host PC's mouse pointer to the designate corner of the screen to create the mouse driver. If other movement is detected during training or the mouse does not respond properly during testing, an appropriate error message will be displayed and the mouse driver will not be created. Otherwise, the mouse driver file will be created using the file naming conventions discussed under the Switch PCs menu option. Then, the mouse driver for the active PC will be automatically updated.

The mouse driver file contains values as exact amount of mouse movement needed to move the Host PC's mouse one pixel on the Host PC's X-axis and one pixel on the Y-axis. The driver also contains a speed adjustment factor necessary to avoid any mouse acceleration settings on the Host PC.

After mouse training is completed, processing will automatically return to the Mouse main menu bar option.

List Mouse Drivers

The List Mouse Drivers menu option, an example of which is shown in FIG. 22, displays a list box containing any mouse drivers created for the currently active Host PC using the Mouse Training menu option. KEY-VIEW associates each mouse driver file with a Host PC using the Host PC's unique number contained as part of each driver's file name. When this menu option is selected an error message appears if (1) no Host PC is active (2) no mouse drivers have been created for the active Host PC or (3) the Mouse Driver setting for the active Host PC is not set to the Driver Name option (see the Switch PC's topic for more information on how to set the mouse requirements for a Host PC)

The mouse driver list box contains the following information for each of the active Host PCs mouse driver files:

File Name—Name of the mouse driver disk data file stored in the KEY-VIEW default directory. Mouse driver files are created using the Mouse Training menu option. The required mouse driver file naming conventions are discussed under the PCI Card Settings topic.

Date—The date the mouse driver file was created.

Time—The time the mouse driver file was created.

Host PC—The description of the Host PC that uses this driver file.

Mouse Driver processing options are as follows:

Select—This button is used to change the default mouse driver used by the active host PC. When this button is selected, KEY-VIEW reconfirms the mouse driver file still exists in the KEY-VIEW directory. If the driver file cannot be located, an error message is displayed and the selection is ignored. Otherwise, the highlighted mouse driver becomes the default mouse driver for the Host PC. If the driver selected is already the default, an appropriate error message will be displayed and the selected driver will remain the default driver. If the driver selected is not the default driver, the default driver is then changed. In this case, the active PC would then be using an incorrect mouse driver, so KEY-VIEW automatically deactivates this Host PC. This Host PC can then be made active again with the newly selected mouse driver using the Switch PCs menu option.

Update—Since it is possible, but not recommended, to delete or copy mouse driver files outside of the KEY-VIEW application, this button can be used to re-synchronize the listed mouse drivers to the driver files that actually exist in the default KEY-VIEW directory of the hard drive. If a driver file can not be found for a listed mouse driver, that driver will be automatically deleted from the list. If a driver exists in the KEY-VIEW directory but is not on the list, an entry for that driver will be automatically added to the list. Messages will be displayed indicating the names of any mouse drivers that were added or deleted during processing. Status messages are also be displayed in the event no discrepancies are detected.

Delete—Selecting this button causes the highlighted entry and associated driver file to be deleted. Normally, it should not be necessary to delete any driver files. Confirmation will be required before the deletion process starts. If the default driver for the active Host PC is deleted, the mouse driver setting for that Host PC will be blanked out and the Host PC will be automatically deactivated, since a default mouse driver no longer exists for that Host PC. Before this Host PC can be made active again either, (1) the Host PC setting must be changed to use either the No Mouse Support option or the KEY-VIEW mouse option (2) select the Mouse Training menu option to create a new mouse driver or (3) enter another existing mouse driver file name using the Switch PC's menu option.

Video

The Video KEY-VIEW menu bar option of FIG. 13 permits creating and listing KEY-VIEW video drivers that are used to display the active Host PC's screen on the KEY-VIEW PC. When selected, three menu options appear initiating video training for the active Host PC, listing and/or deleting video drivers that have been created, or setting the number of colors used when decoding the Host PC video output signal.

Before discussing the process for creating or maintaining video drivers, it is important to understand why a video driver must be created. Each video card in a Host PC may generate video output signal that differs from other video cards. In order for the KEY-VIEW PC to properly decode the video output signal of a given Host PC, it must lock into the unique characteristics of the video card installed in the Host PC at each video resolution that Host PC may use. To lock on this signal, a known test pattern must be displayed on the Host PC's screen so that the KEY-VIEW PC can lock on to each pixel displayed and the properly interpret the color of the pixel during the training process so that an appropriate driver file can be created. There is no need to train KEY-VIEW at all possible graphics resolutions if certain graphics resolution will not be used on a Host PC. The KEY-VIEW PC can automatically detect the current graphics resolution for a Host PC and create the driver file required for that resolution.

KEY-VIEW supports various graphics resolutions ranging from 640 to 480 pixels to 1024×768 pixels. At higher graphics resolution the number of pixels that need to be interpreted increase dramatically. As a result, more data must be decoded by KEY-VIEW causing it to take longer to capture a Host PC screen and transmit it to a remote user. Accordingly, it is suggested that Host PC's be set to the lowest acceptable graphics resolution to improve screen refresh rates for remote users.

As mentioned, when the Video KEY-VIEW menu bar option is selected three menu options appear as follows:

Video Training—Prior to selecting this menu option, the user must display a known full-screen graphics test pattern on the active Host PC. This menu option then creates a video graphics file for the active Host PC's current graphics mode (e.g. 640×480, 800×600, etc). If no Host PC is active or the other than the intended Host PC is active the required training file will not be created.

List Video Drivers—This menu option is used to list and delete video drivers previously created and switch between video drivers previously created for the active Host PC.

Colors—This menu options will permit a user to specify the number of colors to be used to view a Host PC's screen.

Video Training

Video Training is the first menu option displayed when the Video option is selected from the KEY-VIEW main window bar.

Prior to selecting the Video Training menu option, the user must display a known full-screen graphics test pattern on the active Host PC. This menu option will then create a video graphics file for the active Host PC's current graphics mode (e.g. 640×480, 800×600, etc.) of the Host PC.

When this menu item is selected, KEY-VIEW compares the known test pattern on the Host PC's screen to the actual video output received by the applicable KEY-VIEW PCI card to resolve pixel alignment problems that may prevent the Host screen from displaying accurately on the KEY-VIEW PC. The KEY-VIEW training test pattern may be alternating black and white pixels that cover the entire screen. Three test patterns will be needed to cover the three supported graphics modes (i.e. 640×480, 800×600 and 1024×768).

Once the appropriate test pattern has been displayed on the Host PC, that PC is the active Host PC. With the training process completed, KEY-VIEW will load the training driver data into memory in a standard format and then will save the driver data.

During the testing process, the KEY-VIEW PC has the ability to detect that the required KEY-VIEW test pattern is being displayed on the active Host PC. If this pattern is not found when the training process is initiated, an appropriate error message will be displayed.

After the video training process is completed, processing will automatically return to the Video main menu option.

List Video Drivers

The List Video Drivers menu option, an example of which is shown in FIG. 23, displays a list box containing any video drivers created for the currently active Host PC using the Video Training menu option.

The video driver list box contains 1): video driver disk data file location stored during the training routine; 2) the date the video driver file was created, 3) the time the video driver file was created; and 4) a description of the Host PC that uses the video driver file.

Colors

Also, under KEY-VIEW's Video main bar option, a user can specify the number of colors to be used to view a Host PC's screen, namely 256, 16, 4, or 2 colors.

Generally, selecting the lowest number of acceptable colors results in the fastest Host PC screen refresh rates. So, users who want the KEY-VIEW PCs screen, while in a Host Mode, to more closely approach a real-time display of the active Host PC's screen should select as few colors as is necessary for the application.

Host PC Video Screen Display

It is important to give the remote user as close to real-time interaction with the Host PC as possible. This is accomplished by the present invention through differencing methods.

pcAnywhere's compression routines that will transfer data from a KEY-VIEW PC to a Remote PC (1) look for pixel changes on the screen, (2) break the screen up into sections to identify segments of the screen that have changed, and (3) give priority in posting changes in those sections of the screen that have most recently changed. pcAnywhere looks for changes beginning at the top left of the screen and moves from a left-to-right top-to-bottom approach.

With regard to looking for only pixels changes to the screen, this would mean that the KEY-VIEW APP can re-paint the screen or a section of the screen without concern as to whether or not pcAnywhere will treat repainting a pixel with same color as a change (because the pixel was re-painted). Accordingly, from pcAnywhere's standpoint there is no reason to use the CPU to pre-analyze Host screens to determine exactly which pixels have changes and just post those pixels to the KEY-VIEW PC's screen.

With regard to breaking the screen up into segments and giving priority to looking first at the last segments that have recently changed, the pcAnywhere approach helps the KEY-VIEW system optimize the transmission of mouse pointer movements to a remote user, which is a major area of concern.

Host PC screens are being refreshed at a incredible speed (e.g. 70 frames per second). The hardware design of the KEY-VIEW PCI card calls for capturing a different 32 k section of the Host PC's screen during each screen refresh cycle. The primary reason for breaking a screen up into 32 k segments is not because the entire screen can't be captured during each refresh cycle, but is to minimize the need for expensive, high speed, static RAM chips that would be needed to store and analyze captured Host screen information between Host screen refresh cycles. Increasing the captured block size would also have the undesirable effects of (1) requiring too much board space for RAM chips, (2) substantially increasing the cost of the PCI board, and (3) stressing the ability of the PCI buss to transfer the larger blocks.

As the number of colors captured and video mode of the Host increases, more 32 k sections will need to be captured to complete an entire screen capture. This also means more refresh cycles will occur and more elapsed time will pass before a full Host screen can be analyzed. However, by breaking a Host screen up into 32 k segments, check sums can be calculated on each segment to determine which segments have pixel changes. On this basis, only the segments that have changed need be passed from the KEY-VIEW PCI card to the KEY-VIEW APP which will take a substantial burden off of the PCI buss and eliminate a possible choke point. If the block size is set below 32 k, it will take a longer time to analyze a Host PC's full screen, which will slow screen refresh below an acceptable level, particularly at a 1024×768 video mode.

Because (1) the 32 k approach does not represent a full screen at a any point in time and (2) the KEY-VIEW PC will only be processing screen data from the active PCI card and active Host PC (in the case of a switch box); KEY-VIEW will does, not continually save the last several screens in cases where a Host PC has failed.

Keyboard Menu

Returning to the main menu of FIG. 13, when a Host PC is connected to a KEY-VIEW PC, there is no keyboard physically present on the Host PC. Instead, all keystrokes are input to the Host PC via either the KEY-VIEW PCs keyboard or the remote PCs keyboard. The Keyboard main menu option permits either defining and sending keystroke combinations (macros) to the Host PC or resetting the Host PC's keyboard controller to correct a situation where it may have locked up.

Figure 24:
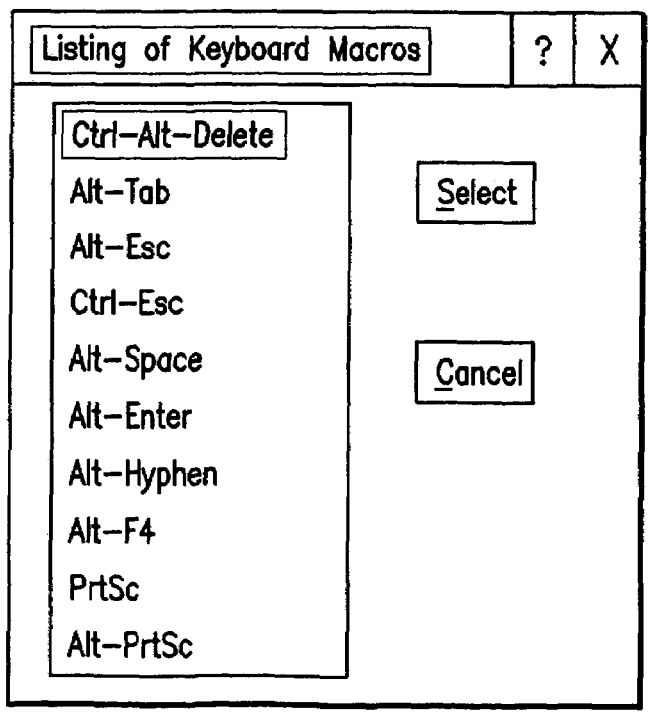

The Keyboard menu option on KEY-VIEW main menu bar has two sub-options as follows:

Create/Send Keyboard Macro—The Create/Send Keyboard Macro option permits naming and defining hot key sequences (e.g. Shift+Ctrl+End) that are sent to the active Host PC when the named macro is selected. Defining hot key sequences in this manner avoids the need for users to recall or enter the specified hot key sequence via the keyboard. In certain cases, the Windows application running on the KEY-VIEW PC traps hot keys such as Ctrl+Alt+Delete or Alt-Tab before they can be sent to the active Host PC. For such cases appropriate keyboard macros have already been pre-defined. When this option is selected, a list of pre-defined and user defined hot key combination appears, permitting a user at the Host site or a remote user to select one of the hot-key combinations and transmit that combination directly to the active Host PC, as if the key sequence was actually entered at the Host PC's keyboard. An example of such a list is shown in FIG. 24. In cases where a KEY-VIEW PC is connected to a keyboard controlled switch box, macros must be defined using this menu option to put the switch box in a command mode and then additional macros must be defined to cause the switch box to switch between the PC's connected to it.

Reset Active Host PC's Keyboard—Each KEY-VIEW PCI card contains a internal switch that safely emulates pulling a PC's keyboard plug thereby forcing the active Host PC's keyboard controller to reboot. This menu option simply invokes that switch and gives a KEY-VIEW user the power to attempt to unlock a locked up PC remotely without rebooting the Host PC.

Create/Send Keyboard Macro

The Create/Send Keyboard Macro option permits naming and defining keyboard hot key sequences (e.g. Shift+Ctrl+End) that are sent to the active Host PC when the named macro is selected. Defining hot key sequences in this manner avoids the need for users to recall or enter the specified hot key sequence via the keyboard. In certain cases, the Windows application running on the KEY-VIEW PC traps hot keys such as Ctrl+Alt+Delete or Alt-Tab before they can be sent to the active Host PC. For such cases appropriate keyboard macros have already been pre-defined.

In rare cases it may be necessary to create a macro because Windows traps or delays key press combinations so that they do not pass through to the active Host PC properly. Known key press combinations that may cause a problem are discussed at the end of this topic. Again, should any of these problems appear, the problem can be solved using this menu option to create a macro and send the macro created to the Host PC instead of using keyboard input.

Figure 25:
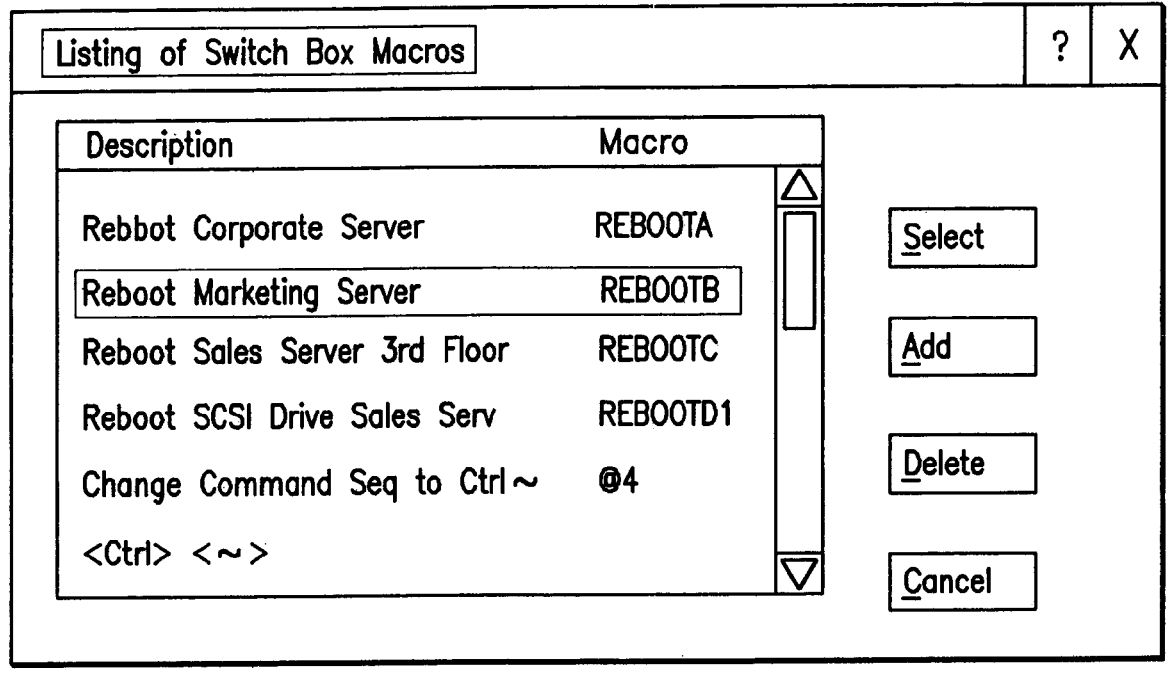

This menu option may be used to create or delete keyboard macros and to send a macro created to the active Host PC. Once a macro is created, that macro also automatically appears on any applicable KEY-VIEW menu option that involves sending keyboard macros to the Host PC. These menu options include: (1) PCI Card Settings (Switch Box Hot Keys setting), and (2) Switch Box PC Settings (Switch Box ID). Alternatively, Switch Box macros can be amended or selected independently, such as via the example menu shown in FIG. 25. In FIG. 25, a scrolling list (displaying 15 macros at a time) of switch box command macros related to the currently active PCI card appears. If no strings have been defined for the active PCI card, the user would click on the Add button to permit a macro to be defined.

When defining a macro, the command key sequence for the switch box must not be entered. KEY-VIEW will automatically add the applicable command mode sequence before sending the macro and a <Enter> key after sending the macro.

Internally, the KEY-VIEW APP will associate a list of macros with a PCI card ID so that different macros can be assigned to each PCI card. If the currently active PCI card ID is not defined as a switch box card (i.e. an SB as discussed under the SwPCs menu option above), a error message will appear if this menu option is selected which will preclude any entry of macros for the PCI card.

After either (1) an option is selected and the selected macro sequence sent to the Host PC, (2) the user presses the Esc key or (3) the user clicks on the cancel button processing will return to the Keyboard main menu option. From the Keyboard menu option, a user may use the arrow keys/Enter key or mouse to select a menu option.

Reset Active Host PC's Keyboard

Many PCs appear to have locked up and are needlessly rebooted because the PC's keyboard controller has simply locked up. In such cases, the PC may be unlocked by simply pulling the PC's keyboard plug out and putting in back into the PC. However, since keyboards receive power from the PC, this procedure could short out the PC and or keyboard and is not a recommended procedure to attempt manually.

Each KEY-VIEW PCI card contains a internal switch that safely emulates pulling a PC's keyboard plug thereby forcing the PC's keyboard controller to reboot. This menu option simply invokes that switch and gives a KEY-VIEW user the power to attempt to unlock a locked up PC remotely without rebooting the Host PC. Before attempting this operation on a Host PC, it is recommended that this option be run on a test basis when the PC is not running critical applications, before it is used in an emergency situation. Such a test insures that this menu option does not have any undesirable side effects on a Host PC or switch box.

Other

The Key-VIEW Main menu bar Other menu on FIG. 13 option contains several sub-menu options as follows:

1. Card Addresses—This menu option permits changing the memory address and/or IRQ's used by the KEY-VIEW software application to communicate with the KEY-VIEW PCI and Access Control Cards.

Figure 26:
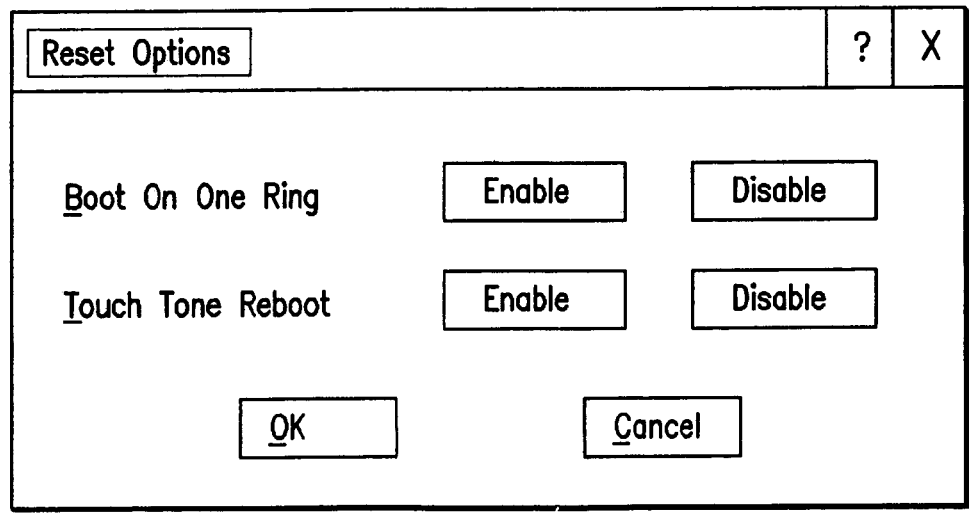

2. Reset Options—This menu option is used to configure the KEY-VIEW Access Control Card. This option (shown as an example in FIG. 26) configures how the KEY-VIEW PC Access Control Card operates, including:

a. Enable Reboot When Less Than_—This allows a user to specify a NUMBER OF RINGS from 3 to 9, whereupon, if less than the number of rings specified is detected on the phone line plugged into the KEY-VIEW Access Control Card, then the KEY-VIEW PC will be rebooted. If this option is enabled, the Enable Reboot When More Than rings option must also be enabled and vice-versa. This feature is essential to remotely reboot the KEY-VIEW PC in the event the KEY-VIEW PC should ever lock up and not permit remote access. If a modem is installed in the KEY-VIEW PC, the modem should be set via pcAnywhere to answer on at least one ring more than is specified in this setting, to avoid a situation where the KEY-VIEW PC reboots before the call is answered by the modem.

b. Enable Reboot When More Than_—This allows a user to specify a NUMBER OF RINGS from 5 to 10, whereupon, if more than the number of rings specified is detected on the phone line plugged into the KEY-VIEW Access Control Card, then the KEY-VIEW PC will be rebooted. If this option is enabled, the Enable Reboot When Less Than rings option must also be enabled and vice-versa. This feature is essential to remotely reboot the KEY-VIEW PC in the event the KEY-VIEW PC's modem should lockup and not answer a call. If a modem is installed in the KEY-VIEW PC, the modem should be set via pcAnywhere to answer on at least two rings less than is specified in this setting, to avoid a situation where the KEY-VIEW PC reboots before the call is answered by the modem.

c. Enable Reboot via external modem_—This allows a user to specify a 10 character password that can be provided by the remote user to cause the KEY-VIEW PC to reboot itself This remote reboot feature is handled by the KEY-VIEW PC's Access Control Card 90 and requires an external modem connected to this Access Control Card's DATA port. To reboot a KEY-VIEW PC using this feature, a remote site 205 calls the external modem connected to the NET-911 module using a terminal emulation program (such as the Hyper terminal program supplied with Windows). The modem connected to the NET-911 control module is set to an auto-answer mode and will answer all incoming calls after the second ring. When this modem linkage is completed, the remote user types the password specified and, if correct, the KEY-VIEW PC immediately reboots. In emergency situations this remote reboot feature could also be used to remotely terminate another remote user's connection to the KEY-VIEW PC, since a separate independent phone line and modem is used to cause the KEY-VIEW PC to reset.

3. Sound Options—This menu option sets the sound that occurs when (1) a system message is displayed or (2) a user is remotely accessing the KEY-VIEW PC or an automated NET-911 module event is triggered. The beep sound made by a PC's internal speaker is often hard to hear, especially in typical computer rooms where there is substantial of background noise. As a result, audible KEY-VIEW notifications may go unnoticed. For example, many users want a loud audible sound to occur whenever someone is remotely accessing their site to alert any Host site personnel present that the site is being accessed.

4. Switch Resolutions—This menu option permits switching the graphics resolutions of the KEY-VIEW PC's screen. In the preferred embodiment, the following settings are available: 640×480, 800×600, and 1024×768, although others are possible and are envisioned in the present invention. The graphics resolution selected only applies to the KEY-VIEW PC's screen and is a convenient was to synchronize the KEY-VIEW PC's screen resolution with a remote PC's screen resolution, so that the KEY-VIEW PC appears as a full screen on the remote PC. However, when the KEY-VIEW PC switches to a Host Mode, the KEY-VIEW PCs screen will automatically assume the resolution of the Host PC's screen. so that the Host PC's screen appears as a full screen on the KEY-VIEW PC.

5. Exit Menu Mode—This menu options causes the KEY-VIEW PC to switch from a Menu Mode to a Host Mode.

6. Quit KEY-VIEW—This menu option terminates KEY-VIEW application processing and returns control back to the Windows 95 Operating system.

7. Remote Session Beep Interval—This sets how often the KEY-VIEW PC should beep while a Remote PC is accessing the KEY-VIEW PC.

8. Auto-Switch to Host mode Interval—This sets the number of seconds that may elapse without mouse or keyboard input to the KEY-VIEW APP before the KEY-VIEW switches from a Menu mode back to a Host mode. Automatically switching back to a Host mode is necessary so that a Host site user will normally have console control of a Host PC and not have to worry about switching the consoles monitor from a Host PC to the KEY-VIEW PC's VGA card to switch the KEY-VIEW PC out of a Menu mode.

Settings for Active Host PC

Returning to the KEY-VIEW main menu screen of FIG. 13, the banner at the bottom of the menu screen shows all current information related to the active Host PC. This banner always appears in this fixed location of screen whenever the KEY-VIEW PC is in a Menu Mode. The information includes: the PCI Card description, the SB Hot Key, the PC ID, mouse type, mouse and video driver locations, switch box channels, and the # colors displayed.

Hot-Keys

Certain functions can be assigned hot keys sequences. In the Host mode, the Keyview specific hot key combinations are trapped by the Key-view application and are not passed back to the active Host PC. Some example hot key functions are:

a. switch from Menu mode to Host mode.

b. Repaint Active Host PC screen.

c. Send selected Switch Box Command sequence to the switch box connected to the active PCI card.

d. Switch between KEY-VIEW PCI cards.

e. Send a keyboard macro to Host PC (without this feature the operating system on the KEY-VIEW PC may trap any operating system specified hot keys before they would reach the Host PC), such as Ctrl-Alt Delete, Alt-tab, Ctrl-Esc, Alt-Space, Alt-Enter, etc.

KEY-VIEW PC LED Indicator

The KEY-VIEW Access Control Card has a connection to one of the status LED lights, normally the Turbo light, on the front of the KEY-VIEW PC. This state of this LED light indicates the status of the KEY-VIEW PC. This LED light will be OFF when the KEY-VIEW PC is in a Menu Mode and is not being remotely accessed. This light will remain ON whenever the KEY-VIEW PC is in a Host Mode and is not being remotely accessed.

When the KEY-VIEW PC is being remotely access the LED will flash. More specifically, the turbo light remains OFF but flashes ON for 0.5 seconds every 5 seconds, whenever the KEY-VIEW PC is being remotely accessed (i.e. a pcAnywhere is "In session") and is in a Menu Mode. If the KEY-VIEW PC is in a mode where both pcAnywhere is "In Session" and the KEY-VIEW PC is in a Host Mode, the turbo light remains ON and then flashes OFF for 0.5 seconds every 5 seconds.

Setting the turbo light in this manner coupled with the user configurable beep option gives personnel at the Host site a visible and audible indication whenever the site is being remotely accessed. Moreover, whenever the turbo light stays OFF, the user at the Host site will know that the KEY-VIEW PC is not in a Host Mode and will not pass keyboard or mouse input through to Host PC's until the KEY-VIEW PC is switched to a Host Mode.

File Transfers

In KEY-VIEW II, the remote access engine (such as pcAnywhere) will handle file transfers from the Remote site 205 to the KEY-VIEW PC 200 and vice-versa. pcAnywhere, for example, makes all the latest file transfer tools (e.g. drop and drag) available to the remote user. However, getting files to the KEY-VIEW PC 200 is of little value unless the files can then be transferred to a Host PC 201-204, or vice-versa.

If a LAN card is installed in the KEY-VIEW PC 200, the KEY-VIEW PC can be setup to attach to the LAN and/or the Host PC's via drive mapping as part of the boot up process. If the Host PCs are also connected to the LAN (not shown, but available, in FIG. 28), when a remote user 205 accesses the KEY-VIEW PC 200 via modem 218 to transfer a file to the Host site 201-204, the remote user 205 simply sends the file transfer to the drive that the Host PC's hard disk is mapped to, or suspends the KEY-VIEW application, logs into the applicable Host PC and transfers the file to that Host PC.

Alternatively, in cases where a single KEY-VIEW PCI card 90 is installed in the KEY-VIEW PC 200, the KEY-VIEW PC's existing parallel port could be used to make file transfers to the Host PC 201 using any commercial file transfer software package such as Laplink or pcAnywhere, as long as the necessary parallel cable is connected from the KEY-VIEW PC 200 to the Host PC 201.

In another alternative, in cases where multiple Host PCs 201-204 are connected to the KEY-VIEW PC 200, file transfers between the KEY-VIEW and any Host PC could also be made using a serial linkage (FIG. 10) through NET-911 Control Modules 80. These modules 80 are daisy chained together and connected to one of the serial ports on the KEY-VIEW PC and one other serial port ("optional serial connection" in FIG. 10) on each Host PC 201-204. Procedures for accessing a NET-911 Control Modules and linking to the Host PC connected to the module are discussed in detail above. Serially based file transfer software such as pcAnywhere, Laplink, or the Hyperterminal software (provided with Windows) would then be used to transfer files between the KEY-VIEW PC and Host PCs. NET-911 Control Modules also permit the KEY-VIEW PC to serially access and control any other serial based devices such as routers, printers, UPS systems either locally or remotely via the KEY-VIEW PC.

As example of the typical steps used to transfer a file from a remote PC to a Host PC via NET-911 Control Modules would be as follows:

1. Transfer all required files file(s) from the Remote PC to a temporary directory on the KEY-VIEW PC using pcAnywhere.
2. Select the Switch option off the KEY-VIEW main menu, then select the Switch Modules option and select the control module that is connected to the Host PC where the files need to be transferred and make sure that module is set as the active module. This step will then open up a direct standard serial linkage from the KEY-VIEW PC's serial port to the Host PC's serial port via the active module selected.
3. Select the Switch option off the KEY-VIEW main menu, then select the Switch PCs and make the Host PC where the files need to be transferred the active Host PC.
4. On the KEY-VIEW PC switch from the Menu Mode to the Host Mode and initiate a file transfer software program on the active Host PC, such as pcAnywhere (in Host mode) or Hyper terminal (supplied with Windows) to receive the files from the KEY-VIEW PC via the direct serial interface between the KEY-VIEW PC and the Host PC. Note any serial port parameter settings such as baud rate, stop bits, flow control, etc. to insure that such settings agree with the KEY-VIEW PCs settings in step 6 below.
5. On the KEY-VIEW PC switch from the Host Mode back to the Menu Mode and minimize the KEY-VIEW II application.
6. From the Windows desktop initiate a file transfer program on the KEY-VIEW PC that is compatible with the file transfer program initiated on the active Host PC in step 4 above. For example, if pcAnywhere was initiated in a Host mode in step 4 above, initiate pcAnywhere in a remote mode on the KEY-VIEW PC. Make sure the serial port parameter settings for the file transfer software being used agree with the settings noted in step 4 above.
7. Transfer all files from the KEY-VIEW PC's temporary directory setup in step I above to the active Host PC via the file transfer software being used.
8. Delete the files transferred from the KEY-VIEW PC's temporary directory.
9. Terminate file transfer processing on the KEY-VIEW PC and maximize the KEY-VIEW application that was minimized in step 5 above.
10. Switch to a Host Mode and then terminate file transfer processing on the active Host PC that was initiated in step 4 above.
11. Resume normal KEY-VIEW processing.

Steps identical to the above would be followed to transfer files from the active Host PC to a Remote PC except that the transfer of the files from the active Host PC to the KEY-VIEW PC's temporary directory would occur first. Then, these files would be transferred by pcAnywhere from the KEY-VIEW PC to the Remote PC.

If file serial file transfer processing will not initiate between the active Host PC and the KEY-VIEW PC it is possible that a special null modem adapter may be needed on the serial cable between the PCs.

To configure Windows NT/95 Hyperterminal program to handle file transfers on a KEY-VIEW PC, perform the same steps detailed above for the Host PC except in step 3 and 4 above modify the description to use the COM port to which the serial cable is connected to on the KEY-VIEW PC.

pcAnywhere Sessions

It is sometimes necessary to determine when a pcAnywhere session begins and ends. First, the best procedure to determine whether pcAnywhere is active is to test the active operating system (such as Windows 95) status bars for the key words "In session". If this is not possible, then the following, more complicated, alternative can be used.

Merely accessing the pcAnywhere log file to determine when a pcAnywhere session has started or stopped will not work since pcAnywhere understandably does not access it's log file in a shared mode. This means that if KEY-VIEW APP was attempting to read the LOG file when a remote access session started or ended, pcAnywhere would receive a file open error from the operating system (because KEY-VIEW APP has the file open) and pcAnywhere simply does not update the log file.

To correct this problem, the KEY-VIEW APP looks at the file time and date of the pcAnywhere log file which is updated each time a user logs ON or OFF. To avoid dragging down the Host PC processor this viewing at the time and date of the file can occur approximately every 5 seconds. No entries other than sign-off and sign-on occur to the Host log file and the file time & date is updated when either of these events occur. Other log entries, such as file transfer information, are only logged at the remote end.

Since only time and date changes are tracked Keyview may get out of sync with whether or not the session is being activated or terminated, especially in cases where the Host PC locked up when a pcAnywhere session was active and had to be rebooted. To prevent this, the file is read each time KEY-VIEW APP processing is first initiated and immediately after a date/time change has occurred to see if Keyview is in session or out of session by looking at the last entry in the log.

Because the file may falsely indicate a session is open, if the K PC locked up during a pcAnywhere session and had to be rebooted, at bootup of the Keyview PC a dummy flag file is created (in the AUTOEXEC.BAT of the Keyview PC) to tell KEY-VIEW APP to assume a remote access session is not active regardless of what the pcAnywhere log says. Upon finding the dummy file when KEY-VIEW APP is first loaded, KEY-VIEW APP would assume a session is not open then delete the dummy file, so this assumption will not be made again in a case where KEY-VIEW APP is terminated then re-loaded without rebooting the Host PC. Under this approach there would be no need to update the pcAnywhere log to indicate that any open session has ended because KEY-VIEW APP won't look at the log again until the date & time has changed in which case the last entry will reflect a new PC AW session has begun.

When a PC AW session begins, as detected by KEY-VIEW APP as described above, KEY-VIEW APP will stop re-directing all keyboard and mouse input to the Host PC and display the Keyview main menu on the Keyview PC's screen as discussed above. When a pcAnywhere session ends, as detected by KEY-VIEW APP using the above procedure, and the user has not ended Key-view Main menu processing; the Key-view main menu is removed from the Key-view PC's screen automatically and all keyboard/mouse input re-routed from the Key-view PC to the Host PC.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer circuit coupled to a data bus and communicating with a Host PC, comprising:
   a video input buffering circuit receiving RGB video signals from the Host PC;
   an analog to digital converter circuit coupled to the video input buffering circuit to receive and digitize the RGB video signals;
   a main gate array circuit to receive the digitized RGB video signals from the analog to digital converter circuit;
   a video memory circuit to store the digitized RGB video signals;
   a second gate array circuit coupled to the main gate array circuit, the second gate array circuit bridging data between the main gate array circuit and the data bus;
   a system clock circuit providing clock signals to the main and second gate array circuits;
   a main cpu, communicating with the main and second gate array circuits to direct data between the video memory circuit and the second gate array circuit, the main gate array also controlling data traffic between the analog to digital converter circuit, the video memory circuit, and the main cpu;
   a keyboard cpu in communication with the main cpu and at least one of an external keyboard and an external mouse; and
   a pixel clock generator to provide a pixel clock signal to the analog to digital converter circuit, the pixel clock generator reproducing in frequency and phase a host pixel clock signal used by the Host PC to produce the RGB video signals received by the video input buffering circuit.

2. A computer circuit according to claim 1, wherein the video memory is a combination of interleaved video RAMs.

3. A computer circuit according to claim 1, wherein the video input buffering circuit includes operational amplifiers, one for each R, G, and B component of the RGB video signal.

4. A computer circuit according to claim 1, wherein the main gate array circuit includes a checksum section to determine a checksum difference between two video frames of the RGB video signal.

5. A computer circuit according to claim 1, wherein the main gate array circuit includes a checksum section to determine a checksum difference between two video frames of the RGB video signal and delivers the checksum difference to the second gate array circuit.

6. A computer circuit according to claim 1, wherein the video memory circuit includes a video RAM and a palette RAM, the main gate array circuit including a checksum section to derive a checksum difference between video frame information in the video RAM versus the palette RAM.

7. A computer circuit according to claim 1, wherein the second gate array circuit includes a timing and control section.

8. A computer circuit according to claim 1, wherein the second gate array circuit includes a video format decoding section.

9. A computer circuit according to claim 1, wherein the second gate array circuit including a video latch area.

10. A computer circuit according to claim 1, wherein the pixel clock generator includes a phase locked loop.

11. A computer circuit according to claim 1, wherein the second gate array circuit includes a video format decoding section generating a vertical blanking period signal and the pixel clock generator includes a sample and hold circuit receiving the vertical blanking period signal at a hold input of said sample and hold circuit said sample and hold circuit having a hold period greater than a maximum vertical flanking period.

12. A computer circuit according to claim 1, further including:
   an ID switch to uniquely identify the circuit conununicating with the Host PC in comparison to other circuits communicating with other Host PCs via the data bus.

13. A computer circuit according to claim 1, wherein the main gate array circuit and the second gate array circuit are comprised in a single gate array.

* * * * *